US011078352B2

(12) United States Patent
Ichino et al.

(10) Patent No.: US 11,078,352 B2
(45) Date of Patent: Aug. 3, 2021

(54) THERMOPLASTIC ELASTOMER COMPOSITION, USE THEREOF, METHOD FOR PRODUCING SAME, ETHYLENE/α-OLEFIN/UNCONJUGATED POLYENE COPOLYMER AND USE THEREOF

(71) Applicant: MITSUI CHEMICALS, INC., Tokyo (JP)

(72) Inventors: Kotaro Ichino, Ichihara (JP); Tomohiro Yamaguchi, Chiba (JP); Yukio Aita, Ichihara (JP); Yuji Noguchi, Funabashi (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/559,366

(22) PCT Filed: Mar. 17, 2016

(86) PCT No.: PCT/JP2016/058469
§ 371 (c)(1),
(2) Date: Sep. 18, 2017

(87) PCT Pub. No.: WO2016/152711
PCT Pub. Date: Sep. 29, 2016

(65) Prior Publication Data
US 2018/0072877 A1 Mar. 15, 2018

(30) Foreign Application Priority Data

Mar. 20, 2015 (JP) .............................. JP2015-057728
Apr. 13, 2015 (JP) .............................. JP2015-081744

(51) Int. Cl.
C08L 23/08 (2006.01)
C08J 3/24 (2006.01)
C08L 23/00 (2006.01)
C08L 61/06 (2006.01)
C08F 210/16 (2006.01)

(52) U.S. Cl.
CPC .......... *C08L 23/083* (2013.01); *C08F 210/16* (2013.01); *C08J 3/24* (2013.01); *C08L 23/00* (2013.01); *C08L 23/08* (2013.01); *C08L 61/06* (2013.01); *C08F 2810/20* (2013.01); *C08J 2323/08* (2013.01); *C08J 2423/12* (2013.01); *C08J 2461/06* (2013.01); *C08L 2205/025* (2013.01); *C08L 2205/03* (2013.01); *C08L 2207/04* (2013.01); *C08L 2312/04* (2013.01)

(58) Field of Classification Search
CPC ............................... C08L 23/083; C08L 23/16
See application file for complete search history.

(56) References Cited

U.S. PATENT DOCUMENTS

| 2,972,600 | A | 2/1961 | Braidwood |
| 3,093,613 | A | 6/1963 | Fusco et al. |
| 3,287,440 | A | 11/1966 | Giller |
| 3,709,840 | A | 1/1973 | Dehoff |
| 4,311,682 | A | 1/1982 | Miyazaki et al. |
| 4,892,851 | A | 1/1990 | Ewen et al. |
| 5,026,798 | A | 6/1991 | Canich |
| 5,055,438 | A | 10/1991 | Canich |
| 5,057,475 | A | 10/1991 | Canich et al. |
| 5,096,867 | A | 3/1992 | Canich |
| 5,153,157 | A | 10/1992 | Hlatky et al. |
| 5,155,080 | A | 10/1992 | Elder et al. |
| 5,158,920 | A | 10/1992 | Razavi |
| 5,162,278 | A | 11/1992 | Razavi |
| 5,195,401 | A | 3/1993 | Mouton |

(Continued)

FOREIGN PATENT DOCUMENTS

| CN | 1219800 C | 9/2005 |
| CN | 1922261 A | 2/2007 |

(Continued)

OTHER PUBLICATIONS

US 5,168,111 A, 02/1992, Canich (withdrawn)
Machine Translation of JP 2011001497 (Year: 2019).*
Extended European Search Report dated Sep. 21, 2018 in European Application No. 16768614.6. 9 pages.
Hansch, Cowrin et al., A Survey of Hammett Substituent Constants and Resonance and Field Parameters, Chemical Reviews, Mar./Apr. 1991, pp. 165-195, vol. 91, No. 2, American Chemical Society.
Hoffman, Werner, Vulcanization and Vulcanizing Agents, 1965, pp. 300-307, Maclaren and Sons Ltd.

(Continued)

Primary Examiner — Michael M Dollinger
(74) Attorney, Agent, or Firm — Foley & Lardner LLP

(57) ABSTRACT

[Problem] The purpose of the invention is to provide: a thermoplastic elastomer composition capable of providing molded articles that are lightweight, have better oil resistance than those provided by conventional cross-linked thermoplastic elastomers, and have hardness and mechanical properties such as tensile strength and tensile elongation that are equal to or superior to those provided by conventional cross-linked thermoplastic elastomers; and an ethylene/α-olefin/unconjugated polyene copolymer having little compression set at low temperature as well as flexibility and an excellent balance of rubber elasticity at low temperature and tensile strength at normal temperature.
[Solution] Produced are: a thermoplastic elastomer composition obtained by dynamically crosslinking a mixture containing a crystalline olefin polymer (A), an ethylene/α-olefin (having 4-20 carbon atoms)/unconjugated polyene copolymer (1B) that satisfies specific requirements, and a phenol resin-based crosslinking agent (C); and an ethylene-α-olefin/unconjugated polyene copolymer (2B) that satisfies specific requirements.

16 Claims, No Drawings

(56) References Cited

U.S. PATENT DOCUMENTS

| | | |
|---|---|---|
| 5,223,467 A | 6/1993 | Razavi |
| 5,223,468 A | 6/1993 | Razavi |
| 5,225,500 A | 7/1993 | Elder et al. |
| 5,227,440 A | 7/1993 | Canich et al. |
| 5,241,025 A | 8/1993 | Hlatky et al. |
| 5,243,002 A | 9/1993 | Razavi |
| 5,264,405 A | 11/1993 | Canich |
| 5,278,119 A | 1/1994 | Turner et al. |
| 5,278,265 A | 1/1994 | Razavi |
| 5,292,838 A | 3/1994 | Razavi |
| 5,304,523 A | 4/1994 | Razavi |
| 5,321,106 A | 6/1994 | Lapointe |
| 5,334,677 A | 8/1994 | Razavi et al. |
| 5,384,299 A | 1/1995 | Turner et al. |
| 5,387,568 A | 2/1995 | Ewen et al. |
| 5,391,629 A | 2/1995 | Turner et al. |
| 5,407,884 A | 4/1995 | Turner et al. |
| 5,408,017 A | 4/1995 | Turner et al. |
| 5,420,217 A | 5/1995 | Canich |
| 5,470,927 A | 11/1995 | Turner et al. |
| 5,483,014 A | 1/1996 | Turner et al. |
| 5,504,169 A | 4/1996 | Canich |
| 5,519,100 A | 5/1996 | Ewen et al. |
| 5,547,675 A | 8/1996 | Canich |
| 5,561,092 A | 10/1996 | Ewen et al. |
| 5,589,556 A | 12/1996 | Razavi |
| 5,599,761 A | 2/1997 | Turner |
| 5,614,457 A | 3/1997 | Ewen et al. |
| 5,621,126 A | 4/1997 | Canich et al. |
| 5,631,391 A | 5/1997 | Canich |
| 5,663,249 A | 9/1997 | Ewen et al. |
| 5,696,214 A | 12/1997 | Sagane et al. |
| 5,723,560 A | 3/1998 | Canich |
| 5,763,549 A | 6/1998 | Elder et al. |
| 5,801,113 A | 9/1998 | Jejelowo et al. |
| 5,807,939 A | 9/1998 | Elder et al. |
| 5,807,948 A | 9/1998 | Sagane et al. |
| 5,883,202 A | 3/1999 | Ewen et al. |
| 5,922,811 A | 7/1999 | Suzuki et al. |
| 5,922,823 A | 7/1999 | Sagane et al. |
| 6,121,395 A | 9/2000 | Turner |
| 6,232,420 B1 | 5/2001 | Turner |
| 6,245,706 B1 | 6/2001 | Hlatky |
| 6,265,338 B1 | 7/2001 | Canich |
| 6,294,625 B1 | 9/2001 | Hlatky et al. |
| 6,355,592 B1 | 3/2002 | Hlatky et al. |
| 6,417,120 B1 | 7/2002 | Mitchler et al. |
| 6,423,795 B1 | 7/2002 | Canich et al. |
| 6,617,466 B1 | 9/2003 | Canich |
| 6,632,898 B1 | 10/2003 | Canich |
| 6,635,705 B2 | 10/2003 | Itoh et al. |
| 6,939,928 B1 | 9/2005 | Kawai et al. |
| 7,041,841 B1 | 5/2006 | Canich |
| 7,163,907 B1 | 1/2007 | Canich et al. |
| 7,393,907 B2 | 7/2008 | Imuta et al. |
| 7,569,646 B1 | 8/2009 | Canich |
| 7,714,087 B2 | 5/2010 | Imuta et al. |
| 2001/0016620 A1 | 8/2001 | Itoh et al. |
| 2002/0055591 A1 | 5/2002 | Itoh et al. |
| 2002/0155776 A1 | 10/2002 | Mitchler et al. |
| 2002/0156207 A1 | 10/2002 | Imuta et al. |
| 2003/0096912 A1* | 5/2003 | Kawasaki ............... A61J 1/03 525/232 |
| 2004/0122192 A1 | 6/2004 | Imuta et al. |
| 2005/0228155 A1 | 10/2005 | Kawai et al. |
| 2006/0161013 A1 | 7/2006 | Tohi et al. |
| 2006/0178491 A1 | 8/2006 | Canich |
| 2007/0270540 A1 | 11/2007 | Kanae et al. |
| 2008/0064805 A1* | 3/2008 | Uosaki ............... B29C 45/0001 524/487 |
| 2008/0220193 A1 | 9/2008 | Tohi et al. |
| 2009/0126234 A1* | 5/2009 | Kajihara ............... A43B 13/04 36/30 R |
| 2009/0137757 A1 | 5/2009 | Imuta et al. |
| 2010/0056691 A1* | 3/2010 | Hoya ............... H01B 7/295 524/424 |
| 2010/0120933 A1* | 5/2010 | Imai ............... C08F 210/06 521/140 |
| 2016/0280819 A1 | 9/2016 | Tohi et al. |
| 2016/0347894 A1 | 12/2016 | Endo et al. |

FOREIGN PATENT DOCUMENTS

| | | |
|---|---|---|
| CN | 100335509 C | 9/2007 |
| EP | 1640415 A2 | 3/2006 |
| EP | 3106480 A1 | 12/2016 |
| JP | H01-501950 A | 7/1989 |
| JP | H01-502036 A | 7/1989 |
| JP | H03-179005 A | 8/1991 |
| JP | H03-179006 A | 8/1991 |
| JP | H03-207703 A | 9/1991 |
| JP | H03-207704 A | 9/1991 |
| JP | H09-67485 A | 3/1997 |
| JP | H09-71617 A | 3/1997 |
| JP | 2000-212194 A | 8/2000 |
| JP | 2001-011247 A | 1/2001 |
| JP | 2001-294714 A | 10/2001 |
| JP | 2004-168744 A | 6/2004 |
| JP | 2004-175759 A | 6/2004 |
| JP | 2011-001489 A | 1/2011 |
| JP | 2011-001497 A | 1/2011 |
| JP | 2011-202136 A | 10/2011 |
| JP | 2015-137305 A | 7/2015 |
| WO | WO-01/27124 A1 | 4/2001 |
| WO | WO-2006/123759 A1 | 11/2006 |
| WO | WO-2009/081792 | 2/2009 |
| WO | WO-2009/081794 A1 | 7/2009 |
| WO | WO-2015/122415 | 8/2015 |

OTHER PUBLICATIONS

International Search Report in PCT/JP2016/058469 dated Jun. 21, 2016.
Laine, Anniina et al, Elemental Reactions in a Copolymerization of a-Olefins by Bis(cyclopentadienyl)Zirconocene and Hafnocene: Effects of the Metal as a Function of the Monomer and the Chain End, Organometallics, Mar. 28, 2011, pp. 1350-1358, vol. 30, Issue 6.
Patsidis, Konstantinos et al, The synthesis, characterization and polymerization behavior of ansa cyclopentadienyl fluorenyl complexes; the X-ray structures of the complexes [(C113H8) SiR2(C5H4)]ZrCl2 (R=Me or Ph), Journal of Organometallic Chemistry, 1996, pp. 63-71, 509, Elsevier.
Hsieh, Eric T., et al, Ethylene-1-Butene Copolymers. 1. Comonomer Sequence Distribution, Macromolecules, 1982, pp. 353-360, 15, American Chemical Society.
Ray, G. Joseph et al, Carbon-13 Nuclear Magnetic Resonance Determination of Monomer Composition and Sequence Distributions in Ethylene-Propylene Copolymers Prepared with a Stereoregular Catalyst System, Macromolecules, Jul.-Aug. 1977, pp. 773-778, vol. 10, No. 4.
Surya Prakash, G.K. et al, N-Carboethoxypiperidine, A Convenient Reagent for the Preperation of Symmetrical Ketones From Organolithiums, Heterocylces, 1995, pp. 79-83, vol. 40, No. 1.

* cited by examiner

THERMOPLASTIC ELASTOMER COMPOSITION, USE THEREOF, METHOD FOR PRODUCING SAME, ETHYLENE/α-OLEFIN/UNCONJUGATED POLYENE COPOLYMER AND USE THEREOF

RELATED APPLICATIONS

The present application claims priority under 35 USC 371 to International Patent Application number PCT/JP2016/058469, filed Mar. 17, 2016, which claims priority to Japanese Patent Application No. JP2015-057728, filed Mar. 20, 2015 and Japanese Patent Application No. JP2015-081744, filed Apr. 13, 2015. The contents of these applications are hereby incorporated by reference in their entireties.

TECHNICAL FIELD

The present invention (1) relates to thermoplastic elastomer compositions, and more particularly relates to thermoplastic elastomer compositions that can provide molded articles which are lightweight and have a high strength and excellent oil resistance and mechanical properties.

The present invention (2) relates to ethylene.α-olefin.non-conjugated polyene copolymers and uses thereof.

BACKGROUND ART

Olefin-based thermoplastic elastomers are lightweight and easy to recycle, and hence are widely used as thermoplastic elastomers of an energy saving and resources saving type, particularly as substitutes for vulcanized rubbers, for automobile parts such as hoses, pipes, and boots (blow molded articles) for automobiles, and the like (for example, Patent Documents 1 and 2).

However, these automobile parts always require weight reduction for fuel consumption improvement, whereas thermoplastic elastomers used contain a large amount of filler, tending to have a large specific gravity, and have been inhibiting weight reduction for parts. In addition, these automobile parts are used at positions in contact with lubricating oil, grease, and the like, but, because olefin-based thermoplastic elastomers generally have a low oil resistance against paraffin-based process oil, these automobile parts obtained including the olefin-based thermoplastic elastomers also have a low oil resistance and require further improvement.

Ethylene.α-olefin rubbers, such as ethylene.propylene copolymer rubber (EPR) and ethylene.propylene.diene copolymer rubber (EPDM), have no unsaturated bond in the main chain of the molecular structure thereof and hence exhibit an excellent heat aging resistance, weather resistance, and ozone resistance as compared with general-purpose conjugated diene rubbers, and have been applied widely to uses, for example, automobile components, wire materials, electric.electronic components, construction and civil engineering materials, and industrial materials and components.

In recent years, for the needs exploiting the excellent heat resistance, weather resistance, and flexibility of ethylene.α-olefin rubber, raw material development and product development for transparent cross-linked sheets have been carried out vigorously.

As a use of EPDM, for example, it is known to use ethylene.propylene.diene copolymer rubber (EPDM) as a rubber component of a composition for forming a hose (Patent Document 3). In a use in which a hose is used, for example automobiles, use in a cold area is assumed, and hence rubber characteristics (such as rubber elasticity) for low temperature as well as mechanical properties (such as tensile strength) for room temperature are required.

As a method for improving the low-temperature flexibility and heat aging resistance of ethylene.propylene.diene copolymer rubber (EPDM), an ethylene.α-olefin.non-conjugated polyene copolymer is proposed which uses a $C_4$-$C_{10}$ α-olefin as an α-olefin and which has an excellent randomness of ethylene and an α-olefin (Patent Document 4). It is described in Example 4 of Patent Document 4 that an ethylene 1-butene ENB copolymer was obtained, having a B value of 1.12 at maximum, wherein the B value is an index indicating whether randomness is acceptable or not, and is represented by the following equation.

$$B \text{ value} = [EX]/(2[E] \times [X]) \tag{i}$$

(wherein [E] and [X] represent a mole fraction of the ethylene and $C_4$-$C_{20}$ α-olefin respectively in an ethylene.α-olefin.non-conjugated polyene copolymer; and [EX] represents an ethylene.$C_4$-$C_{20}$ α-olefin diad chain fraction.)

In another case, it is disclosed in the examples of Patent Document 5 that an ethylene.propylene.ENB copolymer having a B value of 1.11 to 1.24 was obtained using a specific transition metal compound (bridged metallocene compound), wherein the B value is indicative of randomness (but is somewhat different in definition from the B value described in Patent Document 2). In Patent Document 5, however, the mechanical properties of the ethylene.propylene.ENB copolymer are not described.

$$[B \text{ value} = (c+d)/[2 \times a \times (e+f)] \tag{IV}$$

(wherein a, e, and f are an ethylene mole fraction, an α-olefin mole fraction, and a non-conjugated polyene mole fraction respectively of the ethylene.α-olefin.non-conjugated polyene copolymer; c is an ethylene-α-olefin diad mole fraction; and d is an ethylene-non-conjugated polyene diad mole fraction.)

Olefin-based thermoplastic elastomers are lightweight and easy to recycle, and hence are widely used as thermoplastic elastomers of an energy saving and resources saving type, particularly as substitutes for vulcanized rubbers, for automobile parts such as hoses, pipes, and boots (blow molded articles) for automobiles, and the like (for example, Patent Documents 6 and 7).

However, these automobile parts always require weight reduction for fuel consumption improvement, whereas thermoplastic elastomers used contain a large amount of filler, tending to have a large specific gravity, and have been inhibiting weight reduction for parts. In addition, these automobile parts are used at positions in contact with lubricating oil, grease, and the like, but, because olefin-based thermoplastic elastomers generally have a low oil resistance against paraffin-based process oil, these automobile parts obtained including the olefin-based thermoplastic elastomers also have a low oil resistance and require further improvement.

RELATED ART DOCUMENTS

Patent Documents

Patent Document 1: JP-A No. 2001-294714
Patent Document 2: JP-A No. 2011-202136
Patent Document 3: JP-A No. H09-67485
Patent Document 4: JP-A No. H09-71617

Patent Document 5: WO2009/081794
Patent Document 6: JP-A No. 2001-294714
Patent Document 7: JP-A No. 2011-202136

SUMMARY OF INVENTION

Technical Problem

To solve the aforementioned problem, the present invention (1) has been made, an object of which is to provide a thermoplastic elastomer composition capable of providing molded articles that are lightweight, have a better oil resistance than those provided by conventional cross-linked thermoplastic elastomers, and have hardness and mechanical properties such as tensile strength and tensile elongation that are equal to or superior to those provided by conventional cross-linked thermoplastic elastomers.

Another object is to provide a molded product obtained including the thermoplastic elastomer composition and having a better oil resistance, particularly automobile parts such as hoses, pipes, and boots (blow molded articles) for automobiles.

In addition, a problem of the present invention (2) is to provide an ethylene.α-olefin.non-conjugated polyene copolymer that, compared with previously proposed ethylene.α-olefin.non-conjugated polyene copolymers, further has a lower compression set at low temperature, and that has flexibility and has an excellent balance between low-temperature rubber elasticity and room temperature tensile strength.

Considering the possibility that hoses are used also in a cold area, hoses having both low-temperature properties and mechanical properties are desired. For example, it is known that the use of a hose-forming composition including EPDM with a lowered ethylene content improves the low-temperature properties of the obtained hose, but that its tensile strength is decreased.

Another problem of the present invention (2) is to provide: a composition for forming hoses that is capable of forming a hose that has excellent low-temperature properties and mechanical properties; and a hose formed from the composition.

In addition, an object of the present invention (2) is to provide a thermoplastic elastomer composition capable of providing molded articles that are lightweight, have a better oil resistance than those provided by conventional cross-linked thermoplastic elastomers, and have hardness and mechanical properties such as tensile strength and tensile elongation that are equal to or superior to those provided by conventional cross-linked thermoplastic elastomers. Further, another object is to provide a molded product that is obtained including the thermoplastic elastomer composition and that has a better oil resistance, particularly automobile parts such as hoses and boots (blow molded articles) for automobiles.

Solution to Problem

The present inventors have made intensive studies to solve the aforementioned problems. As a result, they have found that the problems can be solved by a thermoplastic elastomer composition which is obtained by dynamically cross-linking a mixture containing a crystalline olefin polymer, a specific ethylene.α-olefin.non-conjugated polyene copolymer, and a phenol resin-based cross-linking agent, and have come to complete the present invention (1).

A thermoplastic elastomer composition according to the present invention (1) (herein also referred to as composition (I)) is obtained by dynamically cross-linking a mixture containing a crystalline olefin polymer (A), an ethylene.α-olefin (C$_4$-C$_{20}$).non-conjugated polyene copolymer (1B) satisfying the undermentioned requirements (1) and (2), and a phenol resin-based cross-linking agent (C).

(1) A B value represented by the following equation (i) is 1.20 to 1.80:

$$B\ value = ([EX]+2[Y])/[2\times[E]\times([X]+[Y])] \qquad (i),$$

wherein [E], [X], and [Y] represent a mole fraction of structural units derived from ethylene, a mole fraction of structural units derived from a C$_4$-C$_{20}$ α-olefin, and a mole fraction of structural units derived from a non-conjugated polyene respectively, and [EX] represents a diad chain fraction of the structural units derived from the ethylene—the structural units derived from the C$_4$-C$_{20}$ α-olefin.

(2) In the copolymer (1B), the molar ratio of the structural units derived from the ethylene to the structural units derived from the α-olefin (C$_4$-C$_{20}$) is 40/60 to 90/10.

The α-olefin of the ethylene.α-olefin.non-conjugated polyene copolymer (1B) is preferably 1-butene.

Preferably, the mixture further includes 2 to 100 parts by weight of a softener (D) relative to 100 parts by weight of a total of the crystalline olefin polymer (A) and the copolymer (1B).

The phenol resin-based cross-linking agent (C) is preferably a halogenated phenol resin-based cross-linking agent.

Preferably, the mixture contains the crystalline olefin polymer (A) and the ethylene.α-olefin.non-conjugated polyene copolymer (1B) at a weight ratio of (A)/(1B)=90/10 to 10/90, and contains 0.1 to 20 parts by weight of the phenol resin-based cross-linking agent (C) relative to 100 parts by weight of the ethylene.α-olefin.non-conjugated polyene copolymer (1B).

Molded articles according to the present invention (1) are obtained comprising the thermoplastic elastomer composition according to the present invention (1).

Automobile parts of the present invention (1) are characterized by being obtained comprising the thermoplastic elastomer composition according to the present invention (1).

Automobile hoses of the present invention (1) are obtained comprising the thermoplastic elastomer composition according to the present invention (1).

Automobile boots of the present invention (1) are obtained comprising the thermoplastic elastomer composition according to the present invention (1).

A method for producing the thermoplastic elastomer composition (I) according to the present invention includes the step of dynamically cross-linking a mixture containing a crystalline olefin polymer (A), the ethylene.α-olefin (C$_4$-C$_{20}$).non-conjugated polyene copolymer (1B), and a phenol resin-based cross-linking agent (C).

The present inventors have made intensive studies to solve the aforementioned problems. As a result, they have found a specific ethylene.α-olefin.non-conjugated polyene copolymer that, compared with previously proposed ethylene.α-olefin.non-conjugated polyene copolymers, further has a lower compression set at low temperature and that has flexibility and has an excellent balance between low-temperature rubber elasticity and room temperature tensile strength, and a composition (herein also referred to as composition (IIA)) containing the copolymer, and have come to complete the present invention (2).

They have also found that the use of the specific ethylene.α-olefin.non-conjugated polyene copolymer can provide a composition (herein also referred to as composition (IIB)) for forming hoses which is capable of forming hoses having an excellent low temperature characteristics and mechanical properties, and provide hoses formed from the composition, and have come to complete the present invention (2).

They have further found that a thermoplastic elastomer composition (herein also referred to as composition (IIC)) obtained by dynamically cross-linking a mixture containing a crystalline olefin polymer, a specific ethylene.α-olefin.non-conjugated polyene copolymer, and a phenol resin-based cross-linking agent can provide molded articles that have a better oil resistance than those provided by conventional cross-linked thermoplastic elastomers and have hardness and mechanical properties such as tensile strength and tensile elongation that are equal to or superior to those provided by conventional cross-linked thermoplastic elastomers, and have also found that the thermoplastic elastomer composition (IIC) can provide molded articles having a better oil resistance, in particular, automobile parts such as hoses and boots (blow molded articles) for automobiles, whereby they have come to complete the present invention (2).

The present invention (2) relates to, for example, the following [1] to [18].

[1]
An ethylene.α-olefin.non-conjugated polyene copolymer (2B) comprising a structural unit derived from ethylene [A], a structural unit derived from a $C_4$-$C_{20}$ α-olefin [B] and a structural unit derived from a non-conjugated polyene [C], and satisfying the following (1) to (4):

(1) the molar ratio ([A]/[B]) of the structural units derived from the ethylene [A] to the structural units derived from the α-olefin [B] is 40/60 to 90/10;

(2) the content of the structural units derived from the non-conjugated polyene [C] is 0.1 to 6.0 mol % based on a total of the structural units of [A], [B], and [C] as 100 mol %;

(3) the Mooney viscosity $ML_{(1+4)}125°$ C. at 125° C. is more than 100 and not more than 200; and (4) the B value represented by the following equation (i) is 1.20 to 1.80:

$$B \text{ value}=([EX]+2[Y])/[2\times[E]\times([X]+[Y])] \quad (i),$$

[wherein [E], [X], and [Y] represent a mole fraction of the ethylene [A], the $C_4$-$C_{20}$ α-olefin [B], and the non-conjugated polyene [C] respectively, and [EX] represents an ethylene [A]-$C_4$-$C_{20}$ α-olefin [B] diad chain fraction].

[2]
The ethylene.α-olefin.non-conjugated polyene copolymer (2B) according to [1], wherein the $C_4$-$C_{20}$ α-olefin [B] is 1-butene.

[3]
The ethylene.α-olefin.non-conjugated polyene copolymer (2B) according to [1] or [2], wherein the ethylene.α-olefin.non-conjugated polyene copolymer is obtained by copolymerizing ethylene, a $C_4$-$C_{20}$ α-olefin, and a non-conjugated polyene in the presence of an olefin polymerization catalyst containing:

(a) a transition metal compound represented by the following general formula [VII]; and (b) at least one compound selected from
(b-1) organometallic compounds,
(b-2) organoaluminum oxy-compounds, and
(b-3) compounds which react with the transition metal compound (a) to form an ion pair.

[Chem. 1]

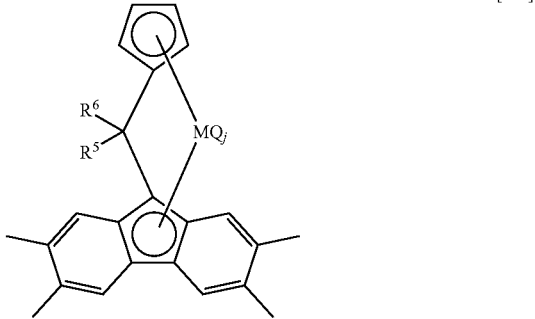

[VII]

(wherein M is a titanium atom, a zirconium atom, or a hafnium atom;

$R^5$ and $R^6$ are substituted aryl groups wherein one or more of the hydrogen atoms of the aryl group are substituted by an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group may have a substituent selected from $C_1$-$C_{20}$ hydrocarbon groups, silicon-containing groups, nitrogen-containing groups, oxygen-containing groups, halogen atoms and halogen-containing groups other than the electron-donating substituents; and wherein when the substituted aryl group has a plurality of the substituents, each of the substituents may be the same or different;

Q is selected in the same or different combination from halogen atoms, $C_1$-$C_{20}$ hydrocarbon groups, anionic ligands, and neutral ligands capable of being coordinated with alone electron pair; and j is an integer of 1 to 4.)

[4]
A composition containing the ethylene.α-olefin.non-conjugated polyene copolymer (2B) according to any one of [1] to [3].

[5]
A molded article formed by cross-linking treatment of the composition according to [4].

[6]
A composition for forming a hose, containing the ethylene.α-olefin.non-conjugated polyene copolymer (2B) according to any one of [1] to [3].

[7]
A hose having a layer formed by cross-linking treatment of the composition for forming a hose according to [6].

[8]
The hose according to [7], wherein the hose is used for any of uses for automobiles, motorbikes, industrial machinery, construction machinery or agricultural machinery.

[9]
A thermoplastic elastomer composition obtained by dynamically cross-linking a mixture containing
a crystalline olefin polymer (A),
an ethylene.α-olefin.non-conjugated polyene copolymer (2B), and
a phenol resin-based cross-linking agent (C),
wherein the ethylene.α-olefin.non-conjugated polyene copolymer (2B) is the ethylene.α-olefin.non-conjugated polyene copolymer according to any one of [1] to [3].

[10]

The thermoplastic elastomer composition according to [9], wherein the mixture further includes 2 to 100 parts by weight of a softener (D) relative to 100 parts by weight of a total of the crystalline olefin polymer (A) and the copolymer (2B).

[11]

The thermoplastic elastomer composition according to [9] or [10], wherein the phenol resin-based cross-linking agent (C) is a halogenated phenol resin-based cross-linking agent.

[12]

The thermoplastic elastomer composition according to any one of [9] to [11], comprising the crystalline olefin polymer (A) and the ethylene.α-olefin.non-conjugated polyene copolymer (2B) at a mass ratio of (A)/(2B)=90/10 to 10/90, and comprising 0.1 to 20 parts by weight of the phenol resin-based cross-linking agent (C) relative to 100 parts by weight of the ethylene.α-olefin.non-conjugated polyene copolymer (2B).

[13]

A molded article obtained comprising the thermoplastic elastomer composition according to any one of [9] to [12].

[14]

An automobile part obtained comprising the thermoplastic elastomer composition according to any one of [9] to [12].

[15]

An automobile hose obtained comprising the thermoplastic elastomer composition according to any one of [9] to [12].

[16]

An automobile boot obtained comprising the thermoplastic elastomer composition according to any one of [9] to [12].

[17]

A method for producing an ethylene.α-olefin.non-conjugated polyene copolymer (2B), comprising the step of copolymerizing ethylene, a $C_4$-$C_{20}$ α-olefin, and a non-conjugated polyene in the presence of an olefin polymerization catalyst containing:

(a) a transition metal compound represented by the general formula [VII]; and (b) at least one compound selected from (b-1) organometallic compounds, (b-2) organoaluminum oxy-compounds, and (b-3) compounds which react with the transition metal compound (a) to form an ion pair.

[18]

A method for producing a thermoplastic elastomer composition, comprising the step of dynamically cross-linking a mixture containing a crystalline olefin polymer (A), the ethylene.α-olefin ($C_4$-$C_{20}$).non-conjugated polyene copolymer (2B), and a phenol resin-based cross-linking agent (C).

Advantageous Effects of Invention

The present invention (1) makes it possible to obtain a thermoplastic elastomer composition capable of providing molded articles that are lightweight, have a better oil resistance than those provided by conventional cross-linked thermoplastic elastomers, and have hardness and mechanical properties such as tensile strength and tensile elongation that are equal to or superior to those provided by conventional cross-linked thermoplastic elastomers.

Because the ethylene.α-olefin.non-conjugated polyene copolymer according to the present invention (2) has a lower compression set at low temperature, has flexibility, and has an excellent balance between low-temperature rubber elasticity and room temperature tensile strength, compositions containing the ethylene.α-olefin.non-conjugated polyene copolymer can exert such characteristics and be desirably used for various uses.

The present invention (2) can provide: a composition for forming hoses that is capable of forming hoses having excellent low temperature properties such as rubber elasticity at low temperature and excellent mechanical properties such as tensile strength at room temperature; and a hose formed from the composition.

The present invention (2) makes it possible to obtain a thermoplastic elastomer composition capable of providing molded articles that are lightweight, have a better oil resistance than those provided by conventional cross-linked thermoplastic elastomers, and have hardness and mechanical properties such as tensile strength and tensile elongation that are equal to or superior to those provided by conventional cross-linked thermoplastic elastomers.

DESCRIPTION OF EMBODIMENTS

<Crystalline Olefin Polymer (A)>

The crystalline olefin polymer (A) (herein also referred to as polymer (A)) is not limited to a particular one as long as it is a crystalline polymer obtained from an olefin, and is preferably a polymer composed of a crystalline high molecular weight solid product obtained by polymerizing one or more monoolefins either by a high-pressure method or a low-pressure method. Examples of such polymers include isotactic monoolefin polymers, syndiotactic monoolefin polymers, and the like.

The polymer (A) may be obtained by synthesis by a conventionally known method or may be commercially available.

The polymer (A) may be used singly or in combination of two or more kinds thereof.

Examples of monoolefins serving as raw materials of the polymer (A) include ethylene, propylene, 1-butene, 1-pentene, 1-hexene, 1-octene, 1-decene, 2-methyl-1-propene, 3-methyl-1-pentene, 4-methyl-1-pentene, 5-methyl-1-hexene, and the like. These olefins may be used singly or in mixture of two or more kinds thereof.

Among the polymers (A), propylene-based (co)polymers that are propylene homopolymers or propylene copolymers obtained from monoolefins which are mostly propylene are preferable in terms of heat resistance and oil resistance. In regard to the propylene copolymers, the content of structural units derived from propylene is preferably 40 mol % or more, more preferably 50 mol % or more, and monoolefins as structural units derived from monomers other than propylene are preferably the aforementioned monoolefins other than propylene, more preferably ethylene or butene.

The polymerization manner may be a random type or a block type, and any polymerization manner may be adopted as long as a crystalline resinoid product is obtained.

The crystalline olefin polymer (A) has an MFR (ASTM D1238-65T, 230° C., 2.16 kg load) of usually 0.01 to 100 (g/10 minutes), preferably 0.05 to 50 (g/10 minutes).

The polymer (A) has a melting point (Tm) of usually 100° C. or more, preferably 105° C. or more, as determined by differential scanning calorimetry (DSC). Differential scanning calorimetry is carried out in the following manner, for example. About 5 mg of sample is loaded into a dedicated aluminum pan, and, using the DSC Pyris 1 or DSC 7 made by PerkinElmer Co., Ltd., it is heated from 30° C. to 200° C. at 320° C./min, held at 200° C. for 5 minutes, cooled from 200° C. to 30° C. at 10° C./min, further held at 30° C. for 5 minutes, and then heated at 10° C./min, the endothermic curve of which the melting point is determined from. If multiple peaks are detected during DSC measurement, the peak temperature detected on the highest temperature side is defined as a melting point (Tm).

The polymer (A) plays a role of enhancing the fluidity and heat resistance of a thermoplastic elastomer composition.

<Ethylene.α-Olefin.Non-Conjugated Polyene Copolymer (1B)>

The ethylene.α-olefin.non-conjugated polyene copolymer (1B) used in the present invention (1) (herein also referred to as copolymer (1B)) is an ethylene.α-olefin.non-conjugated polyene copolymer containing a structural unit derived from ethylene, a structural unit derived from at least one $C_4$-$C_{20}$ α-olefin, and a structural unit derived from at least one non-conjugated polyene;

(1) a B value represented by the following equation (i) is 1.20 to 1.80:

$$B\ value=([EX]+2[Y])/[2\times[E]\times([X]+[Y])] \quad (i)$$

(wherein [E], [X], and [Y] represent a mole fraction of structural units derived from ethylene, a mole fraction of structural units derived from a $C_4$-$C_{20}$ α-olefin, and a mole fraction of structural units derived from a non-conjugated polyene respectively, and [EX] represents a diad chain fraction of structural units derived from ethylene-structural units derived from a $C_4$-$C_{20}$ α-olefin); and (2) in the copolymer (1B), the molar ratio of structural units derived from ethylene to structural units derived from α-olefin ($C_4$-$C_{20}$) is 40/60 to 90/10.

Examples of $C_4$-$C_{20}$ α-olefins include: straight-chain α-olefins having no side chain, such as 1-butene ($C_4$), 1-nonene ($C_9$), 1-decene ($C_{10}$), 1-nonadecene ($C_{19}$), 1-eicosene ($C_{20}$); and α-olefins having a side chain, such as 4-methyl-1-pentene, 9-methyl-1-decene, 11-methyl-1-dodecene, and 12-ethyl-1-tetradecene, which have a side chain. These α-olefins may be used singly or in combination of two or more kinds thereof. Among these, $C_4$-$C_{10}$ α-olefins are preferable, 1-butene, 1-hexene, and 1-octene are more preferable, and 1-butene is still more preferable particularly because it can enhance the oil resistance, in particular oil resistance at relatively high temperature, flexibility, and shock resistance of the obtained molded article, as well as because of the effects of the present invention.

Examples of non-conjugated polyenes include chain non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydrindene, 5-vinyl-2-norbornene, 5-ethylidene-2-norbornene, 5-methylene-2-norbornene, 5-isopropylidene-2-norbornene, and 6-chloromethyl-5-isopropenyl-2-norbornene; trienes such as 2,3-diisopropylidene-5-norbornene, 2-ethylidene-3-isopropylidene-5-norbornene, 2-propenyl-2,5-norbornanediene, 1,3,7-octatriene, 1,4,9-decatriene, 4,8-dimethyl-1,4,8-decatriene, and 4-ethylidene-8-methyl-1,7-nonadiene. These non-conjugated polyenes may be used singly or in combination of two or more kinds thereof. Among these, cyclic non-conjugated dienes such as 1,4-hexadiene; 5-ethylidene-2-norbornene; 5-vinyl-2-norbornene; and mixtures of 5-ethylidene-2-norbornene and 5-vinyl-2-norbornene are preferable, and 5-ethylidene-2-norbornene and 5-vinyl-2-norbornene are more preferable.

Examples of the copolymers (1B) include ethylene.1-butene.1,4-hexadiene copolymer, ethylene.1-pentene.1,4-hexadiene copolymer, ethylene.1-hexene.1,4-hexadiene copolymer, ethylene.1-heptene.1,4-hexadiene copolymer, ethylene.1-octene.1,4-hexadiene copolymer, ethylene.1-nonene.1,4-hexadiene copolymer, ethylene.1-decene.1,4-hexadiene copolymer, ethylene.1-butene.1-octene.1,4-hexadiene copolymer, ethylene.1-butene.5-ethylidene-2-norbornene copolymer, ethylene.1-pentene.5-ethylidene-2-norbornene copolymer, ethylene.1-hexene.5-ethylidene-2-norbornene copolymer, ethylene.1-heptene.5-ethylidene-2-norbornene copolymer, ethylene.1-octene.5-ethylidene-2-norbornene copolymer, ethylene.1-nonene.5-ethylidene-2-norbornene copolymer, ethylene.1-decene.5-ethylidene-2-norbornene copolymer, ethylene.1-butene.1-octene.5-ethylidene-2-norbornene copolymer, ethylene.1-butene.5-ethylidene-2-norbornene.5-vinyl-2-norbornene copolymer, ethylene.1-pentene.5-ethylidene-2-norbornene.5-vinyl-2-norbornene copolymer, ethylene.1-hexene.5-ethylidene-2-norbornene.5-vinyl-2-norbornene copolymer, ethylene.1-heptene.5-ethylidene-2-norbornene.5-vinyl-2-norbornene copolymer, ethylene.1-octene.5-ethylidene-2-norbornene.5-vinyl-2-norbornene copolymer, ethylene.1-nonene.5-ethylidene-2-norbornene.5-vinyl-2-norbornene copolymer, ethylene.1-decene.5-ethylidene-2-norbornene.5-vinyl-2-norbornene copolymer, ethylene.1-butene.1-octene.5-ethylidene-2-norbornene.5-vinyl-2-norbornene copolymer, and the like.

The copolymer (1B) may be used singly or in combination of two or more kinds thereof.

The copolymer (1B) has a B value represented by the aforementioned equation (i) of (1) in the range of 1.20 or more, preferably 1.20 to 1.80, particularly preferably 1.22 to 1.40.

The copolymer (1B) having a B value of less than 1.20 may cause a large compression set, and may fail to provide a thermoplastic elastomer composition having an excellent balance between rubber elasticity and tensile strength.

Here, the B value is an index that is indicative of randomness of a copolymerization monomer sequence distribution in the copolymer (1B), and [E], [X], [Y], and [EX] in the equation (i) can be determined by measuring $^{13}C$ NMR spectra and being based on the reports by J. C. Randall [Macromolecules, 15, 353 (1982)], J. Ray [Macromolecules, 10, 773 (1977)], and the like.

In the ethylene.α-olefin.non-conjugated polyene copolymer (1B), the molar ratio ([A]/[B]) of structural units derived from ethylene [A] to structural units derived from the α-olefin [B] as in (2) is in the range of 40/60 to 90/10. The lower limit of the molar ratio [A]/[B] is preferably 45/55, more preferably 50/50, particularly preferably 55/45. The upper limit of the molar ratio [A]/[B] is preferably 80/20, more preferably 75/25, still more preferably 70/30, particularly preferably 65/35.

When the molar ratio of structural units derived from ethylene [A] to structural units derived from α-olefin [B] is in the aforementioned range, a thermoplastic elastomer composition (I) that has oil resistance, in particular excellent oil resistance at relatively high temperature, and has an excellent balance between rubber elasticity and room temperature tensile strength can be obtained.

The copolymer (1B) desirably satisfies at least one of the following requirements (3) and (4).

(3) The copolymer (1B) has a Mooney viscosity $ML_{(1+4)}(125°\ C.)$ at 125° C. which is not limited to a particular value as long as it achieves the effects of the present invention and which is in the range of preferably 5 to 100, more preferably 20 to 95, still more preferably 50 to 90, as determined by measurement in accordance with JIS K6300 (1994).

When the Mooney viscosity is in the aforementioned range, the copolymer (1B) tends to exhibit a favorable aftertreatment quality (suitability for ribbon handling) and have excellent rubber properties.

(4) In the copolymer (1B), the content of structural units derived from a non-conjugated polyene [C] is in the range of preferably 0.1 to 6.0 mol %, more preferably 0.5 to 4.0 mol %, still more preferably 0.5 to 3.5 mol %, particularly preferably 0.5 to 3.0 mol %, relative to a total of the structural units [A], [B], and [C] as 100 mol %. When the content of structural units derived from the non-conjugated polyene [C] is in the aforementioned range, an ethylene-based copolymer having an adequate cross-linkability and flexibility tends to be obtained.

<Ethylene.α-Olefin.Non-Conjugated Polyene Copolymer (2B)>

The ethylene.α-olefin.non-conjugated polyene copolymer (2B) according to the present invention (2) (herein also referred to as copolymer (2B)) contains a structural unit derived from ethylene [A], a structural unit derived from a $C_4$-$C_{20}$ α-olefin [B], and a structural unit derived from a non-conjugated polyene [C], and satisfies the undermentioned (1) to (4). Such a specific ethylene.α-olefin.non-conjugated polyene copolymer is also referred to as an "ethylene-based copolymer 2A."

In the present inventions (1) and (2), one kind or two or more kinds of each of the $C_4$-$C_{20}$ α-olefin [B] and the non-conjugated polyene [C] may be used. The copolymer (1B) or (2B) contains a structural unit derived from ethylene [A], a structural unit derived from at least one kind of $C_4$-$C_{20}$ α-olefin [B], and a structural unit derived from at least one kind of non-conjugated polyene [C].

(1) The molar ratio ([A]/[B]) of structural units derived from ethylene [A] to structural units derived from an α-olefin [B] is 40/60 to 90/10;

(2) the content of structural units derived from a non-conjugated polyene [C] is 0.1 to 6.0 mol % based on a total of the structural units [A], [B], and [C] as 100 mol %;

(3) a Mooney viscosity $ML_{(1+4)}125°$ C. at 125° C. is more than 100 and not more than 200; and (4) the B value represented by the aforementioned equation (i) is 1.20 or more:

The equation (i) is the same as the equation (i) for the copolymer (1B).

For examples of $C_4$-$C_{20}$ α-olefins [B], the $C_4$-$C_{20}$ α-olefins illustrated for the copolymer (1B) can be referred to. As α-olefins [B] in the copolymer (2B), $C_4$-$C_{10}$ α-olefins are preferable, in particular 1-butene, 1-hexene, and 1-octene are preferable, and in particular 1-butene is preferable.

An ethylene.propylene.non-conjugated polyene copolymer wherein the α-olefin is propylene tends to have an insufficient rubber elasticity at low temperature, and its uses may be limited. On the contrary, the copolymer (2B) has a structural unit derived from a $C_4$-$C_{20}$ α-olefin [B], and hence has an excellent rubber elasticity at low temperature.

For examples of non-conjugated polyenes [C], the non-conjugated polyenes illustrated for the copolymer (1B) can be referred to. As non-conjugated polyenes [C] in the copolymer (2B), chain non-conjugated dienes such as 1,4-hexadiene and cyclic non-conjugated dienes such as 5-ethylidene-2-norbornene, 5-ethylidene-2-norbornene, and 5-vinyl-2-norbornene are preferable, and, above all, cyclic non-conjugated dienes are preferable, and 5-ethylidene-2-norbornene and 5-vinyl-2-norbornene are particularly preferable.

For examples of copolymers (2B), the examples illustrated for the copolymer (1B) can be referred to. One kind or two or more kinds of copolymers (2B) are used, as necessary.

In the copolymer (2B), the molar ratio ([A]/[B]) of structural units derived from ethylene [A] to structural units derived from an α-olefin [B] as in (1) is the same as the molar ratio ([A]/[B]) in the requirement (2) for the copolymer (1B), covering the same preferable ranges of the molar ratio.

When the molar ratio of structural units derived from ethylene [A] to structural units derived from an α-olefin [B] in the copolymer (2B) is in the aforementioned range, an ethylene-based copolymer having an excellent balance between low temperature rubber elasticity and room temperature tensile strength can be obtained.

In the copolymer (2B), the content of structural units derived from a non-conjugated polyene [C] as in (2) is the same as the content in the requirement (4) for the copolymer (1B), covering the same preferable ranges.

When the content of structural units derived from a non-conjugated polyene [C] in the copolymer (2B) is in the aforementioned range, an ethylene-based copolymer having an adequate cross-linkability and flexibility is obtained.

The copolymer (2B) has a Mooney viscosity $ML_{(1+4)}125°$ C. at 125° C. as in (3) in the range of more than 100 and not more than 200, preferably more than 100 to not more than 150, particularly preferably more than 100 and not more than 120.

The Mooney viscosity in the aforementioned range is preferable because a composition (2) containing the copolymer (2B) has favorable sealing properties and low temperature properties.

The B value of the copolymer (2B) as in (4) is the same as the B value in the requirement (1) for the copolymer (1B), covering the same preferable ranges.

Among the copolymers (2B), a copolymer having a B value of less than 1.20 may cause a large compression set at low temperature, and may fail to provide an ethylene-based copolymer having an excellent balance between rubber elasticity at low temperature and tensile strength at room temperature.

Here, the B value is an index that is indicative of randomness of a copolymerization monomer sequence distribution in the copolymer (2B), as detailed for the copolymer (1B). The molar amount of structural units derived from ethylene [A], that of structural units derived from an α-olefin [B], and that of structural units derived from a non-conjugated polyene [C] in the copolymers (1B) and (2B) can be determined by measurement of intensity using a $^1$H-NMR spectrometer.

(Method for Producing Copolymers (1B) and (2B))

The copolymers (1B) and (2B) can be obtained by the following production method.

Specifically, the copolymers can be produced by copolymerizing ethylene, a $C_4$-$C_{20}$ α-olefin, and a non-conjugated polyene in the presence of an olefin polymerization catalyst including (a-3) a transition metal compound (hereinafter may also be referred to as "bridged metallocene compound") represented by the undermentioned general formula [VII] and (b) at least one compound that is selected from the group consisting of (b-1) organometallic compounds, (b-2) organoaluminum oxy-compounds, and (b-3) compounds which react with the transition metal compound (a-3) to form an ion pair. When ethylene, an α-olefin having 4 or more carbon atoms, and a non-conjugated polyene are copolymerized in the presence of an olefin polymerization catalyst including the bridged metallocene compound, the advantage is obtained that the produced copolymers (1B) and (2B) can have an even higher molecular weight.

[Chem. 2]

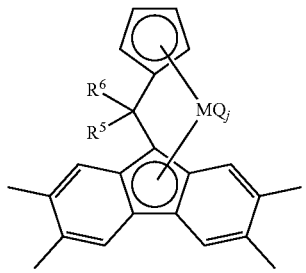

[VII]

M, $R^5$, $R^6$, Q, and j in the formula [VII] will be described below.

M is a titanium atom, a zirconium atom, or a hafnium atom, and is preferably a hafnium atom.

$R^5$ and $R^6$ are substituted aryl groups wherein one or more of the hydrogen atoms of the aryl group are substituted by an electron-donating substituent having a substituent constant σ of −0.2 or less in the Hammett's rule; wherein when the substituted aryl group has a plurality of the electron-donating substituents, each of the electron-donating substituents may be the same or different; wherein the substituted aryl group optionally have a substituent selected from the group consisting of $C_1$-$C_{20}$ hydrocarbon groups, silicon-containing groups, nitrogen-containing groups, oxygen-containing groups, halogen atoms, and halogen-containing groups other than the electron-donating substituents; and wherein when the substituted aryl group has a plurality of the substituents, each of the substituents may be the same or different (hereinafter referred to as "electron-donating-group-containing substituted aryl group(s)").

Examples of aryl groups include substituents derived from aromatic compounds, such as phenyl groups, 1-naphthyl groups, 2-naphthyl groups, anthracenyl groups, phenanthrenyl groups, tetracenyl groups, chrysenyl groups, pyrenyl groups, indenyl groups, azulenyl groups, pyrrolyl groups, pyridyl groups, furanyl groups, and thiophenyl groups, and the like. Among the aryl groups, phenyl groups or 2-naphthyl groups are preferable. Examples of the aromatic compounds include aromatic hydrocarbons and heterocyclic aromatic compounds, such as benzene, naphthalene, anthracene, phenanthrene, tetracene, chrysene, pyrene, indene, azulene, pyrrole, pyridine, furan, and thiophene, and the like.

The electron-donating group having a substituent constant σ in the Hammett's rule of not more than −0.2 is defined and illustrated as follows. The Hammett's rule is an empirical rule proposed by L. P. Hammett in 1935 in order to quantitatively discuss an influence of a substituent on a reaction or an equilibrium of a benzene derivative, and the validity of this rule is widely accepted today. As the substituent constant determined by the Hammett's rule, there are σp in the case of substitution at the para position of a benzene ring and σm in the case of substitution at the meta position of a benzene ring, and these values can be found in a large amount of general literature. For example, in the literature [Chem. Rev., 91, 165 (1991)] by Hansch and Taft, a detailed description of an extremely wide range of substituents has been made. However, values of σp and σm described in these literatures sometimes slightly vary depending upon the literature even in the case of the same substituents. In order to avoid confusion caused by such circumstances, the values described in Table 1 (pp. 168-175) of the literature [Chem. Rev., 91, 165 (1991)] by Hansch and Taft are defined as the substituent constants σp and σm of the Hammett's rule in the present invention, as long as the substituents are described. In the present invention, the electron-donating group having a substituent constant σ in the Hammett's rule of not more than −0.2 is an electron-donating group having σp of not more than −0.2 in the case where the electron-donating group substitutes at the para position (4-position) of a phenyl group, and is an electron-donating group having σm of not more than −0.2 in the case where the electron-donating group substitutes at the meta position (3-position) of a phenyl group. Further, in a case where the electron-donating group substitutes at the ortho position (2-position) of a phenyl group or in the case where it substitutes at an arbitrary position of an aryl group other than a phenyl group, the electron-donating group is an electron-donating group having σp of not more than −0.2.

Examples of the electron-donating groups having a substituent constant σp or σm in the Hammett's rule of not more than −0.2 include nitrogen-containing groups, such as p-amino group (4-amino group), p-dimethylamino group (4-dimethylamino group), p-diethylamino group (4-diethylamino group) and m-diethylamino group (3-diethylamino group), oxygen-containing groups, such as p-methoxy group (4-methoxy group) and p-ethoxy group (4-ethoxy group), tertiary hydrocarbon groups, such as p-t-butyl group (4-t-butyl group), and silicon-containing groups, such as p-trimethylsiloxy group (4-trimethylsiloxy group). The electron-donating groups defined in the present invention whose substituent constant σp or σm in the Hammett's rule is not more than −0.2 are not limited to the substituents described in Table 1 (pp. 168-175) of the literature [Chem. Rev., 91, 165 (1991)] by Hansch and Taft. Substituents whose substituent constant σp or σm measured based on the Hammett's rule will be within the above range are included in the electron-donating groups defined in the present invention whose substituent constant σp or σm in the Hammett's rule is not more than −0.2, even if the substituents are not described in the above literature. Examples of such substituents include p-N-morpholinyl group (4-N-morpholinyl group) and m-N-morpholinyl group (3-N-morpholinyl group).

When substitution in the electron-donating-group-containing substituted aryl group is made by a plurality of electron-donating substituents, these electron-donating substituents may be the same as or different from each other, and substitution in the electron-donating group-containing substituted aryl group may be made not only by the electron-donating substituent but also by a substituent selected from the group consisting of a $C_1$-$C_{20}$ hydrocarbon group, a silicon-containing group, a nitrogen-containing group, an oxygen-containing group, a halogen atom, and a halogen-containing group, and when substitution in the electron-donating group-containing substituted aryl group is made by a plurality of the substituents, these substituents may be the same as or different from each other. However, the total of the substituent constants σ in the Hammett's rule of the electron-donating substituent and the substituent contained in one substituted aryl group is preferably not more than −0.15. Examples of such substituted aryl groups include m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group), p-methoxy-m,m-dimethylphenyl group (4-methoxy-3,5-dimethylphenyl group), and the like.

Examples of $C_1$-$C_{20}$ hydrocarbon groups that the electron-donating-group-containing substituted aryl groups may contain include $C_1$-$C_{20}$ alkyl groups, $C_3$-$C_{20}$ cyclic saturated hydrocarbon groups, $C_2$-$C_{20}$ chain unsaturated hydrocarbon groups, and $C_3$-$C_{20}$ cyclic unsaturated hydrocarbon groups, and the like. In addition, when a plurality of $C_1$-$C_{20}$ hydrocarbon groups are contained and when the $C_1$-$C_{20}$ hydrocarbon groups are adjacent, they may be bound together to form a ring. Examples of groups in this case include $C_1$-$C_{20}$ alkylene groups, $C_6$-$C_{20}$ arylene groups, and the like.

Examples of $C_1$-$C_{20}$ alkyl groups include straight-chain saturated hydrocarbon groups such as methyl groups, ethyl groups, n-propyl groups, n-butyl groups, n-pentyl groups, n-hexyl groups, n-heptyl groups, n-octyl groups, n-nonyl groups, an n-decanyl groups; branched saturated hydrocarbon groups such as isopropyl groups, isobutyl groups, s-butyl groups, t-butyl groups, t-amyl groups, neopentyl groups, 3-methyl pentyl groups, 1,1-diethyl propyl groups, 1,1-dimethyl butyl groups, 1-methyl-1-propyl butyl groups, 1,1-dipropyl butyl groups, 1,1-dimethyl-2-methyl propyl groups, 1-methyl-1-isopropyl-2-methyl propyl groups, cyclopropyl methyl groups, and the like. The alkyl groups preferably have 1 to 6 carbon atoms.

Examples of $C_3$-$C_{20}$ cyclic saturated hydrocarbon groups include unsubstituted cyclic saturated hydrocarbon groups such as cyclopropyl groups, cyclobutyl groups, cyclopentyl groups, cyclohexyl groups, cycloheptyl groups, cyclooctyl groups, norbornenyl groups, 1-adamantyl groups, and 2-adamantyl groups; groups wherein a hydrogen atom of an unsubstituted cyclic saturated hydrocarbon group is substituted by a $C_1$-$C_{17}$ hydrocarbon group, such as 3-methyl cyclopentyl groups, 3-methyl cyclohexyl groups, 4-methyl cyclohexyl groups, 4-cyclohexyl cyclohexyl groups, and 4-phenyl cyclohexyl groups; and the like. The cyclic saturated hydrocarbon groups preferably have 5 to 11 carbon atoms.

Examples of $C_2$-$C_{20}$ chain unsaturated hydrocarbon groups include alkenyl groups such as ethenyl groups (vinyl groups), 1-propenyl groups, 2-propenyl groups (allyl groups), 1-methylethenyl groups (isopropenyl groups); and alkynyl groups such as ethynyl groups, 1-propynyl groups, and 2-propynyl groups (propargyl groups). The chain unsaturated hydrocarbon groups preferably have 2 to 4 carbon atoms.

Examples of $C_3$-$C_{20}$ cyclic unsaturated hydrocarbon groups include unsubstituted cyclic unsaturated hydrocarbon groups such as cyclopentadienyl groups, norbornyl groups, phenyl groups, naphthyl groups, indenyl groups, azulenyl groups, phenanthryl groups, and anthracenyl groups; groups wherein a hydrogen atom of an unsubstituted cyclic unsaturated hydrocarbon group is substituted by a $C_1$-$C_{15}$ hydrocarbon group, such as 3-methyl phenyl groups (m-tolyl groups), 4-methylphenyl groups (p-tolyl groups), 4-ethylphenyl groups, 4-t-butyl phenyl groups, 4-cyclohexylphenyl groups, biphenylyl groups, 3,4-dimethylphenyl groups, 3,5-dimethylphenyl groups, and 2,4,6-trimethylphenyl groups (mesityl groups); groups wherein a hydrogen atom of a straight-chain hydrocarbon group or branched saturated hydrocarbon group is substituted by a $C_3$-$C_{19}$ cyclic saturated hydrocarbon group or cyclic unsaturated hydrocarbon group, such as benzyl groups and cumyl groups; and the like. The cyclic unsaturated hydrocarbon groups preferably have 6 to 10 carbon atoms.

Examples of $C_1$-$C_{20}$ alkylene groups include methylene groups, ethylene groups, dimethylmethylene groups (isopropylidene groups), ethylmethylene groups, 1-methylethylene groups, 2-methylethylene groups, 1,1-dimethylethylene groups, 1,2-dimethylethylene groups, n-propylene groups, and the like. The arylene groups preferably have 1 to 6 carbon atoms.

Examples of $C_6$-$C_{20}$ arylene groups include o-phenylene groups, m-phenylene groups, p-phenylene groups, 4,4'-biphenylene group, and the like. The alkylene groups preferably have 6 to 12 carbon atoms.

Examples of silicon-containing groups that the electron-donating-group-containing substituted aryl groups may contain include alkylsilyl groups such as trimethylsilyl groups, triethylsilyl groups, t-butyldimethylsilyl groups, and triisopropylsilyl groups; arylsilyl groups such as dimethylphenylsilyl groups, methyldiphenylsilyl groups, and t-butyldiphenylsilyl groups; groups wherein a carbon atom is substituted by a silicon atom in a $C_1$-$C_{20}$ hydrocarbon group, such as pentamethyldisilanyl groups and trimethylsilylmethyl groups; and the like. The alkylsilyl groups preferably have 1 to 10 carbon atoms, and the arylsilyl groups preferably have 6 to 18 carbon atoms.

Examples of nitrogen-containing groups that the electron-donating-group-containing substituted aryl groups may contain include amino groups, nitro groups, and N-morpholinyl groups; and dimethylamino groups, diethylamino groups, dimethylaminomethyl groups, cyano groups, pyrrolidinyl groups, piperidinyl groups, and pyridinyl groups and the like that are groups wherein, in the aforementioned $C_1$-$C_{20}$ hydrocarbon groups or silicon-containing groups, a =CH— structural unit is substituted by a nitrogen atom, a —CH$_2$— structural unit is substituted by a nitrogen atom to which a $C_1$-$C_{20}$ hydrocarbon group has been bonded, or a —CH$_3$ structural unit is substituted by a nitrogen atom to which a $C_1$-$C_{20}$ hydrocarbon group has been bonded or a nitrile atom. As the nitrogen-containing group, a dimethylamino group or an N-morpholinyl group is preferable.

Examples of oxygen-containing groups that the electron-donating-group-containing substituted aryl groups may contain include hydroxyl group; and methoxy group, ethoxy group, t-butoxy group, phenoxy group, trimethylsiloxy group, methoxyethoxy group, hydroxymethyl group, methoxymethyl group, ethoxymethyl group, t-butoxymethyl group, 1-hydroxyethyl group, 1-methoxyethyl group, 1-ethoxyethyl group, 2-hydroxyethyl group, 2-methoxyethyl group, 2-ethoxyethyl group, n-2-oxabutylene group, n-2-oxapentylene group, n-3-oxapentylene group, aldehyde group, acetyl group, propionyl group, benzoyl group, trimethylsilylcarbonyl group, carbamoyl group, methylaminocarbonyl group, carboxyl group, methoxycarbonyl group, carboxymethyl group, ethoxycarboxymethyl group, carbamoylmethyl group, furanyl group, and pyranyl group that are groups wherein in the aforementioned $C_1$-$C_{20}$ hydrocarbon groups, silicon-containing groups, or nitrogen-containing groups, a —CH$_2$- structural unit is substituted by an oxygen atom or a carbonyl group, or a —CH$_3$ structural unit is substituted by an oxygen atom to which a $C_1$-$C_{20}$ hydrocarbon group has been bonded. As the oxygen-containing group, a methoxy group is preferable.

Examples of halogen atoms that the electron-donating-group-containing substituted aryl groups may contain include fluorine, chlorine, bromine and iodine that are Group 17 elements.

Examples of halogen-containing groups that the electron-donating-group-containing substituted aryl groups may contain include trifluoromethyl groups, tribromomethyl group, pentafluoroethyl group, and pentafluorophenyl group and the like that are groups wherein in the aforementioned $C_1$-$C_{20}$ hydrocarbon groups, silicon-containing groups, nitrogen-containing groups, or oxygen-containing groups, a hydrogen atom is substituted by a halogen atom.

Q is an atom, substituent, or ligand selected from the group consisting of halogen atoms, $C_1$-$C_{20}$ hydrocarbon groups, anionic ligands, and neutral ligands capable of being coordinated with a lone electron pair, and when a plurality of Qs are present, they may be the same or different.

Specific examples of halogen atoms and $C_1$-$C_{20}$ hydrocarbon groups as Q are the same as the halogen atoms and $C_1$-$C_{20}$ hydrocarbon groups that the electron-donating-group-containing substituted aryl groups may contain. When Q is a halogen atom, it is preferably a chlorine atom. When Q is a $C_1$-$C_{20}$ hydrocarbon group, the number of carbon atoms of the hydrocarbon group is preferably 1 to 7.

Examples of anionic ligands include alkoxy groups such as methoxy groups, t-butoxy groups, and phenoxy groups; carboxylate groups such as acetate and benzoate; sulfonate groups such as mesylate and tosylate; and the like.

Examples of neutral ligands capable of being coordinated with a lone electron pair include organophosphorus compounds such as trimethylphosphine, triethylphosphine, triphenylphosphine, and diphenylmethylphosphine; and ether compounds such as tetrahydrofuran, diethyl ether, dioxane, and 1,2-dimethoxyethane.

j is an integer of 1 to 4, and is preferably 2.

The 2,3,6,7-tetramethyl fluorenyl group contained in the bridged metallocene compound (a) represented by the general formula [VII] has four substituents at its 2, 3, 6 and 7 position, hence having a large electronic effect, and it is inferred that this results in a high polymerization activity, causing an ethylene-based copolymer with a high molecular weight to be produced. Since a non-conjugated polyene is generally bulky compared with an α-olefin, it is inferred that especially when in a polymerization catalyst for polymerizing it, the vicinity of the central metal of a metallocene compound, which vicinity corresponds to a polymerization activity point, is less bulky, it leads to an increase in the copolymerization performance of the non-conjugated polyene. Because the four methyl groups contained in the 2,3,6,7-tetramethyl fluorenyl group are not bulky compared with other hydrocarbon groups, this is considered to contribute to a high non-conjugated polyene copolymerization performance. From the above, it is inferred that the bridged metallocene compound represented by the general formula [VII] including a 2,3,6,7-tetramethyl fluorenyl group in particular achieves a high molecular weight of the produced ethylene-based copolymer, a high non-conjugated polyene copolymerization performance, and a high polymerization activity at a high level in a well-balanced manner at the same time.

The bridged metallocene compound (a-3) can be synthesized by a simple method such as the following formula [VIII].

[Chem. 3]

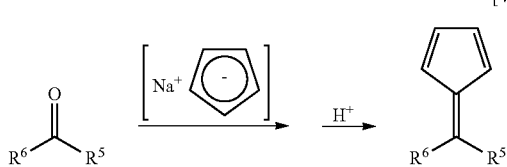

[VIII]

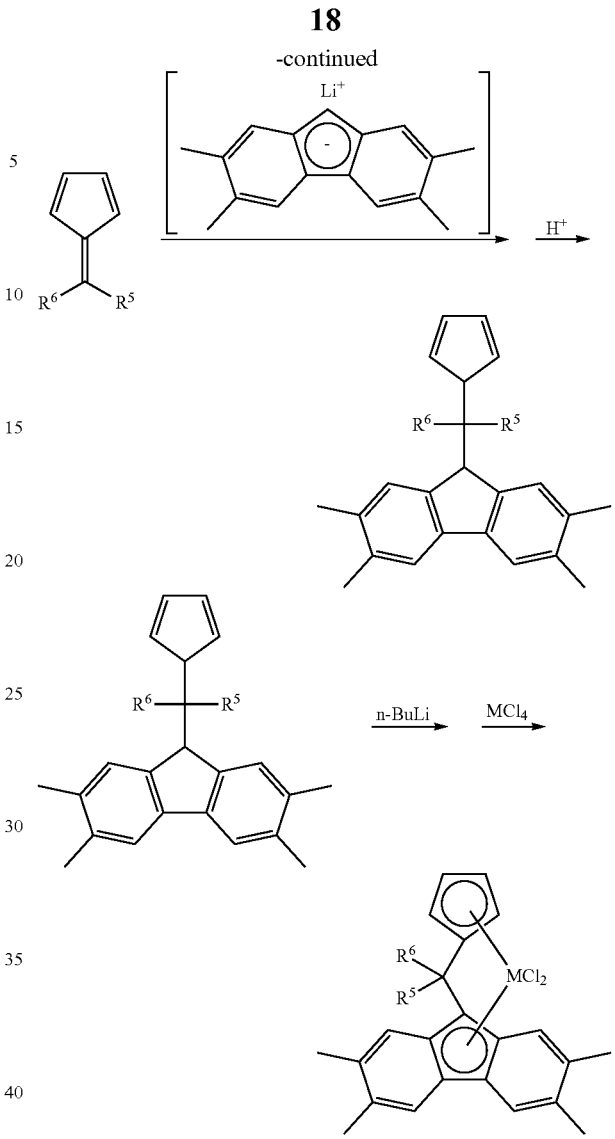

(wherein the definition, specific examples, and preferable examples of M, $R^5$, and $R^6$ are the same as in the formula [VII].)

In the formula [VIII], $R^5$ and $R^6$ are as aforementioned, and because various ketones which are represented by the general formula $R^5$—C(=O)—$R^6$ and which satisfy such conditions as these are commercially available from common reagent manufacturers, raw materials for the bridged metallocene compound (a-3) can be readily obtained. Even if such ketones are not commercially available, they can be easily synthesized by, for example, a method such as by Olah et al. [Heterocycles, 40, 79 (1995)]. Thus, the bridged metallocene compound (a-3) makes manufacturing processes relatively simple and easy and reduces production cost further, eventually providing the advantage that the use of this bridged metallocene compound reduces the production cost of the ethylene-based copolymer. Further, when ethylene, an α-olefin having 4 or more carbon atoms, and a non-conjugated polyene are copolymerized in the presence of an olefin polymerization catalyst including the bridged metallocene compound (a-3), the advantage is also obtained that the produced copolymer can have an even higher molecular weight.

In the bridged metallocene compound (a-3) represented by the general formula [VII], $R^5$ and $R^6$ are preferably groups selected from the group consisting of aryl groups and substituted aryl groups. When ethylene, an α-olefin having 4 or more carbon atoms, and a non-conjugated polyene are copolymerized in the presence of an olefin polymerization catalyst including the bridged metallocene compound, the advantages are obtained that the polymerization activity can further be enhanced and that the produced copolymer can have an even higher molecular weight. At the same time, the advantage is also obtained that the copolymerization performance of the non-conjugated polyene is enhanced (for example, the content of non-conjugated polyene units in the copolymer is increased, and the non-conjugated polyene units are more easily dispersed uniformly in the copolymer).

In the bridged metallocene compound (a-3) represented by the general formula [VII], $R^5$ and $R^6$ are further preferably the same groups. Selecting $R^5$ and $R^6$ in this manner simplifies synthesis processes for the bridged metallocene compound and further reduces production cost, eventually providing the advantage that using this bridged metallocene compound reduces the production cost of the copolymer. In addition, when ethylene, an α-olefin having 4 or more carbon atoms, and a non-conjugated polyene are copolymerized in the presence of an olefin polymerization catalyst including the bridged metallocene compound, the advantage is obtained that the produced copolymer can have an even higher molecular weight.

The applicant has intensively studied various bridged metallocene compounds (a) and consequently has found out for the first time that when $R^5$ and $R^6$ in the bridged metallocene compound (a-3) represented by the general formula [VII] are the aforementioned groups, in particular electron-donating-group-containing substituted aryl groups wherein one or more electron-donating substituents having a substituent constant σ of −0.2 or less in the Hammett's rule are substituted, the copolymerization of ethylene, an α-olefin having 4 or more carbon atoms, and a non-conjugated polyene in the presence of an olefin polymerization catalyst including the bridged metallocene compound (a-3) can make the molecular weight of the produced copolymer even higher.

It is known that in coordination polymerization of an olefin with an organometallic complex catalyst such as the bridged metallocene compound (a-3) according to the present invention, repeated polymerization of an olefin on the central metal of the catalyst propagates molecular chains of the produced olefin polymer (propagation), increasing the molecular weight of the olefin polymer. It is also known that in a reaction referred to as chain transfer, dissociation of molecular chains of an olefin polymer from the central metal of a catalyst stops propagation of the molecular chains and accordingly stops increase in the molecular weight of the olefin polymer. Thus, the molecular weight of an olefin polymer is characterized by the ratio of a frequency of propagation to a frequency of chain transfer reaction, which ratio is inherent to an organometallic complex catalyst that produces the polymer. In other words, the relation is such that the larger the ratio of the frequency of propagation to the frequency of chain transfer reaction is, the higher the molecular weight of the produced olefin polymer is, and conversely, the smaller the former, the lower the latter. Here, the frequencies of the respective reactions can be estimated from the activation energies of the respective reactions, and it can be considered that a reaction having a low activation energy is more frequent and that conversely a reaction having a high activation energy is less frequent. It is known that in general a frequency of propagation in olefin polymerization is sufficiently high compared with a frequency of chain transfer reaction, i.e., an activation energy of propagation is sufficiently low compared with an activation energy of chain transfer reaction. Thus, a value (hereinafter referred to as "ΔEc") obtained by subtracting an activation energy of propagation from an activation energy of chain transfer reaction is positive, and it is inferred that the larger the value is, the larger the frequency of propagation is compared with the frequency of chain transfer reaction and the larger the molecular weight of the produced olefin polymer produced is. The adequacy of estimation thus conducted of a molecular weight of an olefin polymer is endorsed by the calculation results of, for example, Laine et al. [Organometallics, 30, 1350 (2011)]. It is inferred that when $R^5$ and $R^6$ in the bridged metallocene compound (a-3) represented by the general formula [VII] are electron-donating group-containing substituted aryl groups wherein in particular one or more electron-donating substituents having a substituent constant σ of −0.2 or less in the Hammett's rule are substituted, the ΔEc increases and that in copolymerization of ethylene, an α-olefin having 4 or more carbon atoms, and a non-conjugated polyene in the presence of an olefin polymerization catalyst including the bridged metallocene compound (a-3), the produced copolymer has a high molecular weight.

In the bridged metallocene compound (a-3) represented by the general formula [VII], electron-donating substituents contained in $R^5$ and $R^6$ are preferably groups selected from the group consisting of nitrogen-containing groups and oxygen-containing groups. These substituents have a particularly low σ in the Hammett's rule, and can make the molecular weight of the ethylene.α-olefin.non-conjugated polyene copolymer high, particularly allowing the molecular weight to be high even in high temperature polymerization that generally reduces the molecular weight.

In the bridged metallocene compound (a-3) represented by the general formula [VII], $R^5$ and $R^6$ are further preferably substituted phenyl groups containing groups selected from the group consisting of nitrogen-containing groups and oxygen-containing groups as the electron-donating substituents. For synthesis by a method such as, for example, the formula [VIII], various benzophenones as raw materials are commercially available from common reagent manufacturers, so that the raw materials are readily obtained, production processes are simplified, and furthermore production cost is reduced, eventually providing the advantage that using this bridged metallocene compound reduces the production cost of the copolymer (1B) or (2B).

Here, examples of substituted phenyl groups containing groups selected from the group consisting of nitrogen-containing groups or oxygen-containing groups as the electron-donating substituent include: o-aminophenyl group (2-aminophenyl group), p-aminophenyl group (4-aminophenyl group), o-(dimethylamino)phenyl group (2-(dimethylamino)phenyl group), p-(dimethylamino)phenyl group (4-(dimethylamino)phenyl group), o-(diethylamino)phenyl group (2-(diethylamino)phenyl group), p-(diethylamino)phenyl group (4-(diethylamino)phenyl group), m-(diethylamino)phenyl group (3-(diethylamino)phenyl group), o-methoxyphenyl group (2-methoxyphenyl group), p-methoxyphenyl group (4-methoxyphenyl group), o-ethoxyphenyl group (2-ethoxyphenyl group), p-ethoxyphenyl group (4-ethoxyphenyl group), o-N-morpholinylphenyl group (2-N-morpholinylphenyl group), p-N-morpholinylphenyl group (4-N-morpholinylphenyl group), m-N-morpholinylphenyl group (3-N-morpholinylphenyl group), o,p-dimethoxyphenyl group (2,4-dimethoxyphenyl group), m,p-dimethoxyphenyl group (3,4-dimethoxyphenyl group), p-(dimethylamino)-m-methoxyphenyl group (4-(dimethylamino)-3-methoxyphenyl group), p-(dimethylamino)-m-methylphenyl group (4-(dimethylamino)-3-methylphenyl group), p-methoxy-m-methylphenyl group (4-methoxy-3-methylphenyl group), p-methoxy-m,m-dimethylphenyl group (4-methoxy-3,5-dimethylphenyl group).

In the bridged metallocene compound (a-3) represented by the general formula [VII], $R^5$ and $R^6$ are further preferably substituted phenyl groups wherein groups selected from the group consisting of nitrogen-containing groups and oxygen-containing groups as the electron-donating substituents are contained for the meta and/or para positions. Synthesis by a method such as, for example, the formula [VIII] is easier compared with synthesis wherein the group is substituted in the ortho position, whereby manufacturing processes are simplified, and furthermore production cost is reduced, eventually providing the advantage that using this bridged metallocene compound reduces the production cost of the ethylene-based copolymer.

When, in the bridged metallocene compound (a-3) represented by the general formula [VII], $R^5$ and $R^6$ are substituted phenyl groups wherein nitrogen-containing groups as the electron-donating substituents are contained for the meta and/or para positions, the nitrogen-containing groups are further preferably groups represented by the following general formula [II].

[Chem. 4]

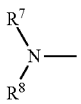
[II]

(wherein $R^7$ and $R^8$, each of which may be the same or different and may be bound together to form a ring, are atoms or substituents selected from the group consisting of hydrogen atoms, $C_1$-$C_{20}$ hydrocarbon groups, silicon-containing groups, oxygen-containing groups and halogen-containing groups; and the line on the right of N represents a bond to a phenyl group.)

Specific examples and preferred examples of $C_1$-$C_{20}$ hydrocarbon groups, silicon-containing groups, oxygen-containing groups, and halogen containing groups as $R^7$ and $R^8$ are the same as in the formula [VII].

Such a bridged metallocene compound (a-4) is represented by the following general formula [IX].

[Chem. 5]

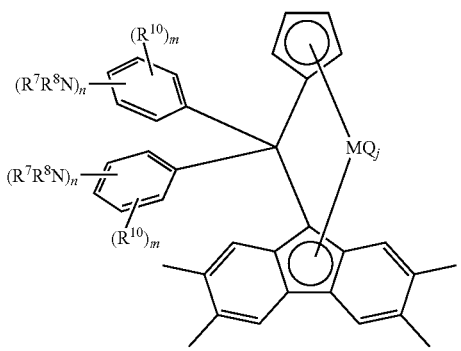
[IX]

(wherein the definition, specific examples, and preferable examples of M, Q, and j are the same as in the formula [VII].) $R^7$, $R^8$, and $R^{10}$, each of which may be the same or different, are substituents selected from the group consisting of hydrogen atoms, $C_1$-$C_{20}$ hydrocarbon groups, silicon-containing groups, nitrogen-containing groups, oxygen-containing groups, halogen atoms, and halogen-containing groups; adjacent substituents among $R^7$, $R^8$, and $R^{10}$ may be bound together to form a ring; $NR^7R^8$ is a nitrogen-containing group having a substituent constant σ of −0.2 or less in the Hammett's rule; when a plurality of the nitrogen-containing groups are present, each of the nitrogen-containing groups may be the same or different; n is an integer of 1 to 3; and m is an integer of 0 to 4.

Examples of $C_1$-$C_{20}$ hydrocarbon groups, silicon-containing groups, oxygen-containing groups, and halogen-containing groups as $R^{10}$ include the aforementioned specific examples of these substituents.

The bridged metallocene compound (transition metal compound) represented by the general formula [IX] has a particularly low σ in the Hammett's rule for $NR^7R^8$ represented by the aforementioned general formula [II], and hence can make the molecular weight of the ethylene.α-olefin.non-conjugated polyene copolymer high, particularly allowing the molecular weight to be high even in high temperature polymerization that generally reduces the molecular weight.

When, in the bridged metallocene compound (a-3) represented by the general formula [VII], $R^5$ and $R^6$ are substituted phenyl groups wherein oxygen-containing groups as the electron-donating substituents are contained for the meta and/or para positions, the oxygen-containing groups are further preferably groups represented by the following general formula [III].

[Chem. 6]

$R^9$—O—　　　　　　　　　　　　　[III]

(wherein $R^9$ is an atom or a substituent selected from the group consisting of hydrogen atoms, $C_1$-$C_{20}$ hydrocarbon groups, silicon-containing groups, nitrogen-containing groups and halogen-containing groups; and the line drawn on the right of O represents a bond to a phenyl group.)

Specific examples and preferred examples of $C_1$-$C_{20}$ hydrocarbon groups, silicon-containing groups, nitrogen-containing groups, and halogen-containing groups as $R^9$ are the same as in the formula [VII]. Such a bridged metallocene compound (a-5) is represented by the following general formula [X].

[Chem. 7]

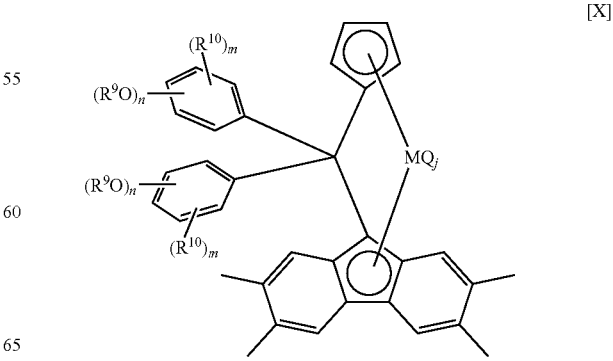
[X]

(wherein the definition, specific examples, and preferable examples of M, Q, and j are the same as in the formula [VII]. $R^9$ and $R^{10}$, each of which may be the same or different, are atoms or substituents selected from the group consisting of hydrogen atoms, $C_1$-$C_{20}$ hydrocarbon groups, silicon-containing groups, nitrogen-containing groups, oxygen-containing groups, halogen atoms, and halogen-containing groups; adjacent substituents of $R^{10}$ may be bound together to form a ring; $OR^9$ is an oxygen-containing group having a substituent constant σ of −0.2 or less in the Hammett's rule; when a plurality of the oxygen-containing groups are present, each of the oxygen-containing groups may be the same or different; n is an integer of 1 to 3; and m is an integer of 0 to 4.)

Examples of $C_1$-$C_{20}$ hydrocarbon groups, silicon-containing groups, nitrogen-containing groups, and halogen-containing groups as $R^{10}$ include the aforementioned specific examples of these substituents.

The bridged metallocene compound (transition metal compound) represented by the general formula [X] has a further low σ in the Hammett's rule for $OR^9$ represented by the aforementioned general formula [III], and hence can make the molecular weight of the ethylene.α-olefin.non-conjugated polyene copolymer high, particularly allowing the molecular weight to be high even in high temperature polymerization that generally reduces the molecular weight.

It is more preferred that M is a hafnium atom in the bridged metallocene compound (a-3) according to the present invention represented by the general formula [VII], the bridged metallocene compound (a-4) according to the present invention represented by the general formula [IX], and the bridged metallocene compound (a-5) according to the present invention represented by the general formula [X]. When ethylene, an α-olefin having 4 or more carbon atoms, and a non-conjugated polyene are copolymerized in the presence of an olefin polymerization catalyst including the bridged metallocene compound wherein M is a hafnium atom, the produced copolymer can have an even higher molecular weight, providing the advantage that the copolymerization performance of the non-conjugated polyene is enhanced.

Examples of such bridged metallocene compounds (a) include:

[dimethylmethylene($\eta^5$-cyclopentadienyl)($\eta^5$-2,3,6,7-tetramethylfluorenyl)]hafniumdichloride, [diethylmethylene($\eta^5$-cyclopentadienyl)($\eta^5$-2,3,6,7-tetramethylfluorenyl)]hafniumdichloride, [di-n-butylmethylene($\eta^5$-cyclopentadienyl)($\eta^5$-2,3,6,7-tetramethylfluorenyl)]hafniumdichloride, [dicyclopentylmethylene($\eta^5$-cyclopentadienyl)($\eta^5$-2,3,6,7-tetramethylfluorenyl)]hafniumdichloride, [dicyclohexylmethylene($\eta^5$-cyclopentadienyl)($\eta^5$-2,3,6,7-tetramethylfluorenyl)]hafniumdichloride,

[cyclopentylidene($\eta^5$-cyclopentadienyl)($\eta^5$-2,3,6,7-tetramethylfluorenyl)]hafniumdichloride, [cyclohexylidene($\eta^5$-cyclopentadienyl)($\eta^5$-2,3,6,7-tetramethylfluorenyl)]hafniumdichloride,

[diphenylmethylene($\eta^5$-cyclopentadienyl)($\eta^5$-2,3,6,7-tetramethylfluorenyl)]hafniumdichloride, [di-1-naphthylmethylene($\eta^5$-cyclopentadienyl)($\eta^5$-2,3,6,7-tetramethylfluorenyl)]hafniumdichloride, [di-2-naphthylmethylene($\eta^5$-cyclopentadienyl)($\eta^5$-2,3,6,7-tetramethylfluorenyl)]hafniumdichloride,

[bis(3-methylphenyl)methylene($\eta^5$-cyclopentadienyl)($\eta^5$-2,3,6,7-tetramethylfluorenyl)]hafniumdichloride, [bis(4-methylphenyl)methylene($\eta^5$-cyclopentadienyl)($\eta^5$-2,3,6,7-tetramethylfluorenyl)]hafniumdichloride, [bis(3,4-dimethylphenyl)methylene($\eta^5$-cyclopentadienyl)($\eta^5$-2,3,6,7-tetramethylfluorenyl)]hafniumdichloride, [bis(4-n-hexylphenyl)methylene($\eta^5$-cyclopentadienyl)($\eta^5$-2,3,6,7-tetramethylfluorenyl)]hafniumdichloride, [bis(4-cyclohexylphenyl)methylene($\eta^5$-cyclopentadienyl)($\eta^5$-2,3,6,7-tetramethylfluorenyl)]hafniumdichloride, [bis(4-t-butylphenyl)methylene($\eta^5$-cyclopentadienyl)($\eta^5$-2,3,6,7-tetramethylfluorenyl)]hafniumdichloride,

[bis(3-methoxyphenyl)methylene($\eta^5$-cyclopentadienyl)($\eta^5$-2,3,6,7-tetramethylfluorenyl)]hafniumdichloride, [bis(4-methoxyphenyl)methylene($\eta^5$-cyclopentadienyl)($\eta^5$-2,3,6,7-tetramethylfluorenyl)]hafniumdichloride, [bis(3,4-dimethoxyphenyl)methylene($\eta^5$-cyclopentadienyl)($\eta^5$-2,3,6,7-tetramethylfluorenyl)]hafniumdichloride, [bis(4-methoxy-3-methylphenyl)methylene($\eta^5$-cyclopentadienyl)($\eta^5$-2,3,6,7-tetramethylfluorenyl)]hafniumdichloride, [bis(4-methoxy-3,4-dimethylphenyl)methylene($\eta^5$-cyclopentadienyl)($\eta^5$-2,3,6,7-tetramethylfluorenyl)]hafniumdichloride, [bis(4-ethoxyphenyl)methylene($\eta^5$-cyclopentadienyl)($\eta^5$-2,3,6,7-tetramethylfluorenyl)]hafniumdichloride, [bis(4-phenoxyphenyl)methylene($\eta^5$-cyclopentadienyl)($\eta^5$-2,3,6,7-tetramethylfluorenyl)]hafniumdichloride, [bis{4-(trimethylsiloxy)phenyl}methylene($\eta^5$-cyclopentadienyl)($\eta^5$-2,3,6,7-tetramethylfluorenyl)]hafniumdichloride,

[bis{3-(dimethylamino)phenyl}methylene($\eta^5$-cyclopentadienyl)($\eta^5$-2,3,6,7-tetramethylfluorenyl)]hafniumdichloride, [bis{4-(dimethylamino)phenyl}methylene($\eta^5$-cyclopentadienyl)($\eta^5$-2,3,6,7-tetramethylfluorenyl)]hafniumdichloride, [bis(4-N-morpholinylphenyl)($\eta^5$-cyclopentadienyl)($\eta^5$-2,3,6,7-tetramethylfluorenyl)]hafniumdichloride,

[bis{4-(trimethylsilyl)phenyl}methylene($\eta^5$-cyclopentadienyl)($\eta^5$-2,3,6,7-tetramethylfluorenyl)]hafniumdichloride,

[bis(3-chlorophenyl)methylene($\eta^5$-cyclopentadienyl)($\eta^5$-2,3,6,7-tetramethylfluorenyl)]hafniumdichloride, [bis(4-chlorophenyl)methylene($\eta^5$-cyclopentadienyl)($\eta^5$-2,3,6,7-tetramethylfluorenyl)]hafniumdichloride, [bis(3-fluorophenyl)methylene($\eta^5$-cyclopentadienyl)($\eta^5$-2,3,6,7-tetramethylfluorenyl)]hafniumdichloride, [bis(4-fluorophenyl)methylene($\eta^5$-cyclopentadienyl)($\eta^5$-2,3,6,7-tetramethylfluorenyl)]hafniumdichloride, [bis{3-(trifluoromethyl)phenyl}methylene($\eta^5$-cyclopentadienyl)($\eta^5$-2,3,6,7-tetramethylfluorenyl)]hafniumdichloride, [bis{4-(trifluoromethyl)phenyl}methylene($\eta^5$-cyclopentadienyl)($\eta^5$-2,3,6,7-tetramethylfluorenyl)]hafniumdichloride,

[methylphenylmethylene($\eta^5$-cyclopentadienyl)($\eta^5$-2,3,6,7-tetramethylfluorenyl)]hafniumdichloride, [methyl(4-methylphenyl)methylene($\eta^5$-cyclopentadienyl)($\eta^5$-2,3,6,7-tetramethylfluorenyl)]hafniumdichloride, [methyl(4-methoxyphenyl)methylene($\eta^5$-cyclopentadienyl)($\eta^5$-2,3,6,7-tetramethylfluorenyl)]hafniumdichloride, [methyl{4-(dimethylamino)phenyl}methylene($\eta^5$-cyclopentadienyl)($\eta^5$-2,3,6,7-tetramethylfluorenyl)]hafniumdichloride, [methyl(4-N-morpholinylphenyl)methylene($\eta^5$-cyclopentadienyl)($\eta^5$-2,3,6,7-tetramethylfluorenyl)]hafniumdichloride,

[dimethylsilylene($\eta^5$-cyclopentadienyl)($\eta^5$-2,3,6,7-tetramethylfluorenyl)]hafniumdichloride, [diethylsilylene($\eta^5$-cyclopentadienyl)($\eta^5$-2,3,6,7-tetramethylfluorenyl)]hafniumdichloride, [dicyclohexylsilylene($\eta^5$-cyclopentadienyl)($\eta^5$-2,3,6,7-tetramethylfluorenyl)]hafniumdichloride, [diphenylsilylene($\eta^5$-cyclopentadienyl)($\eta^5$-2,3,6,7-tetramethylfluorenyl)]hafniumdichloride, [di(4-methylphenyl)silylene($\eta^5$-cyclopentadienyl)($\eta^5$-2,3,6,7-tetramethylfluorenyl)]hafniumdichloride, [dimethylgermylene($\eta^5$-cyclopentadienyl)($\eta^5$-2,3,6,7-tetramethylfluorenyl)]hafniumdichloride, [diphenylgermylene ($\eta^5$-cyclopentadienyl)($\eta^5$-2,3,6,7-tetramethylfluorenyl)] hafniumdichloride, [1-($\eta^5$-cyclopentadienyl)-2-($\eta^5$-2,3,6,7-tetramethylfluorenyl)ethylene]hafniumdichloride, [1-($\eta^5$-cyclopentadienyl)-3-($\eta^5$-2,3,6,7-tetramethylfluorenyl)propylene]hafniumdichloride, [1-($\eta^5$-cyclopentadienyl)-2-($\eta^5$-2,3,6,7-tetramethylfluorenyl)-1,1,2,2-tetramethylsilylene] hafniumdichloride, [1-($\eta^5$-cyclopentadienyl)-2-($\eta^5$-2,3,6,7-tetramethylfluorenyl)phenylene]hafniumdichloride; compounds wherein the hafnium atom of these compounds is substituted by a zirconium atom, or compounds wherein the chloro-ligand is substituted by a methyl group; and the like. Among these catalysts, [bis(4-methylphenyl)methylene ($\eta^5$-cyclopentadienyl)($\eta^5$-2,3,6,7-tetramethylfluorenyl)] hafnium dichloride is preferable.

Bridged metallocene compounds used in producing the above copolymer (1B) or (2B) can be produced by a known method, and are not limited to a particular producing method. Examples of producing methods include J. Organomet. Chem., 63, 509(1996) and the publications according to the applications filed by the present applicant: WO2006/123759, WO01/27124, JP-A No. 2004-168744, JP-A No. 2004-175759, JP-A No. 2000-212194, and the like.

Next, a preferred embodiment wherein the bridged metallocene compound is used as a catalyst (olefin polymerization catalyst) for producing an ethylene.α-olefin.non-conjugated polyene copolymer (1B) or (2B) will be described.

When the bridged metallocene compound is used as an olefin polymerization catalyst component, the catalyst includes (a) a bridged metallocene compound represented by the general formula [VII], (b) at least one compound that is selected from the group consisting of (b-1) organometallic compounds, (b-2) organoaluminum oxy-compounds and (b-3) compounds which react with the bridged metallocene compound (a) to form an ion pair, and, if necessary, (c) a particulate carrier.

Each component will be specifically described below.

<(b-1) Organometallic Compound>

As a (b-1) organometallic compound used for producing the copolymer (1B) or (2B), specifically an organometallic compound in Group 1, 2, 12, and 13 of the periodic table, such as the following general formula [X] to [XII], is used.

An organoaluminum compound represented by the general formula [X]:

(b-1a) General Formula $R^a{}_m Al(OR^b)_n H_p X_q$ [X]

(wherein $R^a$ and $R^b$, each of which may be the same or different, represent a $C_1$-$C_{15}$, preferably $C_1$-$C_4$ hydrocarbon group; X represents a halogen atom; m, n, p, and q are numbers defined as $0<m\leq3$, $0\leq n<3$, $0\leq p<3$, $0\leq q<3$, and $m+n+p+q=3$).

Examples of compounds represented by the general formula [X] include trialkylaluminum such as trimethylaluminum, triethylaluminum, triisobutylaluminum, and tri-n-octylaluminum; tricycloalkylaluminum, isobutylaluminumdichloride, diethylaluminumchloride, ethylaluminumdichloride, ethylaluminumsesquichloride, methylaluminumdichloride, dimethylaluminumchloride, and diisobutylaluminumhydride.

A complex alkylated compound of a metal of Group 1 of the periodic table and aluminum, represented by the general formula [XI]:

(b-1b) General Formula $M^2 AlR^a{}_4$ [XI]

(wherein $M^2$ represents Li, Na, or K, and $R^a$ is a $C_1$-$C_{15}$, preferably $C_1$-$C_4$ hydrocarbon group).

Examples of compounds represented by the general formula [XI] include $LiAl(C_2H_5)_4$ and $LiAl(C_7H_{15})_4$.

A dialkyl compound having a metal of Group 2 or 12 of the periodic table, represented by the general formula [XII]:

(b-1c) General Formula $R^a R^b M^3$ [XII]

(wherein $R^a$ and $R^b$, each of which may be the same or different, represent a $C_1$-$C_{15}$, preferably $C_1$-$C_4$ hydrocarbon group, and $M^3$ is Mg, Zn, or Cd).

Among the organometallic compounds (b-1), organoaluminum compounds such as triethylaluminum, triisobutylaluminum and tri-n-octylaluminum are preferable. These organometallic compounds (b-1) may be used singly or in combination of two or more kinds.

<(b-2) Organoaluminum Oxy-Compound>

The (b-2) organoaluminum oxy-compound used in producing the copolymer (1B) or (2B) may be a conventionally known aluminoxane and may be a benzene-insoluble organoaluminum oxy-compound such as those exemplified in JP-A No. H02-78687. The (b-2) organoaluminum oxy-compound is used singly or in combination of two or more kinds.

A conventionally known aluminoxane can be manufactured by, for example, the following method, and is usually obtained as a hydrocarbon solvent solution. (1) A method of reacting an absorption water or a crystalline water with an organoaluminum compound through adding an organoaluminum compound such as trialkylaluminum to a hydrocarbon medium suspension such as an absorption water-containing compound or a crystalline water-containing salt, for example, magnesium chloride hydrate, copper sulfate hydrate, aluminum sulfate hydrate, nickel sulfate hydrate or the first cerium chloride hydrate. (2) A method of applying water, ice or water vapor directly to an organoaluminum compound such as trialkylaluminum in a medium such as benzene, toluene, ethyl ether or tetrahydrofuran. (3) A method of reacting an organic tin oxide such as dimethyl tin oxide or dibutyl tin oxide with an organoaluminum compound such as trialkylaluminum in a medium such as decane, benzene or toluene.

The aluminoxane may contain a small amount of organometallic components. The aluminoxane solution recovered may have a solvent or unreacted organoaluminum compound distilled off therefrom, followed by being redissolved in a solvent or suspended in a poor solvent of aluminoxane.

Examples of an organoaluminum compound used in preparing aluminoxane specifically include an organoaluminum compound similar to those exemplified as an organoaluminum compound belonging to the (b-1a).

Among these, trialkylaluminum and tricycloalkylaluminum are preferable, and, above all, trimethylaluminum and triisobutylaluminum are particularly preferable.

An organoaluminum compound such as above-mentioned is used singly or in combination of two or more kinds.

A benzene-insoluble organoaluminum oxy-compound which is an aspect of the (b-2) organoaluminum oxy-compound is preferably one which has an Al component dissolved in a 60° C. benzene at usually 10 wt % or less, preferably 5 wt % or less, particularly preferably 2 wt % or less relative to 100 wt % benzene as based on the conversion to Al atoms, i.e., one which is insoluble or poorly-soluble to benzene.

Examples of the (b-2) organoaluminum oxy-compound include an organoaluminum oxy-compound containing boron represented by the following general formula [X].

[Chem. 8]

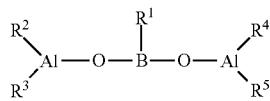

[X]

[wherein $R^1$ represents a $C_1$-$C_{10}$ hydrocarbon group, and $R^2$ to $R^5$, each of which may be the same or different, represent hydrogen atoms, halogen atoms, or $C_1$-$C_{10}$ hydrocarbon groups.]

An organoaluminum oxy-compound including a boron represented by the general formula [X] can be manufactured by reacting an alkyl boronic acid represented by the following general formula [XI]:

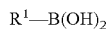

[XI]

(wherein $R^1$ represents the same group as $R^1$ in the general formula [X]), with an organoaluminum compound in an inert solvent in an inert gas atmosphere at a temperature of −80° C. to room temperature for 1 minute to 24 hours.

Specific examples of an alkyl boronic acid represented by the general formula [XI] include methyl boronic acid, ethyl boronic acid, isopropyl boronic acid, n-propyl boronic acid, n-butyl boronic acid, isobutyl boronic acid, n-hexyl boronic acid, cyclohexyl boronic acid, phenyl boronic acid, 3,5-difluorophenyl boronic acid, pentafluorophenyl boronic acid and 3,5-bis(trifluoromethyl)phenyl boronic acid.

Among these, methyl boronic acid, n-butyl boronic acid, isobutyl boronic acid, 3,5-difluorophenyl boronic acid and pentafluorophenyl boronic acid are preferable. These are used singly or in combination of two or more kinds.

Examples of an organoaluminum compound to be reacted with such an alkyl boronic acid specifically include an organoaluminum compound similar to those exemplified as an organoaluminum compound belonging to the (b-1a).

Among these, trialkylaluminum and tricycloalkylaluminum are preferable, and trimethylaluminum, triethylaluminum and triisobutylaluminum in particular are preferable. These are used singly or in combination of two or more kinds. A (b-2) organoaluminum oxy-compound such as aforementioned is used singly or in combination of two or more kinds.

<(b-3) Compound which Reacts with Transition Metal Compound (a) to Form Ion Pair>

Examples of the compound (b-3) (hereinafter referred to as "ionized ionic compound") which reacts with the bridged metallocene compound (a) used in producing the copolymer (1B) or (2B) to form an ion pair include Lewis acids, ionic compounds, borane compounds, and carborane compounds described in JP-A No. H01-501950, JP-A No. H01-502036, JP-A No. H03-179005, JP-A No. H03-179006, JP-A No. H03-207703, JP-A No. H03-207704, U.S. Pat. No. 5,321,106, and the like. Further examples also include heteropoly compounds and isopoly compounds. Such an ionized ionic compound (b-3) is used singly or in combination of two or more kinds.

Specifically, examples of a Lewis acid include a compound represented by $BR_3$ (wherein R is a phenyl group which may have a substituent such as fluorine, methyl group or trifluoromethyl group, or fluorine), for example, trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl) boron and tris(3,5-dimethylphenyl)boron.

Examples of an ionic compound include, for example, a compound represented by the following general formula [XII].

[Chem. 9]

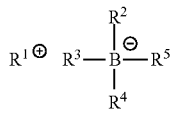

[XII]

(wherein $R^{1+}$ is $H^+$, a carbonium cation, an oxonium cation, an ammonium cation, a phosphonium cation, a cycloheptyltrienyl cation, a ferrocenium cation having a transition metal, or the like. $R^2$ to $R^5$, each of which may be the same or different, are organic groups, preferably aryl groups, or substituted aryl groups.)

Examples of the carbonium cations specifically include a trisubstituted carbonium cation such as a triphenyl carbonium cation, a tri(methylphenyl)carbonium cation, or a tri(dimethylphenyl)carbonium cation.

Examples of the ammonium cations specifically include a trialkylammonium cation such as a trimethylammonium cation, a triethylammonium cation, a tripropylammonium cation, a tributylammonium cation, or a tri(n-butyl)ammonium cation;

an N,N-dialkylanilinium cation such as N,N-dimethylanilinium cation, an N,N-diethylanilinium cation, or an N,N,2,4,6-pentamethylanilinium cation;

a dialkylammonium cation such as a di(isopropyl)ammonium cation, or a dicyclohexylammonium cation; and the like.

Examples of the phosphonium cation specifically include a triarylphosphonium cation such as a triphenylphosphonium cation, a tri(methylphenyl)phosphonium cation, or a tri(dimethylphenyl)phosphonium cation, and the like.

As $R^{1+}$, a carbonium cation, an ammonium cation and the like are preferable, and in particular a triphenylcarbonium cation, an N,N-dimethylanilinium cation and an N,N-diethylanilinium cation are preferable.

Examples of the ionic compounds include trialkyl substituted ammonium salts, N,N-dialkylanilinium salts, dialkylammonium salts, triarylphosphonium salts, and the like.

Examples of the trialkyl substituted ammonium salts specifically include, for example, triethylammoniumtetra (phenyl)boron, tripropylammoniumtetra(phenyl)boron, tri (n-butyl)ammoniumtetra(phenyl)boron, trimethylammoniumtetra(p-tolyl)boron, trimethylammoniumtetra(o-tolyl) boron, tri(n-butyl)ammoniumtetra(pentafluorophenyl) boron, tripropylammoniumtetra(o,p-dimethylphenyl)boron, tri(n-butyl)ammoniumtetra(N,N-dimethylphenyl)boron, tri (n-butyl)ammoniumtetra(p-trifluoromethylphenyl)boron, tri (n-butyl)ammoniumtetra(3,5-ditrifluoromethylphenyl)boron, and tri(n-butyl)ammoniumtetra(o-tolyl)boron.

Examples of the N,N-dialkylanilinium salts specifically include, for example, N,N-dimethylaniliniumtetra(phenyl)

boron, N,N-diethylaniliniumtetra(phenyl)boron, N,N,2,4,6-pentamethylaniliniumtetra(phenyl)boron, and the like.

Examples of the dialkylammonium salts specifically include, for example, di(1-propyl)ammoniumtetra(pentafluorophenyl)boron, dicyclohexylammoniumtetra(phenyl)boron, and the like.

Further, examples of the ionic compounds include triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex, boron compound represented by the following formula [XIII] or [XIV], and the like.

[Chem. 10]

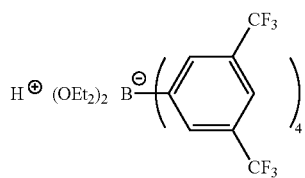

[XIII]

(wherein Et represents an ethyl group.)

[Chem. 11]

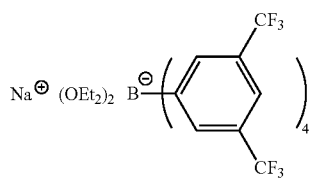

[XIV]

(wherein Et represents an ethyl group.)

Examples of the borane compounds specifically include, for example, decaborane; a salt of an anion such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, or bis[tri(n-butyl)ammonium]dodecachlorododecaborate; a salt of a metal borane anion such as tri(n-butyl)ammoniumbis(dodecahydridododecaborate) cobaltate (III) or bis[tri(n-butyl)ammonium]bis(dodecahydridododecaborate) nickelate (III); and the like.

Examples of the carborane compounds specifically include, for example, a salt of an anion such as 4-carbonanaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammonium-bromo-1-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; a salt of a metal carborane anion such as tri(n-butyl)ammoniumbis(nonahydrido-1,3-dicarbanonaborate)cobaltate (III), tri(n-butyl)ammoniumbis(undecahydrido-7,8-dicarbaundecaborate)ferrate (III), tri(n-butyl)ammoniumbis(undecahydrido-7,8-dicarbaundecaborate)cobaltate (III), tri(n-butyl)ammoniumbis(undecahydrido-7,8-dicarbaundecaborate)nickelate (III), tri(n-butyl)ammoniumbis(undecahydrido-7,8-dicarbaundecaborate)cuprate (III), tri(n-butyl)ammoniumbis(undecahydrido-7,8-dicarbaundecaborate)aurato (III), tri(n-butyl)ammoniumbis(nonahydrido-7,8-dimethyl-7,8-dicarbaundecaborate)ferrate (III), tri(n-butyl)ammoniumbis(nonahydrido-7,8-dimethyl-7,8-dicarbaundecaborate)chromate (III), tri(n-butyl)ammoniumbis(tribromooctahydrido-7,8-dicarbaundecaborate)cobaltate (III), tris[tri(n-butyl)ammonium]bis(undecahydrido-7-carbaundecaborate)chromate (III), bis[tri(n-butyl)ammonium]bis(undecahydrido-7-carbaundecaborate)manganate (IV), bis[tri(n-butyl)ammonium]bis(undecahydrido-7-carbaundecaborate)cobaltate (III), or bis[tri(n-butyl)ammonium]bis(undecahydrido-7-carbaundecaborate)nickelate (IV); and the like.

A heteropoly compound comprises an atom selected from silicon, phosphorus, titanium, germanium, arsenic, and tin, and an atom or two or more atoms selected from vanadium, niobium, molybdenum, and tungsten. Specifically, phosphorusvanadic acid, germanovanadic acid, arsenicvanadic acid, phosphorusniobic acid, germanoniobic acid, siliconomolybdic acid, phosphorusmolybdic acid, titaniummolybdic acid, germanomolybdic acid, arsenicmolybdic acid, tinmolybdic acid, phosphorustungstic acid, germanotungstic acid, tintungstic acid, phosphorusmolybdovanadic acid, phosphorustungstovanadic acid, germanotungstovanadic acid, phosphorusmolybdotungstovanadic acid, germanomolybdotungstovanadic acid, phosphorusmolybdotungstic acid, phosphorusmolybdoniobic acid, and salts of these acids such as salts with, for example, any of metals of Group 1 or 2 of the periodic table specifically including lithium, sodium, potassium, rubidium, cesium, beryllium, magnesium, calcium, strontium, and barium, and organic salts such as triphenylethyl salt can be used but are not limited thereto.

Among the (b-3) ionized ionic compounds, the aforementioned ionic compounds are preferable, and above all, triphenylcarbeniumtetrakis(pentafluorophenyl)borate and N,N-dimethylaniliniumtetrakis(pentafluorophenyl)borate are more preferable.

When the catalyst is the transition metal compound (a) represented by the general formula [VII], using it together with the organometallic compound (b-1) such as triisobutylaluminum, the organoaluminum oxy-compound (b-2) such as methylaluminoxane or the ionized ionic compound (b-3) such as triphenylcarbeniumtetrakis(pentafluorophenyl)borate presents a very high polymerization activity in manufacturing an ethylene.α-olefin.non-conjugated polyene copolymer (1B) or (2B).

For the olefin polymerization catalyst used in producing the copolymer (1B) or (2B), the carrier (c) can be used, if necessary, together with the transition metal compound (a) and at least one compound (b) selected from the group consisting of (b-1) organometallic compounds, (b-2) organoaluminum oxy-compounds, and (b-3) ionized ionic compounds.

<(c) Carrier>

The (c) carrier is an inorganic compound or an organic compound, and is a granular or particulate solid.

Among the inorganic compounds, porous oxide, inorganic halide, clay, clay mineral, or an ion-exchanging layered compound is preferable.

Examples of porous oxides include porous materials whose main component is an inorganic oxide such as $SiO_2$, $Al_2O_3$, $MgO$, $ZrO$, $TiO_2$, $B_2O_3$, $CaO$, $ZnO$, $BaO$, or $ThO_2$; or a complex or mixture including these inorganic oxides; and examples of porous oxides specifically include natural or synthetic zeolites; porous oxides whose main component is $SiO_2$—$MgO$, $SiO_2$—$Al_2O_3$, $SiO_2$—$TiO_2$, $SiO_2$—$V_2O_5$, $SiO_2$—$Cr_2O_3$, or $SiO_2$—$TiO_2$—$MgO$. Among these, porous oxides whose main component is $SiO_2$ and/or $Al_2O_3$ are preferable. While such porous oxides have different characteristics depending on their type and manufacturing method, a carrier preferably used in the present invention has a particle size of 10 to 300 μm, preferably 20 to 200 μm, a specific surface area within the range of usually 50 to 1000 $m^2/g$, preferably 100 to 700 $m^2/g$, and a pore volume preferably within the range of 0.3 to 3.0 $cm^3/g$. Such a carrier is used after it is calcined at 100 to 1000° C., preferably 150 to 700° C., when needed.

Examples of inorganic halides include $MgCl_2$, $MgBr_2$, $MnCl_2$, and $MnBr_2$. The inorganic halide may be used as it is, or may be used after being pulverized using a vibration mill. An inorganic halide dissolved in a solvent such as alcohol and then precipitated out as fine particles using a precipitation agent can also be used.

Clay used as the carrier (c) is usually composed with a clay mineral as a main component. An ion-exchanging layered compound used in the present invention is a compound having a crystalline structure wherein planes structured by ionic bonding and the like are stacked in parallel by a mutual weak bonding force, and the contained ions can be exchanged. Most clay minerals are ion-exchanging layered compounds. As such clay, clay minerals or ion-exchanging layered compounds, not only naturally occurring ones but also artificially synthesized ones can be used.

Examples of clay, clay minerals, and ion-exchanging layered compounds include clay, clay minerals, and ionic crystalline compounds having a layered crystalline structure of a hexagonal close-packed type, antimony type, $CdCl_2$ type, $CdI_2$ type, or the like.

Examples of clay and clay minerals include kaolin, bentonite, kibushi clay, gairome clay, allophane, hisingerite, pyrophyllite, micas, montmorillonites, vermiculite, chlorites, palygorskite, kaolinite, nacrite, dickite, halloysite, and the like.

Examples of ion-exchanging layered compounds include a crystalline acid salt of a polyvalent metal such as α-Zr $(HAsO_4)_2·H_2O$, α-$Zr(HPO_4)_2$, α-$Zr(KPO_4)_2·3H_2O$, α-Ti $(HPO_4)_2$, α-$Ti(HAsO_4)_2·H_2O$, α-$Sn(HPO_4)_2·H_2O$, γ-Zr $(HPO_4)_2$, γ-$Ti(HPO_4)_2$ and γ-$Ti(NH_4PO_4)_2·H_2O$, and the like.

For such clay, clay minerals, or ion-exchanging layered compounds, the pore volume of pores having a radius of 20 Å or more is preferably 0.1 cc/g or more, particularly preferably 0.3 to 5 cc/g, as measured by a mercury penetration method. Here, the pore volume is measured for the pore radius range of 20 to 30000 Å by a mercury penetration method using a mercury porosimeter.

When that which has a less than 0.1 cc/g pore volume of pores having a radius of 20 Å or more is used as a carrier, it tends to be difficult to obtain a high polymerization activity.

It is preferable to subject the clays and the clay minerals used as the carrier (c) to chemical treatment. Examples of chemical treatments include a surface treatment for removing impurities stuck on a surface, a treatment for giving effect on the crystalline structure of clay, and the like, any of which can be used. Examples of chemical treatments specifically include acid treatment, alkali treatment, salt treatment, organic matter treatment and the like. Acid treatment not only removes impurities on a surface but also increases the surface area by eluting positive ions of Al, Fe, Mg and the like out of the crystalline structure. Alkali treatment destroys the crystalline structure of clay and results in a change in the structure of clay. Salt treatment or organic matter treatment forms ion complexes, molecular complexes, organic derivatives or the like and can change the surface area or interlayer distance.

The ion-exchanging layered compound used as the carrier (c) may be a layered compound wherein spacing between layers has been enlarged by exchanging exchangeable ions present between layers with other large bulky ions. Such a bulky ion plays a pillar-like role to support a layer structure and is usually called pillar. Introduction of another substance between layers of a layered compound as above is referred to as "intercalation". Examples of guest compounds for intercalation include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds may be used singly or in combination of two or more kinds thereof. During intercalation of these compounds, polymerization products obtained by subjecting metallic alkoxides such as $Si(OR)_4$, $Al(OR)_3$ and $Ge(OR)_4$ (R is a hydrocarbon group or the like) to hydrolysis, colloidal inorganic compounds such as $SiO_2$, etc. may be allowed to coexist. As the pillar, an oxide formed by intercalating the above metallic hydroxide ion between layers and then performing thermal dehydration, or the like can be mentioned.

The clay, clay mineral, or ion-exchanging layered compound may be used as it is, or may be used after undergoing a treatment such as ball milling or screening. It may be used after being allowed to adsorb water freshly added to it or undergoing a heating dewatering treatment. These substances as the carrier (c) may be used singly or in combination of two or more kinds thereof.

Among these, a preferable one is clay or a clay mineral, and particularly preferable ones are montmorillonite, vermiculite, hectorite, taeniolite and synthetic mica.

Examples of the organic compounds include a granular or particulate solid having a particle size in the range of 10 to 300 μm. Specifically, examples thereof include (co)polymers produced with a $C_2$-$C_{14}$ α-olefin such as ethylene, propylene, 1-butene, or 4-methyl-1-pentene as a main component, (co)polymers produced with vinylcyclohexane or styrene as a main component, and modified products thereof.

The olefin polymerization catalyst used in producing the copolymers (1B) and (2B) can contain the bridged metallocene compound (a), at least one compound (b) selected from the group consisting of (b-1) organometallic compounds, (b-2) organoaluminum oxy-compounds, and (b-3) ionized ionic compounds, and the carrier (c) that is used if necessary.

<Method for Polymerizing Monomers in the Presence of Catalyst for Ethylene.α-Olefin.Non-Conjugated Polyene Copolymer>

In copolymerizing ethylene, an α-olefin, and a non-conjugated polyene, usage and addition order of each component making up the polymerization catalyst are selected as desired, and the following methods are exemplified.

(1) A method of adding the compound (a) singly to a polymerizer.

(2) A method of adding the compound (a) and the compound (b) to a polymerizer in any order.

(3) A method of adding a catalyst component, which has the compound (a) supported on the carrier (c), and the compound (b) to a polymerizer in any order.

(4) A method of adding a catalyst component, which has the compound (b) supported on the carrier (c), and the compound (a) to a polymerizer in any order.

(5) A method of adding a catalyst component, which has the compound (a) and the compound (b) supported on the carrier (c), to a polymerizer.

In each of the methods (2) to (5), at least two of the compound (a), the compound (b) and the carrier(c) may be put in contact preliminarily.

In each of the methods (4) and (5), wherein a compound (b) is supported, another compound (b) which is not supported may be added in any order, if necessary. In this case, this compound (b) may be the same as or different from the compound (b) supported on the carrier (c).

A solid catalyst component having the compound (a) supported on the carrier (c) or a solid catalyst component having the compound (a) and the compound (b) supported on the carrier (c) may have an olefin polymerized preliminarily and may further have a catalyst component supported on the preliminarily polymerized solid catalyst component.

The ethylene.α-olefin.non-conjugated polyene copolymer (1B) or (2B) can be manufactured by copolymerizing ethylene, an α-olefin, and a non-conjugated polyene in the presence of a catalyst, such as aforementioned, for an ethylene.α-olefin.non-conjugated polyene copolymer.

The copolymer (1B) or (2B) can be manufactured by either of a liquid phase polymerization method such as solution (dissolution) polymerization or suspension polymerization or a gas phase polymerization method.

Examples of inactive hydrocarbon media used in a liquid phase polymerization method include aliphatic hydrocarbons such as propane, butane, pentane, hexane, heptane, octane, decane, dodecane, and kerosene; alicyclic hydrocarbons such as cyclopentane, cyclohexane and methylcyclopentane; aromatic hydrocarbons such as benzene, toluene and xylene; and halogenated hydrocarbons such as ethylene chloride, chlorobenzene, and dichloromethane. The inactive hydrocarbon media may be used singly or in combination of two or more kinds thereof. An olefin itself can also be used as a solvent.

In polymerizing ethylene or the like using such a catalyst for copolymers as is aforementioned, the bridged metallocene compound (a) is used in an amount to make up usually $10^{-12}$ to $10^{-2}$ mol, preferably $10^{-10}$ to $10^{-8}$ mol per liter of reaction volume.

The organometallic compound (b-1) is used in an amount such that the molar ratio [(b-1)/M] of the compound (b-1) to all transition metal atoms (M) in the bridged metallocene compound (a) is usually 0.01 to 50000, preferably 0.05 to 10000. The organoaluminum oxy-compound (b-2) is used in an amount such that the molar ratio [(b-2)/M] of aluminum atoms in the compound(b-2) to all transition metal atoms (M) in the compound (a) is usually 10 to 50000, preferably 20 to 10000. The ionized ionic compound (b-3) is used in an amount such that the molar ratio [(b-3)/M] of the compound (b-3) to transition metal atoms (M) in the compound (a) is usually 1 to 20, preferably 1 to 15.

The polymerization temperature of the copolymer (1B) or (2B) is usually −50 to +200° C., preferably in the range of 0 to +200° C., more preferably in the range of +80 to +200° C. The polymerization temperature is desirably a higher temperature (+80° C. or more) in view of productivity, although it depends on the target molecular weight to be achieved and the polymerization activity of a catalyst used.

The polymerization pressure of the copolymer (1B) or (2B) is in the range of usually a normal pressure to a 10 MPa gauge pressure, preferably a normal pressure to a 5 MPa gauge pressure. The polymerization reaction type for the copolymer (1B) or (2B) can be any of a batch type, a semi-continuous type, and a continuous type. Further, the polymerization can be carried out in two or more separated stages which differ in reaction conditions.

The molecular weight of the obtained copolymer (1B) or (2B) can be controlled, for example, by having hydrogen present in a polymerization system or by changing polymerization temperature. When the molecular weight is controlled by having hydrogen present in the polymerization system, the addition amount of hydrogen in the order of 0.001 to 100 NL per kg of olefin is suitable. In addition, when the compound (b) (for example, triisobutyl aluminum, methyl aluminoxane, diethyl zinc, or the like) is used as a catalyst component, the molecular weight of the copolymer can be controlled by the amount of the compound (b) used.

<Phenol Resin-Based Cross-Linking Agent (C)>

Examples of phenol resin-based cross-linking agents (C) (herein also referred to as cross-linking agent (C)) include a halogenated phenol resin-based cross-linking agent.

Examples of cross-linking agents (C) also include resole resins which are preferably produced by condensation of an alkyl substituted phenol or an unsubstituted phenol with an aldehyde, preferably with formaldehyde, in an alkali medium, or by condensation of a bifunctional phenol dialcohol. As the alkyl substituted phenol, a $C_1$-$C_{10}$ alkyl group substitution product is preferable. Further, dimethylol phenols or phenol resins substituted by a $C_1$-$C_{10}$ alkyl group at the p-position are preferable. A phenol resin-based curing resin is typically a thermal cross-linking resin, and is also referred to as a phenol resin-based cross-linking agent or a phenol resin.

Examples of phenol resin-based curing resins (phenol resin-based cross-linking agents) can include the following general formula (I).

[Chem. 12]

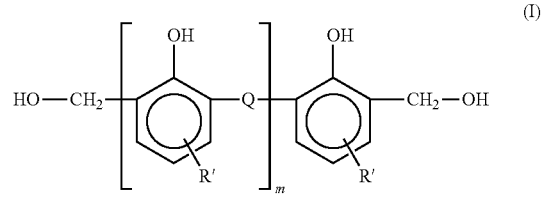

(I)

(wherein Q is a divalent group selected from the group consisting of —$CH_2$— and —$CH_2$—O—$CH_2$—, m is a positive integer of 0 or 1 to 20, and R' is an organic group.)

Preferably, Q is a divalent group —$CH_2$—O—$CH_2$—, m is a positive integer of 0 or 1 to 10, and R' is an organic group having less than 20 carbon atoms. More preferably, m is a positive integer of 0 or 1 to 5, and R' is a $C_4$-$C_{12}$ organic group. Specifically, examples thereof include alkyl phenol formaldehyde resins, methylolated alkyl phenol resins, halogenated alkyl phenol resins, and the like, preferably halogenated alkyl phenol resins, further preferably those with the end hydroxyl group brominated. An example of a phenol resin-based curing resin with the end brominated is represented by the following general formula (II).

[Chem. 13]

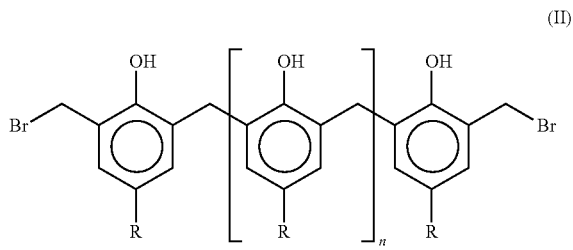

(II)

wherein n is an integer of 0 to 10, and R is a $C_1$-$C_{15}$ saturated hydrocarbon group.

Examples of products of the phenol resin-based curing resins include TACKIROL® 201 (alkyl phenol formaldehyde resin, made by Taoka Chemical Co., Ltd.), TACKIROL® 250-I (brominated alkyl phenol formaldehyde resin that is 4% brominated, made by Taoka Chemical Co., Ltd.), TACKIROL® 250-III (brominated alkyl phenol formaldehyde resin, made by Taoka Chemical Co., Ltd.), PR-4507 (made by Gunei Chemical Industry Co., Ltd.), Vulkaresat 510E (made by Hoechst), Vulkaresat 532E (made by Hoechst), Vulkaresen E (made by Hoechst), Vulkaresen 105E (made by Hoechst), Vulkaresen 130E (made by Hoechst), Vulkaresol 315E (made by Hoechst), Amberol ST 137X (made by Rohm & Haas), SUMILITERESIN® PR-22193 (made by Sumitomo Durez Co., Ltd.), Symphorm-C-100 (made by Anchor Chem.), Symphorm-C-1001 (made by Anchor Chem.), TAMANOL® 531 (made by Arakawa Chemical Industries, Ltd.), Schenectady SP1059 (made by Schenectady Chem.), Schenectady SP1045 (made by Schenectady Chem.), CRR-0803 (made by U.C.C), Schenectady SP1055F (made by Schenectady Chem., brominated alkyl phenol.formaldehyde resin), Schenectady SP1056 (made by Schenectady Chem.), and CRM-0803 (made by Showa Union Synthesis Co., Ltd.), Vulkadur A (made by Bayer). Among these, halogenated phenol resin-based cross-linking agents are preferable, and brominated alkyl phenol.formaldehyde resins such as TACKIROL® 250-I, TACKIROL® 250-III, and Schenectady SP1055F are preferably used.

In addition, specific examples of cross-linking with thermoplastic vulcanized rubber phenol resins are described in U.S. Pat. Nos. 4,311,628 A, 2,972,600 A, 3,287,440 A, and these technologies can also be used in the present invention.

U.S. Pat. No. 4,311,628 A discloses a phenol-based vulcanizing agent system (phenolic curative system) composed of a phenol-based curing resin (phenolic curing resin), and a vulcanizing activating agent (cure activator). A basic component of the system is a phenol resin-based cross-linking agent produced by condensation of a substituted phenol (for example, halogen substituted phenol or $C_1$-$C_2$ alkyl substituted phenol) or an unsubstituted phenol and an aldehyde, preferably formaldehyde, in an alkali medium, or by condensation of a bifunctional phenol dialcohol (preferably, dimethylol phenol substituted by a $C_5$-$C_{10}$ alkyl group at the para position). Halogenated alkyl substituted phenol resin-based cross-linking agents produced by halogenating an alkyl substituted phenol resin-based cross-linking agent is particularly suitable. A phenol resin-based cross-linking agent composed of a methylol phenol curing resin, a halogen donor, and a metal compound is particularly recommendable, the details of which are described in U.S. Pat. No. 3,287,440 A, 3,709,840 A. A non-halogenated phenol resin-based cross-linking agent is used together with a halogen donor, preferably a halogenated hydrogen scavenger. Usually, halogenated phenol resin-based cross-linking agents, preferably brominated phenol resin-based cross-linking agents containing 2 to 10% by weight of bromine, do not need a halogen donor, but are used together with a halogenated hydrogen scavenger such as a metal oxide such as, for example, iron oxide, titanium oxide, magnesium oxide, magnesium silicate, silicon dioxide, and zinc oxide, preferably zinc oxide. Usually 1 to 20 parts by weight of such a halogenated hydrogen scavenger as these including zinc oxide is used relative to 100 parts by weight of phenol resin-based cross-linking agent. The presence of such a scavenger facilitates the cross-linking action of a phenol resin-based cross-linking agent, but, for a rubber which is not easily vulcanized with a phenol resin-based cross-linking agent, a halogen donor and a zinc oxide are desirably used together therewith. A method for producing a halogenated phenol-based curing resin and uses thereof in a vulcanizing agent system using zinc oxide are described in U.S. Pat. Nos. 2,972,600 A, 3,093,613 A, the disclose of which, together with the disclose of U.S. Pat. Nos. 3,287,440 A, 3,709,840 A, is incorporated herein by reference. Examples of suitable halogen donors include tin chloride, ferric chloride, or chlorinated paraffin, and halogen-donating polymers such as chlorinated polyethylene, chlorosulfonated polyethylene, and polychlorobutadiene (neoprene rubber). As used herein, the term "vulcanizing accelerator" refers to any substance that substantially increases the cross-linking efficiency of a phenol resin-based cross-linking agent and encompasses metal oxides and halogen donors, and these are used singly or in combination. For more detail of a phenol-based vulcanizing agent system, see "Vulcanization and Vulcanizing Agents" (W. Hoffman, Palmerton Publishing Company). Suitable phenol resin-based cross-linking agents and brominated phenol resin-based cross-linking agents are commercially available and, for example, cross-linking agents can be purchased from Schenectady Chemicals, Inc. under the trade name of "SP-1045", "CRJ-352", "SP-1055F", and "SP-1056". Similar phenol resin-based cross-linking agents that are equivalent in effect are available from other suppliers.

The cross-linking agent (C) generates a smaller amount of decomposition product and hence is a preferred vulcanizing agent in view of prevention of fogging. The cross-linking agent (C) is used in an amount sufficient to achieve the essentially complete vulcanization of rubber.

In dynamically cross-linking by the cross-linking agent (C) in the present invention (1) or (2), aids can be blended such as sulfur; peroxyl cross-linking aids such as p-quinonedioxime, p,p'-dibenzoylquinonedioxime, N-methyl-N-4-dinitrosoaniline, nitrosobenzene, diphenylguanidine, and trimethylolpropane-N,N'-m-phenylenedimaleimide;
multifunctional methacrylate monomers such as divinylbenzene, triallyl cyanurate, ethyleneglycol dimethacrylate, diethyleneglycol dimethacrylate, polyethyleneglycol dimethacrylate, trimethylolpropane trimethacrylate, and allyl methacrylate; multifunctional vinyl monomers such as vinyl butyrate and vinyl stearate; and the like.

Uniform and gentle cross-linking reactions can be expected by using the aforementioned aids. As the aid, divinylbenzene is preferable. Divinylbenzene is easy to handle, has a favorable compatibility with the polymer (A) that is included as a main component in the composition (I) or (IIC), and with the copolymer (1B) or the copolymer (2B), has the effect of solubilizing the cross-linking agent (C), and acts as a dispersion agent of the cross-linking agent (C), so that the cross-linking effect by thermal treatment is homogeneous, allowing a thermoplastic elastomer composition (I) or (IIC) having a balance between fluidity and physical properties to be obtained.

The aid is used in an amount of usually 2 parts by weight or less, preferably 0.3 to 1 parts by weight, relative to 100 parts by weight of the copolymer (1B) or (2B).

In addition, a decomposition accelerator may be used to accelerate the decomposition of the cross-linking agent (C). Examples of decomposition accelerators include tertiary amines such as triethylamine, tributylamine, and 2,4,6-tri (dimethyl amino)phenol;

aluminum, cobalt, vanadium, copper, calcium, zirconium, manganese, magnesium, lead, mercury, and the like; naphthenates from naphthenic acid and various metals (for example, Pb, Co, Mn, Ca, Cu, Ni, Fe, Zn, rare earths); and the like.

<Other Components>

To the composition (I) or (IIC) according to the present invention, additives other than the polymer (A), the copolymer (1B), or the copolymer (2B), and the cross-linking agent (C) may be blended to the extent that the effects of the present invention are not impaired. Examples of additives include, but are not particularly limited to, a softener (D), an inorganic filler (E), and the like. In addition, examples of additives include known additives used in the field of polyolefin, such as: rubbers other than the copolymer (1B) or the copolymer (2B) (for example, polyisobutylene, butyl rubber, propylene-based elastomers such as propylene.ethylene copolymer rubber, propylene.butene copolymer rubber, and propylene.butene.ethylene copolymer rubber, ethylene-based elastomers such as ethylene.propylene copolymer rubber, styrene-based elastomers such as styrene.butadiene.styrene block polymer, styrene.isoprene.styrene block polymer, styrene.isobutylene.styrene block polymer, and hydrogen additives thereof); resins other than a crystalline olefin polymer (A), such as thermosetting resins and thermoplastic resins such as polyolefin; ultraviolet absorbers; antioxidants; heat stabilizers; age resistors; light stabilizers, weathering stabilizers; antistatic agents; metal soaps; aliphatic amides; lubricants such as wax; and the like.

These additives may be used singly or in combination of two or more kinds thereof.

In addition, the blending amounts of additives other than the additives particularly mentioned herein are not limited to particular values as long as the effects of the present invention are achieved, and are each in the order of usually 0.0001 to 10 parts by weight, preferably 0.01 to 5 parts by weight, relative to 100 parts by weight of a total of the polymer (A) and the copolymer (1B) or (2B).

As the softener (D), softeners usually used for rubber can be used. Examples of softeners (D) include petroleum-based softeners such as process oil, lubricating oil, paraffin oil, liquid paraffin, petroleum asphalt, and Vaseline; coal tar-based softeners such as coal tar and coal tar pitch; fatty oil-based softeners such as castor oil, linseed oil, rapeseed oil, soybean oil, and coconut oil; tall oil; rubber substitute (factice); wax such as beeswax, carnauba wax, and lanolin; fatty acids or fatty acid salts thereof such as ricinoleic acid, palmitic acid, stearic acid, barium stearate, calcium stearate, and zinc laurate; naphthenic acid; pine oil, rosin or derivatives thereof; synthetic polymer materials such as terpene resins, petroleum resins, atactic polypropylene, and coumarone indene resins; ester-based softeners such as dioctyl phthalate, dioctyl adipate, and dioctyl sebacate; microcrystalline wax, liquid polybutadiene, modified liquid polybutadiene, liquid thiokol, and hydrocarbon-based synthetic lubricating oil; and the like.

These softeners (D) are used in an amount of usually 2 to 100 parts by weight, preferably 5 to 80 parts by weight, relative to 100 parts by weight of a total of the polymer (A) and the copolymer (1B) or (2B), but are not particularly limited thereto as long as the effects of the present invention are achieved. When the softener (D) is used in such an amount, the composition (I) or (IIC) has an excellent fluidity during the manufacturing and molding thereof, has an enhanced dispersibility of carbon black and the like, does not allow the mechanical properties of the obtained molded article to be easily lowered, and also results in the obtained molded article having an excellent heat resistance and heat aging resistance.

Examples of inorganic fillers (E) include calcium carbonate, calcium silicate, clay, kaolin, talc, silica, silious earth, mica powder, asbestos, alumina, barium sulfate, aluminum sulfate, calcium sulfate, basic magnesium carbonate, molybdenum disulfide, graphite, carbon black, glass fiber, glass bulb, shirasu balloon, basic magnesium sulfate whisker, calcium titanate whisker, aluminum borate whisker, and the like.

These inorganic fillers (E) are used in an amount of usually 1 to 100 parts by weight, preferably 1 to 50 parts by weight, relative to 100 parts by weight of a total of the polymer (A) and the copolymer (1B) or (2B).

For examples of age resistors, the composition (2B) illustrated below can be referred to.

When a rubber other than the copolymer (1B) or (2B) is used, the rubber is used in an amount of usually 2 to 200 parts by weight, preferably 5 to 150 parts by weight, relative to 100 parts by weight of a total of the polymer (A) and the copolymer (1B) or (2B).

[Compositions in the Present Invention (1) or (2), Production Method Thereof, and Molded Article Thereof]

[Thermoplastic Elastomer Composition (I) or Thermoplastic Elastomer Composition (IIC)]

A thermoplastic elastomer composition (I) according to the present invention (1) is obtained by dynamically cross-linking a mixture containing a polymer (A), a copolymer (1B), and a cross-linking agent (C). The composition (I) is obtained by dynamically cross-linking at least the polymer (A), the copolymer (1B), and the cross-linking agent (C).

The composition (I) is obtained by dynamically thermal-treating and cross-linking (dynamically cross-linking) a mixture containing the polymer (A), the copolymer (1B), and an additive which is blended if necessary, in the presence of the cross-linking agent (C).

It is not until dynamically cross-linking the polymer (A) and the copolymer (1B) with the cross-linking agent (C) that the composition (I) which is lightweight and has a high strength, an excellent oil resistance, and in addition excellent mechanical properties can be obtained.

A thermoplastic elastomer composition (IIC) according to the present invention (2) is obtained by dynamically cross-linking a mixture containing a polymer (A), a copolymer (2B), and a cross-linking agent (C). The composition (IIC)

is obtained by dynamically cross-linking at least the polymer (A), the copolymer (2B), and the cross-linking agent (C).

The composition (IIC) is obtained by dynamically thermal-treating and cross-linking (dynamically cross-linking) a mixture containing the polymer (A), the copolymer (2B), and an additive which is blended if necessary, in the presence of the cross-linking agent (C).

It is not until dynamically cross-linking the polymer (A) and the copolymer (2B) with the cross-linking agent (C) that the composition (IIC) which is lightweight and has a high strength, an excellent oil resistance, and in addition excellent mechanical properties can be obtained.

As used herein, "dynamically thermal-treating" refers to kneading the mixture in the molten state in the presence of the cross-linking agent (C). In addition, "dynamically cross-linking" refers to cross-linking a mixture while adding a shearing force thereto.

The composition (I) or (IIC) may be a composition wherein polymer components containing the polymer (A) and the copolymer (1B) or (2B) are partially cross-linked or completely cross-linked.

In the composition (I) or (IIC), the weight ratio (A)/(1B) or weight ratio (A)/(2B) of the polymer (A) to the copolymer (1B) or (2B) is preferably 90/10 to 10/90, more preferably 60/40 to 20/80. When the weight ratio (A)/(1B) or weight ratio (A)/(2B) is in the aforementioned range, molded articles having excellent mechanical properties and an excellent formability can be obtained.

In the composition (I) or (IIC), the cross-linking agent (C) is used in an amount of usually 0.1 to 20 parts by weight, preferably 1 to 10 parts by weight, relative to 100 parts by weight of the copolymer (1B) or (2B). The blending amount of the cross-linking agent (C) in the aforementioned range allows a composition having an excellent formability to be obtained, and, in addition, the obtained molded article has a high strength, an excellent oil resistance, and sufficient heat resistance and mechanical properties.

Dynamic thermal treatment is preferably carried out in a closed type device, and preferably carried out in an inert gas atmosphere such as nitrogen and carbon dioxide. The thermal treatment temperature is in the range of usually the melting point of the polymer (A) to 300° C., preferably 150 to 280° C., more preferably 170 to 270° C. The kneading time is usually 1 to 20 minutes, preferably 1 to 10 minutes. In addition, the added shearing force is in the range of usually 10 to 100,000 $sec^{-1}$, preferably 100 to 50,000 $sec^{-1}$, preferably 1,000 to 10,000 $sec^{-1}$, further preferably 2,000 to 7,000 $sec^{-1}$, as the highest shear rate.

Examples of kneading devices in kneading include mixing rolls, intensive mixers (for example, Banbury mixers, kneaders), uniaxial extruders, biaxial extruders, and the like. As these kneading devices, closed type devices are preferable.

The composition (I) or (IIC), and molded articles obtained by molding the composition (I) or (IIC) by a conventionally known method are lightweight, have better oil resistance than those provided by conventional cross-linked thermoplastic elastomers, and have hardness and mechanical properties such as tensile strength and tensile elongation that are equal to or superior to those provided by conventional cross-linked thermoplastic elastomers.

[Molded Article According to the Present Invention (1) or Molded Article According to the Present Invention (2)]

A molded article according to the present invention (1) is obtained including the composition (I) according to the present invention (1).

A molded article according to the present invention (2) is obtained including the composition (IIC) according to the present invention (2).

The compositions (I) and (IIC) have hardness and mechanical properties (tensile strength and tensile elongation) that are equal to or superior to those provided by conventional cross-linked thermoplastic elastomers, and hence can be used for various uses. In addition, the compositions (I) and (IIC) have better oil resistance than those provided by conventional cross-linked thermoplastic elastomers, and hence are preferably used particularly in fields wherein it is difficult to use conventional cross-linked thermoplastic elastomers, for example, for automobile parts such as hoses, pipes, and boots (blow molded articles) for automobiles, which parts require better oil resistance because they are in contact with grease and lubricating oil.

The compositions (I) and (IIC) also have excellent lightweight properties, heat resistance, flexibility, rubber elasticity, formability, weather resistance, and compatibility.

The compositions (I) and (IIC) have an excellent formability and hence can be molded by different molding methods. Examples of the molding methods include extrusion molding, injection molding, compression molding, calender molding, vacuum molding, press molding, stamping molding, blow molding, and the like. Examples of blow molding methods include press blow molding, direct blow molding, injection blow molding, and the like.

A molded article according to the present invention (1) or (2) is obtained by molding the composition (I) or (IIC). For example, it is obtained by molding the composition (I) or (IIC) by a conventional plastics molding method such as extrusion molding, injection molding, or compression molding. In addition, wastes and burrs generated from such a molding method can be recovered and reused.

Examples of molded articles according to the present invention (1) or (2) include: automobile parts such as bumper parts, body panels, side shields, glass run channels, instrument panel surface films, door surface films, ceiling surface films, weatherstrip materials, hoses, steering wheels, boots, wire harness covers, and seat adjuster covers; electrical parts such as wire sheaths, connectors, and cap plugs; footwear such as shoe soles and sandals; leisure goods such as swimming fins, water glasses, golf club grips, and baseball bat grips; gaskets, waterproof cloths, belts, garden hoses; various gaskets and sheets for civil engineering/construction; and the like. The molded articles are suitable particularly for uses which require oil resistance, and examples of particularly preferable uses include automobile parts such as hoses, boots, wire harness covers, and seat adjuster covers for automobiles.

For molded articles, automobile parts are preferable as aforementioned, and more detailed examples of automobile parts include mechanism members, interior members, exterior members, and other members.

Examples of mechanism members include CVJ boots, suspension boots, rack and pinion boots, steering rod covers, shift lever cushions for automatic transmission, slide covers for automatic transmission, leaf spring bushes, ball joint retainers, timing belts, V-belts, hoses in the engine room, air ducts, airbag covers, propeller shaft cover materials, and the like.

Examples of interior members include various surface film materials (instrumental panels, door trims, ceilings, rear pillars), console boxes, arm rests, airbag case lids, shift knobs, assist grips, side step mats, reclining seat covers, sheets in the trunk, sheet belt buckles, lever slide plates, door latch strikers, sheet belt parts, switches, and the like.

Examples of exterior members include various molding materials (inner/outer window moldings, roof moldings, belt moldings, side trim moldings), door seals, body seals, glass run channels, mudguards, kicking plates, step mats, license plate housings, silencing gears, control cable covers, emblems, and the like.

Examples of other members include air duct packings, air duct hoses, air duct covers, air intake pipes, air dam skirts, timing belt cover seals, opening seal/trunk seal members, bonnet cushions, fuel tank bands, cables, and the like.

Molded articles according to the present invention (1) or (2) may be sundries, daily necessities, or members thereof. Examples of sundries, daily necessities, or members thereof include grips (for example, grips such as of ball-point pens, propelling pencils, toothbrushes, cups, disposable razors, handrails, cutters, electric tools, screwdrivers, power supply cables, and doors) assist grips, shift knobs, toys, notebook surface films, gaskets (for example, gaskets such as of tableware/Tupperware), various rubber legs, sports goods (for example, sports goods such as shoe soles, ski boots, skis, ski bindings, soles of ski, golf balls, goggle members, snowboard members, snowboard shoes, snowboard bindings, surfboard members, bodyboards, banana boats, kiteboards, snorkeling members, water ski members, parasailing members, and wakeboard members), belts (for example, belts such as belts for watches and fashion belts), hairbrushes, bath panel button sheets, caps, shoe inner soles, health appliances members, and the like.

[Composition (IIA) Containing Ethylene.α-Olefin.Non-Conjugated Polyene Copolymer (2B) According to the Present Invention (2)]

The copolymer (2B) according to the present invention (2) is generally used in the form of a composition containing a component(s) other than the copolymer, and forming and cross-linking it allows a desired molded article to be obtained.

The components other than the copolymer (2B) which are contained in the composition (IIA) are not limited to particular ones, and the components other than the copolymer (2B) can be blended as appropriate in accordance with the uses and purposes of the composition and molded articles formed from the composition. Examples of components other than the copolymer (2B) include softeners, inorganic fillers, cross-linking agents, processing aids, activators, moisture absorbents, heat stabilizers, weathering stabilizers, antistatic agents, coloring agents, lubricants, thickeners, and the like.

When a softener and a filler are blended, the blending amounts are generally 0.1 to 200 parts by weight of the softener and 1 to 300 parts by weight of the filler relative to 100 parts by weight of a total of the copolymer (2B) and other polymer(s) (elastomer, rubber, or the like) blended if necessary.

When the composition (IIA) is used for a rubber composition, it can be blended with another elastomer, rubber, or the like, if necessary.

When used for a rubber composition, the copolymer (2B) in the rubber composition has a proportion of generally 20% by weight or more, preferably 30 to 90% by weight.

The composition (IIA) can be prepared by kneading the copolymer (2B) and other component(s) which is/are blended as necessary at a desired temperature, using a kneading machine, such as, for example, a mixer, kneader, or a roll. The composition can be prepared favorably because the copolymer (2B) has an excellent kneadability.

As other components such as softeners, inorganic fillers, cross-linking agents, processing aids, activators, moisture absorbents, and the like, for example, those illustrated in the undermentioned description of compositions for forming hoses can be used in such amounts as illustrated.

[Molded Article According to the Present Invention (2)]

The copolymer (2B) according to the present invention (2) can be used for various uses as a molded article formed from the copolymer, a molded article formed by the cross-linking treatment of the copolymer (2B), a molded article produced by cross-linking the copolymer (2B), a molded article formed from a composition containing the copolymer (2B), a molded article formed by the cross-linking treatment of a composition containing the copolymer (2B), or a molded article produced by cross-linking a composition containing the copolymer (2B).

As molded articles, molded articles formed by the cross-linking treatment of the composition (IIA) containing the copolymer (2B) are preferable. In addition, cross-linked molded articles and cross-linked foams (cross-linked foamed molded articles) are preferable as molded articles.

Specifically, examples of molded articles include rubbers for tires, O-rings, industrial rolls, packings (e.g., condenser packings), gaskets, belts (e.g., heat-insulating belts, printing machine belts), hoses (e.g., water hoses, brake reservoir hoses, radiator hoses), prevention rubber, sponges (e.g., weatherstrip sponges, heat-insulating sponges, protection sponges, slightly-foamed sponges), cables (ignition cables, cab tire cables, high tension cables), wire coating materials (high voltage wire coating materials, low voltage wire coating materials, marine wire coating materials), glass run channels, color surface film materials, paper feeding rolls, roofing sheets and the like.

The copolymer (2B) can preferably be used as the composition (IIB) for forming hoses which contains the copolymer (2B) and as the thermoplastic elastomer composition (IIC) obtained by dynamically cross-linking a mixture containing the copolymer (2B), the polymer (A), and the cross-linking agent (C).

[Composition (IIB) for Hose-Forming According to the Present Invention (2)]

The composition (IIB) for forming hoses according to the present Invention contains the copolymer (2B). The composition for forming hoses which contains the copolymer (2B) is also referred to as a hose-forming composition.

The copolymer (2B) has flexibility at low temperature and exhibits a good balance between rubber elasticity at low temperature and tensile strength at ambient temperature because the compression set at low temperature is small and the results of a torsion test at low temperature are good. Accordingly, the hose-forming composition containing the copolymer (2B) can be used suitably for the applications of automobiles, motor bikes, industrial machines, construction machines, agricultural machines, and the like which may be used in a cold climate.

For the composition (IIB), the content of the copolymer (2B) in the composition is usually 20% by mass or more, preferably 20 to 50% by mass, and more preferably 25 to 40% by mass.

<<Other Components>>

The composition (IIB) according to the present invention preferably contains a cross-linking agent in addition to the copolymer (2B).

The composition (IIB) may contain other polymer(s) than the copolymer (2B). Examples of other polymers which need to be cross-linked include cross-linking rubber such as natural rubber, isoprene rubber, butadiene rubber, styrene butadiene rubber, chloroprene rubber, nitrile rubber, butyl rubber, acrylic rubber, silicone rubber, fluororubber, and urethane rubber. Examples of other polymers which do not need to be cross-linked include elastomers such as styrene-based thermoplastic elastomers (TPS), for example, styrene-butadiene block copolymers (SBS), polystyrene-poly(ethylene-butylene)-polystyrene (SEBS) and polystyrene-poly(ethylene-propylene)-polystyrene (SEPS), olefin thermoplastic elastomers (TPO), vinyl chloride elastomers (TPVC), ester-based thermoplastic elastomers (TPC), amide-based thermoplastic elastomers (TPA), urethane thermoplastic elastomers (TPU) and other thermoplastic elastomers (TPZ). Other polymer(s) can be blended in an amount of usually 100 parts by mass or less, preferably 80 parts by mass or less, relative to 100 parts by mass of the copolymer (2B).

The composition (IIB) may contain other additives depending on the purpose, for example, at least one selected from cross-linking aids, vulcanizing accelerators, vulcanizing aids, softeners, inorganic fillers, reinforcing agents, age resistors, processing aids, activators, moisture absorbents, heat stabilizers, weathering stabilizers, antistatic agents, coloring agents, lubricants, thickeners, and foaming agents. In addition, additives each may be used singly or in combination of two or more kinds thereof.

The composition (IIB) can be prepared by kneading the copolymer (2B) and other component(s) which is/are blended as necessary at a desired temperature, using a kneading machine, such as, for example, a mixer, kneader, or a roll. The composition (IIB) can be prepared favorably because the copolymer (2B) has an excellent kneadability.

Specifically, the composition (IIB) can be prepared by kneading the copolymer (2B) and another component 1 if necessary at a predetermined temperature for a predetermined period of time, for example, at 80 to 200° C. for 3 to 30 minutes, using a conventionally known kneading machine such as a mixer or a kneader, and then adding to the resulting kneaded material another component 2 if necessary such as a cross-linking agent, using a roll, at a predetermined temperature for a predetermined period of time, for example, at a roll temperature of 30 to 80° C. for 1 to 30 minutes.

Examples of the another component 1 include at least one selected from other polymers, cross-linking aids, vulcanizing accelerators, vulcanizing aids, softeners, inorganic fillers, reinforcing agents, age resistors, processing aids, activators, moisture absorbents, heat stabilizers, weathering stabilizers, antistatic agents, coloring agents, lubricants and thickeners. Examples of the another component 2 include, for example, cross-linking agents (vulcanizing agents) and at least one selected from cross-linking aids, vulcanizing accelerators, vulcanizing aids, softeners, inorganic fillers, reinforcing agents, age resistors, processing aids, activators, moisture absorbents, heat stabilizers, weathering stabilizers, antistatic agents, coloring agents, lubricants, thickeners and foaming agents.

<Cross-Linking Agent, Cross-Linking Aid, Vulcanizing Accelerator, and Vulcanizing Aid>

For the composition (IIB), examples of cross-linking agents include cross-linking agents which are generally used to cross-link rubber such as organic peroxides, phenol resins, sulfur compounds, hydrosilicone compounds, amino resins, quinones or derivatives thereof, amine compounds, azo compounds, epoxy compounds, and isocyanate compounds. Among these, organic peroxides and sulfur compounds (hereinafter also referred to as "vulcanizing agent") are suitable.

Examples of organic peroxides include dicumyl peroxide, di-tert-butylperoxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropylcarbonate, diacetyl peroxide, lauroyl peroxide, and tert-butyl cumyl peroxide.

Among these, difunctional organic peroxides such as 2,5-di-(tert-butylperoxy)hexane, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, and n-butyl-4,4-bis(tert-butylperoxy)valerate are preferable, and 2,5-di-(tert-butylperoxy)hexane, and 2,5-dimethyl-2,5-di-(tert-butylperoxy)hexane are the most preferable.

When an organic peroxide is used as a cross-linking agent, the blending amount of the organic peroxide in the composition (IIB) is usually 0.1 to 20 parts by mass, preferably 0.2 to 15 parts by mass, more preferably 0.5 to 10 parts by mass, relative to 100 parts by mass of a total of the copolymer (2B) and other polymer(s) which need(s) to be cross-linked (cross-linking rubber, etc.) which is/are blended if necessary. When the blending amount of the organic peroxide is within the aforementioned range, the resulting hose has no bloom on its surface, and the composition (IIB) exhibits an excellent cross-linking characteristic.

When an organic peroxide is used as a cross-linking agent, it is preferred that a cross-linking aid is used in combination.

Examples of cross-linking aids include sulfur; quinone dioxime based cross-linking aids such as p-quinonedioxime; acrylic cross-linking aids, e.g., ethylene glycol dimethacrylate and trimethylolpropane trimethacrylate; allyl cross-linking aids, e.g., diallyl phthalate and triallyl isocyanurate; maleimide-based cross-linking aids; divinylbenzene; and metal oxides such as zinc oxide (e.g., ZnO #1.zinc oxide No. 2, produced by HakusuiTech Co., Ltd.), magnesium oxide, and zinc white (e.g., zinc oxide such as "META-Z102" (trade name; produced by Inoue Calcium Corporation)).

When a cross-linking aid is used, the blending amount of the cross-linking aid in the composition (IIB) is usually 0.5 to 10 mol, preferably 0.5 to 7 mol, more preferably 1 to 5 mol, relative to 1 mol of the organic peroxide.

Examples of sulfur compounds (vulcanizing agent) include sulfur, sulfur chloride, sulfur dichloride, morpholine disulfide, alkylphenol disulfide, tetramethylthiuram disulfide, and selenium dithiocarbamate.

When a sulfur compound is used as a cross-linking agent, the blending amount of the sulfur compound in the composition (IIB) is usually 0.3 to 10 parts by mass, preferably 0.5 to 7.0 parts by mass, more preferably 0.7 to 5.0 parts by mass, relative to 100 parts by mass of a total of the copolymer (2B) and other polymer(s) which need(s) to be cross-linked (cross-linking rubber, etc.) which is/are blended as necessary. When the blending amount of the sulfur compound is within the aforementioned range, the resulting hose has no bloom on its surface, and the composition (IIB) exhibits an excellent cross-linking characteristic.

When a sulfur compound is used as a cross-linking agent, it is preferred to use a vulcanizing accelerator in combination.

Examples of vulcanizing accelerators include thiazole-based vulcanizing accelerators such as N-cyclohexyl-2-benzothiazolesulfenamide, N-oxydiethylene-2-benzothiazolesulfenamide, N,N'-diisopropyl-2-benzothiazolesulfenamide, 2-mercaptobenzothiazole (e.g., Sanceler M (trade name; produced by Sanshin Chemical Industry Co., LTD.)), 2-(4- morphorinodithio)benzothiazole (e.g., NOCCELER MDB-P (trade name; produced by OUCHI SHINKO CHEMICAL INDUSTRIAL CO., LTD)), 2-(2,4-dinitrophenyl)mercaptobenzothiazole, 2-(2,6-diethyl-4-morphorinothio)benzothiazole and dibenzothiazyl disulfide (e.g., Sanceler DM (trade name; produced by Sanshin Chemical Industry Co., LTD.)); guanidine-based vulcanizing accelerators such as diphenylguanidine, triphenylguanidine, and di-ortho-tolylguanidine; aldehydeamine-based vulcanizing accelerators such as acetaldehyde.aniline condensate and butylaldehyde.aniline condensate; imidazoline-based vulcanizing accelerators such as 2-mercaptoimidazoline; thiuram-based vulcanizing accelerators such as tetramethylthiurammonosulfide (e.g., Sanceler TS (trade name; produced by Sanshin Chemical Industry Co., LTD.)), tetramethylthiuram disulfide(e.g., Sanceler TT (trade name; produced by Sanshin Chemical Industry Co., LTD.)), tetraethylthiuram disulfide (e.g., Sanceler TET (trade name; produced by Sanshin Chemical Industry Co., LTD.)), tetrabutylthiuram disulfide (e.g., Sanceler TBT (trade name; produced by Sanshin Chemical Industry Co., LTD.)) and dipentamethylenethiuram tetrasulfide(e.g., Sanceler TRA (trade name; produced by Sanshin Chemical Industry Co., LTD.)); dithioic acid salt-based vulcanizing accelerators such as zinc dimethyldithiocarbamate, zinc diethyldithiocarbamate, zinc dibutyldithiocarbamate (e.g., Sanceler PZ, Sanceler BZ and Sanceler EZ (trade names; produced by Sanshin Chemical Industry Co., LTD.) and tellurium diethyldithiocarbamate; thiourea-based vulcanizing accelerator such as ethylenethiourea (e.g., Sanceler BUR (trade name; produced by Sanshin Chemical Industry Co., LTD.), Sanceler 22-C (trade name; produced by Sanshin Chemical Industry Co., LTD.), N,N'-diethylthiourea and N,N'-dibutylthiourea; and xanthate-based vulcanizing accelerators such as zinc dibutylxanthate.

When a vulcanizing accelerator is used, the blending amount of the vulcanizing accelerator in the composition (IIB) is usually 0.1 to 20 parts by mass, preferably 0.2 to 15 parts by mass, preferably 0.5 to 10 parts by mass, relative to 100 parts by mass of a total of the copolymer (2B) and other polymer(s) which need(s) to be cross-linked (cross-linking rubber and the like) which is/are blended as necessary. When the blending amount of the vulcanizing accelerator is within the aforementioned range, the resulting hose has no bloom on its surface, and the composition (IIB) exhibits an excellent cross-linking characteristic.

When a sulfur compound is used as a cross-linking agent, a vulcanizing aid can be used in combination.

Examples of vulcanizing aids include zinc oxide (e.g., ZnO #1.zinc oxide No. 2, produced by HakusuiTech Co., Ltd.), magnesium oxide, and zinc white (e.g., zinc oxide such as "META-2102" (trade name; produced by Inoue Calcium Corporation)).

When a vulcanizing aid is used, the blending amount of the vulcanizing aid in the composition (IIB) is usually 1 to 20 parts by mass, relative to 100 parts by mass of a total of the copolymer (2B) and other polymer(s) which need(s) to be cross-linked (cross-linking rubber, etc.) which is/are blended as necessary.

<Softener>

Examples of softeners include the aforementioned examples of the softener (D). As softeners for the composition (IIB), petroleum-based softeners are preferable, and process oil is particularly preferable.

When the composition (IIB) contains a softener, the blending amount of the softener is usually 2 to 100 parts by mass, preferably 10 to 100 parts by mass, relative to 100 parts by mass of a total of the copolymer (2B) and other polymer(s) (elastomer, cross-linking rubber, etc.) which is/are blended as necessary.

<Inorganic Filler>

Examples of inorganic fillers include light calcium carbonate, heavy calcium carbonate, talc, clay, and the like. Among these, heavy calcium carbonate such as "Whiton SB" (trade name; SHIRAISHI CALCIUM KAISHA, LTD.) is preferable.

When the composition (IIB) contains an inorganic filler, the blending amount of the inorganic filler is usually 2 to 100 parts by mass, preferably 5 to 100 parts by mass, relative to 100 parts by mass of a total of the copolymer (2B) and other polymer(s) (elastomer, cross-linking rubber, etc.) which is/are blended as necessary. When the blending amount of the inorganic filler is within the above range, the composition (IIB) has excellent kneadability, and a hose with excellent mechanical properties can be obtained.

<Reinforcing Agent>

Examples of reinforcing agents include carbon black, carbon black produced though surface treatment with a silane coupling agent, silica, calcium carbonate, activated calcium carbonate, fine powder talc, fine powder silicic acid, and the like.

When the composition (IIB) contains a reinforcing agent, the blending amount of the reinforcing agent is usually 30 to 200 parts by mass, preferably 50 to 180 parts by mass, relative to 100 parts by mass of a total of the copolymer (2B) and other polymer(s) (elastomer, cross-linking rubber, etc.) which is/are blended as necessary.

<Age Resistor (Stabilizer)>

By blending an age resistor (stabilizer) into the composition (IIB), the product life of a hose formed therefrom can be increased. Examples of such age resistors include previously known age resistors, for example, amine-based age resistors, phenol-based age resistors, and sulfur-based age resistors.

Examples of age resistors include aromatic secondary amine-based age resistors such as phenylbuthylamine and N,N-di-2-naphthyl-p-phenylenediamine; phenol-based age resistors such as dibutylhydroxytoluene and tetrakis[methylene(3,5-di-t-butyl-4-hydroxy)hydrocinnamate]methane; thioether-based age resistors such as bis[2-methyl-4-(3-n-alkylthiopropionyloxy)-5-t-butylphenyl]sulfide; dithiocarbamate-based age resistors such as nickel dibutyldithiocarbamate; sulfur-based age resistors such as 2-mercaptobenzoylimidazole, zinc salt of 2-mercaptobenzimidazole, dilauryl thiodipropionate, distearyl thiodipropionate, and the like.

When the composition (IIB) contains an age resistor, the blending amount of the age resistor is usually 0.3 to 10 parts by mass, preferably 0.5 to 0.7 parts by mass, relative to 100 parts by mass of a mass of the copolymer (2B) and other polymer(s) (elastomer, cross-linking rubber, etc.) which is/are blended as necessary. When the blending amount of the age resistor is within the above range, the resulting hose has no bloom on its surface, and the inhibition of vulcanization can be prevented.

<Processing Aid>

For processing aids, those which are generally blended in rubber as processing aids can be widely used. Examples of processing aids include fatty acids such as ricinoleic acid, stearic acid, palmitic acid and lauric acid, fatty acid salts such as barium stearate, zinc stearate and calcium stearate, fatty acid esters such as ricinoleic acid esters, stearic acid esters, palmitic acid esters, lauric acid esters and fatty acid derivatives such as N-substituted fatty acid amide. Among these, stearic acid is preferable.

When the composition (IIB) contains a processing aid, the blending amount of the processing aid is usually 10 parts by mass or less, preferably 8.0 parts by mass or less, relative to 100 parts by mass of a total of the copolymer (2B) and other polymer(s) (elastomer, cross-linking rubber, etc.) which is/are blended as necessary.

<Activator>

Examples of activators include amines such as di-n-butylamine, dicyclohexylamine, and monoethanolamine; activators such as diethylene glycol, polyethylene glycol, lecithin, triallyl trimellitate, and zinc compounds of aliphatic or aromatic carboxylic acids; zinc peroxide adjusted substances; octadecyltrimethylammonium bromide, synthetic hydrotalcite, and special quaternary ammonium compounds.

When the composition (IIB) contains an activator, the blending amount of the activator is usually 0.2 to 10 parts by mass, preferably 0.3 to 5 parts by mass, relative to 100 parts by mass of a total of the copolymer (2B) and other polymer(s) (elastomer, cross-linking rubber, etc.) which is/are blended as necessary.

<Moisture Absorbent>

Examples of moisture absorbents include calcium oxide, silica gel, sodium sulfate, molecular sieve, zeolite and white carbon.

When the composition (IIB) contains a moisture absorbent, the blending amount of the moisture absorbent is usually 0.5 to 15 parts by mass, preferably 1.0 to 12 parts by mass, relative to 100 parts by mass of a total of the copolymer (2B) and other polymer(s) (elastomer, cross-linking rubber, etc.) which is/are blended as necessary.

<Foaming Agent>

A hose made from the composition (IIB) may be a non-foamed material or may be a foamed material. When forming a foamed material, a foaming agent can be used, and examples thereof include, for example, inorganic foaming agents, e.g., sodium bicarbonate, sodium carbonate, ammonium bicarbonate, ammonium carbonate, and ammonium nitrite; nitroso compounds such as N,N'-dinitrosoterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonylhydrazide compounds such as benzenesulfonyl hydrazide, toluenesulfonyl hydrazide, and p,p'-oxybis(benzenesulfonyl hydrazide)diphenylsulfone-3, 3'-disulphenyl hydrazide; and azide compounds such as calcium azide, 4,4'-diphenylsulfonylazide, and para-toluenesulfonylazide.

When the composition (IIB) contains a foaming agent, the blending amount of the foaming agent is appropriately selected such that the specific gravity of the foamed material after being cross-linked and foamed is usually 0.01 to 0.9. The blending amount of the foaming agent is, usually 0.5 to 30 parts by mass, preferably 1 to 20 parts by mass, relative to 100 parts by mass of a total of the copolymer (2B) and other polymer(s) (elastomer, cross-linking rubber, etc.) which is/are blended as necessary.

[Properties of Hose-Forming Composition (IIB)]

By using the composition (IIB), a hose with excellent mechanical properties at ambient temperature and excellent low temperature properties can be formed. For example, a hose which has a great tensile strength at ambient temperature as well as small compression set at low temperature and good results of a torsion test at low temperature can be obtained.

[Hoses]

The hose according to the present invention (2) has layers formed from the composition (IIB). The hose may be a hose of one layer or two or more layers which only contains a layer(s) formed from the composition (IIB), and also may contain other layers, for example, one layer or two or more layers selected from layers made from natural rubber, fabric layers, thermoplastic resin layers and thermosetting resin layers.

Examples of methods of producing a hose from the composition (IIB) include a method of forming the composition (uncross-linked composition) in a desired hose shape and, simultaneously with or after the forming, cross-linking the composition.

Examples thereof include a method (I) wherein the composition (IIB) containing a cross-linking agent is used, formed in a desired shape, and then cross-linked by a heating treatment, and a method (II) wherein the composition (IIB) is formed in a desired shape and cross-linked by irradiating electron beams on the composition.

In the formation as aforementioned, the composition for hose-forming according to the present invention is formed in a hose shape having a hollow portion using an extruder, calender roll, press molding machine, injection molding machine, transfer molding machine or the like.

In the aforementioned method (I), the molded article is heated, for example, at 50 to 200° C. for 1 to 120 minutes, simultaneously with or after the formation. By this heating, the molded article is cross-linked or foamed as well as cross-linked. Examples of cross-linking baths include steam vulcanization baths, hot air vulcanization baths, glass beads fluidized-beds, molten salt vulcanization baths, and microwave bathes. These cross-linking baths may be used singly or in combination of two or more kinds thereof.

In the aforementioned method (II), electron beams having energy of 0.1 to 10 MeV are irradiated on the molded article simultaneously with or after the formation such that the absorbed dose is usually 0.5 to 35 Mrad, preferably 0.5 to 20 Mrad.

Additionally, shaping treatment may be carried out wherein a mandrel is inserted in the hollow portion of the hose thus obtained to heat the hose. After the shaping treatment, the hose is cooled. In the shaping treatment, because the final shaping is performed after the mandrel is inserted in the cross-linked hose, scratches on the surface or crushed end portions at the time of the insertion of the mandrel can be prevented, whereby reducing the occurrence of defective products. Thus, a hose can be produced effectively even if the hose has a complicated shape.

The hose of the present invention (2) can be suitably used as hoses for automobiles, motor bikes, industrial machines, construction machines, agricultural machines, and the like. Specifically, the hose can be preferably used as a variety of hoses such as radiator hoses for cooling an engine, drain hoses for radiator overflow, heater hoses for a room heater, air conditioning drain hoses, water supply hoses for a windshield wiper, roof drain hoses, and protect hoses.

EXAMPLES

The present invention will be described below in more detail with reference to Examples, but the present invention is not to be limited to these Examples. In the following description of Examples and the like, "parts" means "parts by weight" or "parts by mass" unless otherwise specified. Herein, parts by weight and parts by mass are treated synonymously.

[Measuring Method]
[Ethylene.α-Olefin.Non-Conjugated Polyene Copolymer]
[Molar Amount and Mass of Each Structural Unit]

The molar amount and mass of structural units derived from ethylene [A], those of structural units derived from an α-olefin [B], and those of structural units derived from a non-conjugated polyene [C] were determined by measurement of intensity using a $^1$H-NMR spectrometer.

[Mooney Viscosity]

The Mooney viscosity $ML_{(1+4)}$125° C. and Mooney viscosity $ML_{(1+4)}$150° C. were measured in accordance with JIS K 6300(1994), using a Mooney viscometer (made by Shimadzu Corporation, Model SMV202).

[Iodine Value]

The iodine values for the copolymers obtained in the undermentioned Synthesis Examples were determined by a titration method. Specifically, the following method was carried out.

The obtained copolymer, 0.5 g, was dissolved in 60 ml of carbon tetrachloride, to which a small amount of Wijs reagent and a 20% potassium iodide solution were added, followed by titration with a 0.1 mol/L sodium thiosulfate solution. A starch indicator was added at around the endpoint, followed by good stirring and titration until the light purple color disappeared, and a g value of iodine was calculated as an amount of halogen consumed relative to 100 g of the sample.

[B Value]

The measurement solvent was o-dichlorobenzene-$d_4$.benzene-$d_6$ (4/1[v/v]). The $^{13}$C-NMR spectrum (100 MHz, produced by JEOL LTD., ECX400P) was measured at a measurement temperature of 120° C. to determine the B value based on the following equation (i).

$$B \text{ value}=([EX]+2[Y])/[2\times[E]\times([X]+[Y])] \quad (i)$$

wherein [E], [X], and [Y] represent a mole fraction of the ethylene [A], the $C_4$-$C_{20}$ α-olefin [B], and the non-conjugated polyene [C] respectively, and [EX] represents an ethylene [A]-$C_4$-$C_{20}$ α-olefin [B] diad chain fraction.

[Intrinsic Viscosity]

The intrinsic viscosity [η] of the ethylene.α-olefin.non-conjugated polyene copolymer is a value measured at 135° C., using a decalin solvent.

Specifically, about 20 mg of the ethylene.α-olefin.non-conjugated polyene copolymer was dissolved in 15 ml of decalin, and the specific viscosity ηsp was measured in an oil bath at 135° C. After this decalin solution was diluted by the addition of 5 ml of the decalin solvent, the specific viscosity ηsp was measured in the same way. The dilution was repeated two more times and the value ηsp/C obtained by extrapolating the concentration (C) to 0 was determined as the intrinsic viscosity (see the following equation).

$$[\eta]=\lim(\eta sp/C) \ (C\to 0)$$

[Properties of Thermoplastic Elastomer Compositions (I), (IIC), and Molded Articles]

The methods for evaluating the properties of thermoplastic elastomer compositions (I), (IIC), and the molded articles in the undermentioned Examples and Comparative Examples are as follows.

[Shore D Hardness]

A 100 t automatic electrothermal press (made by Shoji Co., Ltd.) was used to press pellets of the obtained thermoplastic elastomer composition (I) at 230° C. for 6 minutes, whereafter they were cold-pressed at room temperature for 5 minutes to make a 3 mm thick press sheet. The sheet was used to measure a 5 seconds after value with a shore D hardness meter in accordance with JIS K6253.

[Shore A Hardness]

A 100 t automatic electrothermal press (made by Shoji Co., Ltd.) was used to press pellets of the obtained thermoplastic elastomer composition (IIC) at 230° C. for 6 minutes, whereafter they were cold-pressed at room temperature for 5 minutes to make a 3 mm thick press sheet. Using the sheet, the scale on a type A meter was read immediately after the pressing needle was touched, in accordance with JIS K 6253.

[MFR (g/10 minutes)

A measurement was made with a load of 10 kgf at 230° C. in accordance with JIS K6721.

[Compression Set (CS)]

A 100 t automatic electrothermal press (made by Shoji Co., Ltd.) was used to press pellets of the obtained thermoplastic elastomer composition (I) or (IIC) at 230° C. for 6 minutes, whereafter they were cold-pressed at room temperature for 5 minutes to make a 2 mm thick press sheet.

In accordance with JIS K6250, the 2 mm thick press sheets made as aforementioned were layered, and a compression set test was carried out in accordance with JIS K6262.

The test conditions were as follows: a 12 mm thick layered sheet (four 3 mm thick pieces layered) was used and was applied to 25% compression. The compression was performed at −30° C., 23° C., and 70° C., each under the condition of 22 hours, and, in addition, at 125° C. under the condition of 72 hours. Each measurement was made after 30 minutes elapsed after strain removal (compression).

[Tensile Characteristics]

A measurement was made in accordance with JIS K6301. Here, a No. 3 dumbbell piece was stamped out from a 2 mm thick press sheet and used as a test piece.

Measurement temperature: 23° C.

M25: stress (MPa) at 25% elongation
M50: stress (MPa) at 50% elongation
M100: stress (MPa) at 100% elongation
M200: stress (MPa) at 200% elongation
M300: stress (MPa) at 300% elongation
TB: tensile breaking strength (MPa)
EB: tensile elongation at break (%)

[Weight Change Rate]

A liquid paraffin (soft) (Code No.: 26132-35 made by Nacalai Tesque, Inc.) was used as a test oil, wherein a 2 mm press sheet was immersed at 80° C. for 24 hours. After that, the sample surface was wiped, and the weight change rate was measured at the number n=2.

In Comparative Examples 1 and 7, the content of filler included in the composition was measured, and corrected weight change rate was calculated using the value obtained by subtracting the filler content from the total weight of the composition. The filler content was measured using a thermogravimetric analyzer (TGA) by the following method.

<Measurement of Filler Content>

To sufficiently replace the inside of the system of the TGA device (TGA Q50001R, made by TA Instruments Japan, Inc.) with a nitrogen atmosphere, it was held at 40° C. for 20 minutes after a sample (sample weight: about 5 mg) was set using an alumina pun. After that, the temperature was raised to 1000° C. under the following measurement conditions, and the residue at that time was treated as a filler content relative to the subject sample amount (about 5 mg).

(Measurement Conditions)

40° C. (20 minutes)→600° C.→400° C. [nitrogen atmosphere]→400° C. (20 minutes)→1000° C. [air atmosphere]

The inside of the parentheses represent a hold time.

The rate of temperature increase was 10° C./minute, and the rate of temperature decrease was 10° C./minute.

The purge gas for the sample was nitrogen at 25 ml/minute and air at 25 ml/minute. The purge gas for the balance balancing was nitrogen at 10 ml/minute. The amount of purge gas into the oven main body was a total of 35 ml/minute for the sample and for the balance balancing.

[Specific Gravity]

The specific gravities in Examples were calculated using the specific gravity of each resin content and softener and the number of parts blended of these. The specific gravities in Comparative Examples were catalog values.

[Properties of Hose-Forming Composition (IIB) and Vulcanized Product]

The details of rubbers used in the undermentioned Comparative Examples and the methods for evaluating the properties of the hose-forming composition (IIB) and the vulcanized articles in Examples and Comparative Examples are as follows.

The details of rubbers used in Comparative Examples are as follows.

3090EM: produced by Mitsui Chemicals, Inc., EPDM, ethylene content=48 wt %, diene content=5.2 wt %, Mooney viscosity $ML_{(1+4)}125°$ C.=59, the amount of oil extension=10 (PHR).

3072EM: produced by Mitsui Chemicals, Inc., EPDM, ethylene content=64 wt %, diene content=5.4 wt %, Mooney viscosity $ML_{(1+4)}125°$ C.=51, the amount of oil extension=40 (PHR).

The physical property values of the aforementioned products are catalog values.

[Unvulcanized Material Property Test 1: Minimum Viscosity (Vm) and Scorch Time (min)]

The property tests of the unvulcanized compositions were carried out in accordance with JIS K6300. Specifically, using a Mooney viscometer (produced by Shimadzu Corporation, Model SMV202), a change in the Mooney viscosity at 125° C. of the blends 2 resulted from Examples and Comparative Examples respectively were measured. The minimum viscosity (Vm) was obtained at the start of the measurement, and the time required for the minimum viscosity (Vm) to increase by 5 points or 35 points was obtained as a scorch time (t5, min) and scorch time (t35, min).

[Unvulcanized Material Property Test 2: Vulcanization Characteristic Evaluation]

The blends 2 resulted from Examples and Comparative Examples were used to measure the vulcanization rate (TC90) as follows by use of a vulcanization measurement device: MDR2000 (produced by Alpha Technologies).

The changes in torque obtained under the conditions of a constant temperature and a constant shear rate were measured. TC90 (min) was defined by the time required for the torque value to achieve 90% of the difference between the maximum torque value (S'Max) and the minimum torque value (S'Min). With regard to the measurement conditions, the temperature was 160° C. and the time was 50 minutes. A smaller TC 90 indicated a faster rate of vulcanization.

[Hardness Test (Durometer-A)]

Flat portions of the 2 mm thick vulcanized rubber sheets resulted from Examples and Comparative Examples were layered to form a sheet having a thickness of 12 mm, and hardness (JIS-A) was measured in accordance with JIS K6253.

[Tension Test]

The tension test was performed on the vulcanized rubber sheets having a thickness of 2 mm obtained in Examples and Comparative Examples in accordance with JIS K6251 under the conditions of a measurement temperature of 23° C. and a pulling rate of 500 mm/min to measure the tensile stress at an elongation rate of 25% (25% modulus (M25)), the tensile stress at an elongation rate of 50% (50% modulus (M50)), the tensile stress at an elongation rate of 100% (100% modulus (M100)), the tensile stress at an elongation rate of 200% (200% modulus (M200)), the tensile stress at an elongation rate of 300% (300% modulus (M300)), the strength at break (TB), and the elongation at break (EB).

[Compression Set Test]

For the test piece for compression set (CS) test, the compression set after a 70° C., 0° C., −20° C., or −40° C.×22 hour-treatment was measured in accordance with JIS K6262 (1997).

<Low Temperature Torsion Test (Lehman Torsion Test)>

The low temperature torsion test was performed, in accordance with JIS K6261(1993), on the vulcanized rubber sheets having a thickness of 2 mm obtained in Examples and Comparative Examples to measure $T_2$ (° C.), $T_5$ (° C.), $T_{10}$ (° C.), and Tg (° C.), using a Gehman torsion test machine. These temperatures are an indicator of flexibility at low temperature of vulcanized rubber. For example, the lower the $T_2$ is, the better the flexibility at low temperature is.

[Synthesis Method]

[Synthesis of Transition Metal Compound]

Synthesis of [bis(4-methoxyphenyl)methylene($\eta^5$-cyclopentadienyl)($\eta^5$-2,3,6,7-tetramethylfluorenyl)] hafnium dichloride (Catalyst-a1)

(i) Synthesis of 6,6-bis(4-methoxyphenyl)fulvene

In nitrogen atmosphere, to a 500 ml three-neck flask, 8.28 g (115 mmol) of lithium cyclopentadienide, and 200 ml of dehydrated THF (tetrahydrofuran) were added. With the mixture cooled in an ice bath, 13.6 g (119 mmol) of DMI (1,3-dimethyl-2-imidazolidinone) was added. The mixture was stirred at room temperature for 30 minutes. Thereafter, 25.3 g (105 mol) of 4,4'-dimethoxybenzophenone was added. The mixture was stirred under heat refluxing for 1 week. With the mixture cooled in an ice bath, 100 ml of water was gradually added, and further, 200 ml of dichloromethane was added. The mixture was stirred at room temperature for 30 minutes. The resultant two-layer solution was transferred to a 500 ml separating funnel. The organic layer was washed three times with 200 ml of water. The organic layer washed was dried with anhydrous magnesium sulfate for 30 minutes. Thereafter, the solvent was distilled off under reduced pressure. As a result, an orange-brown solid was obtained, which was then subjected to separation with silica gel chromatograph (700 g, hexane:ethyl acetate=4:1). As a result, a red solution was obtained. The solvent was distilled off under reduced pressure. As a result, 9.32 g (32.1 mmol, 30.7%) of 6,6-bis(4-methoxyphenyl) fulvene was obtained as an orange solid. 6,6-bis(4-methoxyphenyl) fulvene was identified by $^1$H NMR spectrum. The measured value thereof is shown below.

$^1$H NMR spectrum (270 MHz, CDCl$_3$): δ/ppm 7.28-7.23 (m, 4H), 6.92-6.87 (m, 4H), 6.59-6.57 (m, 2H), 6.30-6.28 (m, 2H), 3.84 (s, 6H)

(ii) Synthesis of bis(4-methoxyphenyl)(cyclopentadienyl)(2,3,6,7-tetramethylfluorenyl)methane In nitrogen atmosphere, to a 100 ml three-neck flask, 500 mg (2.25 mmol) of 2,3,6,7-tetramethylfluorene, and 40 ml of dehydrated t-butylmethyl ether were added. With the mixture cooled in an ice bath, 1.45 ml (2.36 mmol) of an n-butyllithium.hexanesolution (1.63M) was gradually added. The mixture was stirred at room temperature for 18 hours. 591 mg (2.03 mmol) of 6,6-bis(4-methoxyphenyl)fulvene was added. The mixture was subjected to heat refluxing for 3 days. With the mixture cooled in an ice bath, 50 ml of water was gradually added. The resultant solution was transferred to a 300 ml separating funnel, to which 50 ml of dichloromethane was added. The mixture was shaken several times to separate off the aqueous layer. The organic layer was washed three times with 50 ml of water. The organic layer washed was dried with anhydrous magnesium sulfate for 30 minutes. Thereafter, the solvent was distilled off under reduced pressure. The resultant solid was washed with a small amount of diethyl ether. As a result, a white solid was obtained. Further, the solvent of the washing liquid was distilled off under reduced pressure. The resultant solid was washed with a small amount of diethyl ether to collect a white solid, which was combined with the white solid previously obtained. The resultant solid was dried under reduced pressure. As a result, 793 mg (1.55 mmol, 76.0%) of bis(4-methoxyphenyl)(cyclopentadienyl)(2,3,6,7-tetramethylfluorenyl)methane was obtained. bis(4-methoxyphenyl)(cyclopentadienyl)(2,3,6,7-tetramethylfluorenyl)methane was identified by FD-MS spectrum. The measured value thereof is shown below.

FD-MS spectrum: M/z 512 (M+)

(iii) Synthesis of [bis(4-methoxyphenyl)methylene($\eta^5$-cyclopentadienyl)($\eta^5$-2,3,6,7-tetramethylfluorenyl)]hafnium dichloride In nitrogen atmosphere, to a 100 ml Schlenk flask, 272 mg (0.531 mmol) of bis(4-methoxyphenyl)(cyclopentadienyl)(2,3,6,7-tetramethylfluorenyl)methane, 20 ml of dehydrated toluene, and 90 μl (1.1 mmol) of THF were sequentially added. With the mixture cooled in an ice bath, 0.68 ml (1.1 mmol) of an n-butyllithium/hexane solution (1.63 M) was gradually added. The mixture was stirred at 45° C. for 5 hours. As a result, a red solution was obtained. The solvent was distilled off under reduced pressure, and 20 ml of dehydrated diethyl ether was added to provide a red solution again. With the solution cooled in a methanol/dry ice bath, 164 mg (0.511 mmol) of hafnium tetrachloride was added. While the temperature was gradually elevated to room temperature, the mixture was stirred for 16 hours. As a result, a yellow slurry was obtained. The solvent was distilled off under reduced pressure. The resultant solid was transferred into a glove box, washed with hexane, and thereafter extracted with dichloromethane. The solvent was distilled off under reduced pressure. The resultant solid was allowed to dissolve in a small amount of dichloromethane, and hexane was added to perform recrystallization at −20° C. A solid precipitated was collected, washed with hexane, and dried under reduced pressure. As a result, 275 mg (0.362 mmol, 70.8%) of [bis(4-methoxyphenyl)methylene($\eta^5$-cyclopentadienyl)($\eta^5$-2,3,6,7-tetramethylfluorenyl)]hafnium dichloride (catalyst-a1) was obtained as a yellow solid. [bis(4-methoxyphenyl)methylene($\eta^5$-cyclopentadienyl)($\eta^5$-2,3,6,7-tetramethylfluorenyl)]hafnium dichloride was identified by $^1$H NMR spectrum and FD-MS spectrum. The measured value thereof is shown below.

$^1$H NMR spectrum (270 MHz, CDCl$_3$): δ/ppm 7.87 (s, 2H), 7.80-7.66 (m, 4H), 6.94-6.83 (m, 4H), 6.24 (t, J=2.6 Hz, 2H), 6.15 (s, 2H), 5.65 (t, J=2.6 Hz, 2H), 3.80 (s, 6H), 2.47 (s, 6H), 2.05 (s, 6H)

FD-MS spectrum: M/z 760 (M+)

The chemical formula of the resulting catalyst-a1 is shown below.

[Chem. 14]

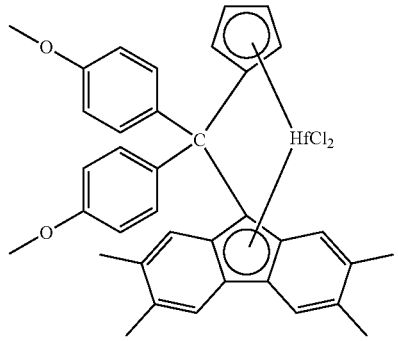

(1B) Ethylene.1-butene.5-ethylidene-2-norbornene copolymer (EBDM-1(1B))

Synthesis Example 1

Using a polymerization reactor having a volume of 300 L and provided with a mixing blade, the polymerization reaction of ethylene, 1-butene, and 5-ethylidene-2-norbornene (ENB) was carried out continuously at 95° C.

Hexane (feed amount: 32 L/h) was used as a polymerization solvent and continuously fed into the polymerization reactor so that the amount of feed of ethylene was 3.2 kg/h, the amount of feed of 1-butene was 12 kg/h, the amount of feed of ENB was 520 g/h, and the amount of feed of hydrogen was 0.0 N L/h (normal liter).

While the polymerization pressure and the polymerization temperature were maintained at 1.6 MPaG and 95° C. respectively, the aforementioned catalyst-a1 was used as the main catalyst and fed continuously into the polymerization reactor in an amount of feed of 0.030 mmol/h. Additionally, (C$_6$H$_5$)$_3$CB(C$_6$F$_5$)$_4$(CB-3) as a cocatalyst in an amount of feed of 0.15 mmol/h and triisobutylaluminum (TIBA) as an organoaluminum compound in an amount of feed of 10 mmol/h were continuously fed into the polymerization reactor.

Thus, a solution containing 15% by weight of an ethylene.1-butene.ENB copolymer formed from ethylene, 1-butene, and ENB was obtained. To the polymerization reaction liquid drawn from the lower portion of the polymerization reactor, a small amount of methanol was added to terminate the polymerization reaction, and the ethylene.1-butene.ENB copolymer was separated from the solvent by a steam stripping treatment and then dried under reduced pressure at 80° C. for one whole day and night.

By the above procedure, the ethylene.1-butene.ENB copolymer (EBDM-1(1B)) formed from ethylene, 1-butene, and ENB was obtained at a rate of 5.4 kg per hour.

The properties of the resulting EBDM-1 (1B) were measured in the method described above. The results are shown in Table 1.

TABLE 1

Properties of EBDM-1 (1B)

|  | EBDM-1 (1B) |
|---|---|
| B value | 1.29 |
| Ethylene unit content (mol %) | 56 |
| $C_2/C_4$ molar ratio | 57/43 |
| Mooney viscosity $ML_{(1+4)}125°$ C. | 83 |
| Iodine value (g/100 g) | 9.0 |
| Non-conjugated polyene content (mol %) | 1.46 |

<<Thermoplastic Elastomer Composition (I) and Molded Article>>

Example 1

100 parts by weight of EBDM-1(1B) obtained in Synthesis Example 1, 40 parts by weight of polypropylene whose melt flow rate (ASTM-D-1238-65T; 230° C., 2.16 kg load) was 2.0 g/10 minutes (trade name: PRIME POLYPRO™ E-200GP, made by Prime Polymer Co., Ltd.), and 10 parts of softener (DIANA PROCESS PW-100, paraffin oil, made by Idemitsu Kosan Co., Ltd.) were mixed sufficiently using a Banbury mixer to give masterbatch pellets.

With this were mixed 8.0 parts of brominated alkyl phenol.formaldehyde resin (trade name: SP-1055F, made by Schenectady Chemicals, Inc) as a phenol resin-based cross-linking agent, 0.20 parts by weight of phenol-based antioxidant (IRGANOX 1010, made by BASF Japan Co., Ltd.) as an antioxidant, 0.20 parts by weight of benzotriazole-based ultraviolet absorber (trade name: Tinuvin 326FL, made by BASF Japan Co., Ltd.), 0.10 parts by weight of hindered amine (HALS)-based weathering stabilizer (trade name: SANOL LS-770, made by Sankyo Lifetech Co., Ltd.), 0.80 parts by weight of zinc oxide (zinc oxide No. 2, made by Hakusuitech Co., Ltd.), 4.0 parts by weight of carbon black masterbatch (PE4993, made by Cabot Corporation), 105 parts of softener (DIANA PROCESS PW-100, paraffin oil), 50 parts by weight of polypropylene whose melt flow rate (ASTM-D-1238-65T; 230° C., 2.16 kg load) was 2.0 g/10 minutes (trade name: PRIME POLYPRO™ E-200GP, made by Prime Polymer Co., Ltd.), and 140 parts by weight of polypropylene whose melt flow rate (ASTM-D-1238-65T; 230° C., 2.16 kg load) was 0.5 g/10 minutes (trade name: PRIME POLYPRO™ E-111G, made by Prime Polymer Co., Ltd.), and the resulting mixture was dynamically cross-linked, in an extruder (Product No. KTX-30, made by Kobe Steel, Ltd.; cylinder temperature: C1: 50° C., C2: 90° C., C3: 100° C., C4: 120° C., C5: 180° C., C6: 200° C., C7 to C14: 200° C., die temperature: 200° C., screw speed: 500 rpm, extruder rate: 40 kg/h), to give pellets of the thermoplastic elastomer composition. The blends are shown in Table 2 and the results are shown in Table 3.

Example 2

Pellets of the thermoplastic elastomer composition were produced in the same manner as in Example 1 except that the blending ratio of the softener (DIANA PROCESS PW-100, paraffin oil) in Example 1 was changed in the masterbatch-making step and the dynamically cross-linking step.

The pellets were used for properties evaluation. The blends are shown in Table 2 and the results are shown in Table 3.

Example 3

Pellets of the thermoplastic elastomer composition were produced in the same manner as in Example 1 except that the polypropylene blended in the masterbatch-making step in Example 1 was changed from E-200GP to polypropylene whose melt flow rate (ASTM-D-1238-65T; 230° C., 2.16 kg load) was 2.0 g/10 minutes (trade name: PRIME POLYPRO™ B241, made by Prime Polymer Co., Ltd.).

The pellets were used for properties evaluation. The blends are shown in Table 2 and the results are shown in Table 3.

Comparative Example 1

As a thermoplastic elastomer composition, Santoprene™ 103-40 (made by Exxon Mobil Corporation; specific gravity: 0.95 g/cm³ (catalog value); a cross-linked thermoplastic elastomer obtained by dynamically cross-linking EPDM and PP (polypropylene)) was used for properties evaluation. The results are shown in Table 3.

TABLE 2

Blending Ratio

| Mixture | Specific Gravity | Example 1 (parts by weight) | Example 2 (parts by weight) | Example 3 (parts by weight) |
|---|---|---|---|---|
| EBDM-1 (1B) | 0.87 | 100 | 100 | 100 |
| Polypropylene (E-200GP) | 0.90 | 40 | 40 | |
| Polypropylene (B241) | 0.91 | | | 40 |
| Paraffin oil (PW-100) | 0.87 | 10 | 40 | 40 |
| Polypropylene (E-200GP) | 0.90 | 50 | 50 | 50 |
| Polypropylene (E-111G) | 0.91 | 140 | 140 | 140 |
| Antioxidant (IRGANOX 1010) | | 0.20 | 0.20 | 0.20 |
| Benzotriazole-based ultraviolet absorber (Tinuvin 326FL) | | 0.20 | 0.20 | 0.20 |
| HALS-based weathering stabilizer (SANOL LS-770) | | 0.10 | 0.10 | 0.10 |
| Zinc oxide (ZnO) | | 0.80 | 0.80 | 0.80 |
| Carbon black MB (PE4993) | | 4.0 | 4.0 | 4.0 |
| Paraffin oil (PW-100) | 0.87 | 105 | 75 | 75 |
| Phenol resin-based cross-linking agent (SP1055F) | | 8.0 | 8.0 | 8.0 |

TABLE 3

Property Values

| | | Example 1 | Example 2 | Example 3 | Comparative Example 1 |
|---|---|---|---|---|---|
| MFR 230° C. 10 kg | g/10 minutes | 65.0 | 69.0 | 37.0 | 49 |
| Tensile characteristics | | | | | |
| 25% modulus (M25) | MPa | 8.2 | 8.1 | 7.5 | 9.3 |
| 50% modulus (M50) | MPa | 9.1 | 8.8 | 8.3 | 9.7 |
| 100% modulus (M100) | MPa | 9.8 | 9.3 | 8.8 | 9.7 |
| 200% modulus (M200) | MPa | 10.9 | 10.1 | 9.6 | 10.1 |

TABLE 3-continued

| | | Example 1 | Example 2 | Example 3 | Comparative Example 1 |
|---|---|---|---|---|---|
| 300% modulus (M300) | MPa | 12.5 | 11.4 | 10.7 | 10.9 |
| tensile breaking strength (TB) | MPa | 18.6 | 16.5 | 16.8 | 19 |
| tensile breaking elongation (EB) | % | 510 | 530 | 590 | 610 |
| Hardness | | | | | |
| Shore D (5 s value) | — | 42 | 43 | 42 | 42 |
| Compression set | | | | | |
| CS (70° C., 22 h) | % | 54 | 55 | 55 | 58 |
| CS (125° C., 72 h) | % | 81 | 85 | 83 | 88 |
| Weight change ratio (80° C. × 24 h) | % | 13 | 13 | 18 | 14 |
| Number of parts blended (total of resin content and softener content) | parts by weight | 445 | 445 | 445 | — |
| Specific gravity | g/cm³ | 0.89 | 0.89 | 0.89 | 0.95 |
| Filler ratio | % | 0 | 0 | 0 | 7.4 |
| Corrected weight change rate (change of content excluding filler) | % | no correction required | no correction required | no correction required | 15 |

(2B) Ethylene.1-butene.5-ethylidene-2-norbornene copolymer (EBDM-1 (2B) to EBDM-3 (2B) and EBDM-4)

Example 4

Using a polymerization reactor having a volume of 300 L and provided with a mixing blade, the polymerization reaction of ethylene, 1-butene, and 5-ethylidene-2-norbornene (ENB) was carried out continuously at 95° C.

Hexane (feed amount: 41 L/h) was used as a polymerization solvent, and ethylene in an amount of feed of 4.7 kg/h, 1-butene in an amount of feed of 4.3 kg/h, ENB in an amount of feed of 530 g/h, and hydrogen in an amount of feed of 5.5 NL/h were continuously fed into the polymerization reactor.

While the polymerization pressure and the polymerization temperature were maintained at 1.6 MPaG and 95° C. respectively, the aforementioned catalyst-a1 was used as the main catalyst and fed continuously into the polymerization reactor in an amount of feed of 0.018 mmol/h. Additionally, $(C_6H_5)_3CB(C_6F_5)_4$(CB-3) as a cocatalyst in an amount of feed of 0.09 mmol/h and triisobutylaluminum (TIBA) as an organoaluminum compound in an amount of feed of 5 mmol/h were continuously fed into the polymerization reactor.

Thus, a solution containing 15% by mass of an ethylene.1-butene.ENB copolymer formed from ethylene, 1-butene, and ENB was obtained. To the polymerization reaction liquid drawn from the lower portion of the polymerization reactor, a small amount of methanol was added to terminate the polymerization reaction, and the ethylene.1-butene.ENB copolymer was separated from the solvent by a steam stripping treatment and then dried under reduced pressure at 80° C. for one whole day and night.

By the above procedure, the ethylene.1-butene.ENB copolymer (EBDM-1 (2B)) formed from ethylene, 1-butene, and ENB was obtained at a rate of 5.3 kg per hour.

The properties of the resulting EBDM-1 (2B) were measured in the method described above. The results are shown in Table 4.

Examples 5 and 6

An ethylene.1-butene.ENB copolymer (EBDM-2 (2B)) for Example 5 and an ethylene.1-butene.ENB copolymer (EBDM-3 (2B)) for Example 6 were obtained in the same manner as in Example 4 except that the polymerization conditions were changed as described in Table 4. The results are shown in Table 4.

Comparative Example 2

An ethylene.1-butene.ENB copolymer (EBDM-4) for Comparative Example 2 was obtained in the same manner as in Example 4 except that the polymerization conditions were changed as described in Table 4. The results are shown in Table 4.

TABLE 4

| | | Example 4 | Example 5 | Example 6 | Comparative Example 2 |
|---|---|---|---|---|---|
| Ethylene-based copolymer | | EBDM-1(2B) | EBDM-2(2B) | EBDM-3(2B) | EBDM-4 |
| <Polymerization conditions> | | | | | |
| Reactor volume | L | 300 | 300 | 300 | 300 |
| Main catalyst | | catalyst-a1 | catalyst-a1 | catalyst-a1 | catalyst-a1 |
| Polymerization temperature | ° C. | 95 | 95 | 95 | 95 |
| Polymerization pressure | MPaG | 1.6 | 1.6 | 1.6 | 1.6 |
| Hexane feed | L/h | 41 | 41 | 33 | 33 |
| Ethylene feed | kg/h | 4.7 | 4.2 | 3.4 | 3.4 |
| 1-butene feed | kg/h | 4.3 | 10 | 11 | 11 |
| ENB feed | g/h | 530 | 580 | 450 | 450 |
| Hydrogen feed | NL/h | 5.5 | 1.8 | 0.2 | 0.5 |
| Main catalyst feed | mmol/h | 0.018 | 0.025 | 0.020 | 0.020 |

TABLE 4-continued

|  |  | Example 4 | Example 5 | Example 6 | Comparative Example 2 |
|---|---|---|---|---|---|
| CB-3 feed | mmol/h | 0.09 | 0.125 | 0.10 | 0.10 |
| TIBA feed | mmol/h | 5 | 10 | 10 | 10 |
| Polymer concentration | wt % | 15 | 12 | 13 | 14 |
| Production rate | kg/h | 5.3 | 5.0 | 5.0 | 5.0 |
| <Conditions for drying under reduced pressure> | | | | | |
| Drying temperature | ° C. | 80 | 80 | 80 | 80 |
| <Polymer properties> | | | | | |
| (3) $ML_{(1+4)}125°$ C. |  | 114 | 107 | 105 | 82 |
| $ML_{(1+4)}150°$ C. |  | — | — | 77 | 59 |
| [η] | dL/g | 3.60 | 3.58 | 3.41 | 3.18 |
| C2 content | wt % | 66 | 50 | 43 | 42 |
| (1) Ethylene content/1-butene content | molar ratio | 81.6/18.4 | 68.6/31.4 | 62.4/37.6 | 61/39 |
| ENB content | wt % | 5.2 | 4.3 | 4.3 | 3.8 |
| ENB content | g/100 g | 11.0 | 9.1 | 9.1 | 8.0 |
| (2) ENB content | mol % | 1.50 | 1.36 | 1.43 | 1.26 |
| (4) B VALUE |  | 1.26 | 1.26 | 1.28 | 1.28 |

<<Hose-Forming Composition (IIB)>>

Example 7

Using MIXTRON BB MIXER (made by Kobe Steel, Ltd., Model BB-2, volume 1.7 L, rotor 2WH), 5 parts of zinc oxide (ZnO #1 zinc oxide No. 2 (JIS K-1410), made by Hakusuitech Co., Ltd.) as a cross-linking aid, 1 part of stearic acid as a processing aid, 80 parts of carbon black (FEF carbon) "Asahi #60G" (trade name; made by Asahi Carbon Co., Ltd.) as a reinforcing agent, and 50 parts of paraffin-based process oil "DIANA PROCESS OIL PS-430" (trade name; made by Idemitsu Kosan Co., Ltd) as a softener were blended with 100 parts of the ethylene.1-butene.ENB copolymer (EBDM-3 (2B)) obtained in Example 6, and kneaded to give a blend 1.

For the kneading condition, the number of revolutions of the rotor was 40 rpm, the floating weight pressure was 3 kg/cm², the kneading time was 5 minutes, and the kneading discharge temperature was 144° C.

Subsequently, after it was ascertained that the temperature of the blend 1 reached 40° C., using a 6-inch roll, 0.5 parts of 2-mercaptobenzothiazole, "Sanceler M" (trade name; made by Sanshin Chemical Industry Co., Ltd.), 1.0 part of tetramethylthiuram.disulfide, "Sanceler TT" (trade name; made by Sanshin Chemical Industry Co., Ltd.), and 1.5 parts of sulfur were added to the blend 1 as vulcanizing accelerators in the blending amounts and kneaded to give a blend 2.

For the kneading condition, the roll temperature of the front roll/rear roll was 50° C./50° C., the roll peripheral speed of the front roll/rear roll was 18 rpm/15 rpm, and the roll gap was 3 mm. Sheeting was performed after the kneading of 8 minutes to give the blend 2.

Using a press molding machine, the blend 2 was vulcanized at 160° C. for 20 minutes to give a 2 mm thick vulcanized rubber sheet.

From the blend 2, a right cylindrical test piece having a thickness of 12.7 mm and a diameter of 29 mm was made using a cylindrical die, and vulcanized at 160° C. for 25 minutes to give a test piece for a compression set (CS) test.

An unvulcanized product properties test was carried out on the obtained unvulcanized product (unvulcanized rubber) by the aforementioned method. In addition, a hardness test, a tensile test, a low temperature torsion test, and a compression set test were carried out on the obtained vulcanized product (vulcanized rubber) by the aforementioned method. The results are shown in Table 5.

Examples 8 and 9 and Comparative Examples 3 to 5

A blend 1 and a blend 2 were obtained for each of Examples 8 and 9 and Comparative Examples 3 to 5 in the same manner as in Example 7 except that the blending composition was changed as described in Table 5. As in Example 7, a sheet and a test piece were created to carry out various evaluations. The results are shown in Table 5.

TABLE 5

|  | Comparative Example 3 | Comparative Example 4 | Comparative Example 5 | Example 7 | Example 8 | Example 9 |
|---|---|---|---|---|---|---|
| Blending parts by mass | | | | | | |
| 3090EM | 110 |  |  |  |  |  |
| 3072EM |  | 140 |  |  |  |  |
| EBDM-4 |  |  | 100 |  |  |  |
| EBDM-3 (2B) |  |  |  | 100 |  |  |
| EBDM-2 (2B) |  |  |  |  | 100 |  |
| EBDM-1 (2B) |  |  |  |  |  | 100 |
| ZnO#1 | 5 | 5 | 5 | 5 | 5 | 5 |
| Stearic acid | 1 | 1 | 1 | 1 | 1 | 1 |

TABLE 5-continued

|  |  | Comparative Example 3 | Comparative Example 4 | Comparative Example 5 | Example 7 | Example 8 | Example 9 |
|---|---|---|---|---|---|---|---|
| FEF carbon (Asahi #60G) |  | 80 | 80 | 80 | 80 | 80 | 80 |
| Paraffin oil (PS-430) |  | 40 | 10 | 50 | 50 | 50 | 50 |
| Blend 1 | Total | 236 | 236 | 236 | 236 | 236 | 236 |
| Sanceler M |  | 0.5 | 0.5 | 0.5 | 0.5 | 0.5 | 0.5 |
| Sanceler TT |  | 1.0 | 1.0 | 1.0 | 1.0 | 1.0 | 1.0 |
| Sulfur |  | 1.5 | 1.5 | 1.5 | 1.5 | 1.5 | 1.5 |
| Blend 2 | Total | 239 | 239 | 239 | 239 | 239 | 239 |
| Unvulcanized rubber properties |  |  |  |  |  |  |  |
| Mooney scorch |  |  |  |  |  |  |  |
| Vm (125° C.) |  | 51 | 75 | 47 | 56 | 64 | 75 |
| t5 (125° C.) | min | 15.9 | 13.5 | 15.0 | 14.4 | 13.1 | 13.0 |
| t35 (125° C.) | min | — | — | 23.9 | 23.2 | 20.6 | 21.2 |
| MDR 160° C. × 50 min |  |  |  |  |  |  |  |
| TC90 | min | 15.1 | 12.2 | 15.9 | 16.2 | 15.2 | 12.6 |
| S'Max − S'Min | dNm | 17.3 | 18.8 | 14.4 | 13.8 | 14.9 | 18.5 |
| S'Max | dNm | 19.1 | 21.5 | 16.2 | 15.9 | 17.2 | 21.1 |
| Peak Rate | dNm/min | 4.5 | 5.3 | 3.7 | 3.2 | 4.0 | 5.4 |
| Vulcanized rubber properties |  |  |  |  |  |  |  |
| 160° C. × 20 min |  |  |  |  |  |  |  |
| Hardness (Durometer-A) |  | 65 | 67 | 62 | 63 | 64 | 68 |
| M25 | MPa | 0.81 | 0.93 | 0.68 | 0.70 | 0.78 | 0.94 |
| M50 | MPa | 1.38 | 1.62 | 1.23 | 1.24 | 1.36 | 1.67 |
| M100 | MPa | 2.89 | 3.72 | 2.68 | 2.66 | 3.00 | 3.62 |
| M200 | MPa | 7.15 | 9.77 | 6.33 | 6.20 | 7.06 | 8.81 |
| M300 | MPa | 10.61 | 15.40 | 9.23 | 8.87 | 10.19 | 13.66 |
| TB | MPa | 14.9 | 18.3 | 11.9 | 11.5 | 12.2 | 16.0 |
| EB | % | 429 | 369 | 414 | 422 | 373 | 366 |
| CS 160° C. × 25 min |  |  |  |  |  |  |  |
| 70° C. × 22 h | % | 11 | 8 | 11 | 8 | 8 | 8 |
| 0° C. × 22 h | % | 7 | 60 | 6 | 5 | 5 | 30 |
| −20° C. × 22 h | % | 16 | 86 | 9 | 9 | 10 | 69 |
| −40° C. × 22 h | % | 75 | 100 | 35 | 32 | 42 | 93 |
| Gehman strain test |  |  |  |  |  |  |  |
| T2 | ° C. | −34 | −15 | −48 | −48 | −46 | −18 |
| T5 | ° C. | −44 | −34 | −55 | −55 | −54 | −39 |
| T10 | ° C. | −46 | −40 | −57 | −57 | −56 | −45 |
| Tg | ° C. | −47 | −41 | −59 | −59 | −57 | −47 |

For the low temperature characteristics of the ethylene.α-olefin.non-conjugated polyene copolymer, an Example and a Comparative Example that are copolymers whose ethylene contents were close were compared, i.e., Example 7 and Comparative Example 5 were compared, Example 8 and Comparative Example 3 were compared, and Example 9 and Comparative Example 4 were compared, because the ethylene content significantly influences the crystallization rate of the copolymer. The results shown in Table 4 and Table 5 reveal that a polymer having a high $ML_{(1+4)}125°$ C. used as the ethylene.α-olefin.non-conjugated polyene copolymer has an excellent balance between sealing properties and low temperature characteristics. In this regard, the sealing properties can be evaluated from the compression set at high temperature (70° C.×22 h), and the low temperature characteristics can be evaluated from the compression set at low temperature (−40° C.×22 h). In addition, the excellent mechanical properties were also revealed. Because of having such characteristics, the hose-forming composition (IIB) in Examples can be used to produce hoses having an excellent balance among sealing properties, low temperature characteristics, and mechanical properties.

<<Thermoplastic Elastomer Composition (IIC) and Molded Article>>

Example 10

100 parts by weight of EBDM-1 (2B) obtained in Example 4, 40 parts by weight of polypropylene whose melt flow rate (ASTM-D-1238-65T; 230° C., 2.16 kg load) was 2.0 g/10 minutes (trade name: PRIME POLYPRO™ B-241, made by Prime Polymer Co., Ltd.), and 40 parts by weight of softener (DIANA PROCESS PW-100, paraffin oil, made by Idemitsu Kosan Co., Ltd.) were mixed sufficiently using a Banbury mixer to give masterbatch pellets.

The obtained masterbatch pellets, 8.0 parts by weight of brominated alkyl phenol.formaldehyde resin (trade name: SP-1055F, made by Schenectady Chemicals, Inc) as a phenol resin-based cross-linking agent, 0.16 parts by weight of phenol-based antioxidant (IRGANOX 1010, made by BASF Japan Co., Ltd.) as an antioxidant, 0.16 parts by weight of benzotriazole-based ultraviolet absorber (trade name: Tinuvin 326FL, made by BASF Japan Co., Ltd.), 0.08 parts by weight of hindered amine (HALS)-based weathering stabilizer (trade name: SANOL LS-770, made by Sankyo Lifetech Co., Ltd.), 0.80 parts by weight of zinc oxide (zinc oxide No. 2, made by Hakusuitech Co., Ltd.), 4.0 parts by weight of carbon black masterbatch (PE4993, made by Cabot Corporation), 75 parts by weight of softener (DIANA PROCESS PW-100, paraffin oil), 18 parts by weight of polypropylene whose melt flow rate (ASTM-D-1238-65T; 230° C., 2.16 kg load) was 5 g/10 minutes (trade name: EL-Pro™ P440J, made by SCG Chemicals Co., Ltd.), and 16 parts by weight of polypropylene whose melt flow rate (ASTM-D-1238-65T; 230° C., 2.16 kg load) was 9.0 g/10 minutes (trade name: PRIME POLYPRO™ J105P, made by Prime Polymer Co., Ltd.) were mixed, and the resulting mixture was dynamically cross-linked, in an extruder (Product No. KTX-30, made by Kobe Steel, Ltd.; cylinder temperature: C1: 50° C., C2: 90° C., C3: 100° C., C4: 120° C., C5: 180° C., C6: 200° C., C7 to C14: 200° C., die temperature: 200° C., screw speed: 500 rpm, extruder rate: 40 kg/h), to give pellets of the thermoplastic elastomer composition (IIC).

The pellets were used for properties evaluation. The blends are shown in Table 6 and the evaluation results of the properties are shown in Table 7.

Example 11

Pellets of the thermoplastic elastomer composition (IIC) were produced in the same manner as in Example 10 except that the amount of softener (DIANA PROCESS PW-100, paraffin oil) mixed with the masterbatch was changed from 75 parts by weight to 73 parts by weight and that the amount of EL-Pro™ P440J was changed from 18 parts by weight to 23 parts by weight.

The pellets were used for properties evaluation. The blends are shown in Table 6 and the evaluation results of the properties are shown in Table 7.

Example 12

Pellets of the thermoplastic elastomer composition (IIC) were produced in the same manner as in Example 10 except that EBDM-1 (2B) was changed to EBDM-2 (2B).

The pellets were used for properties evaluation. The blends are shown in Table 6 and the evaluation results of the properties are shown in Table 7.

Comparative Example 6

As a thermoplastic elastomer composition, Sarlink™ 4175 (made by Teknor Apex Corporation; specific gravity: 0.96 g/cm$^3$ (catalog value); a cross-linked thermoplastic elastomer containing EPDM) was used for properties evaluation.

The evaluation results of the properties are shown in Table 7.

Comparative Example 7

As a thermoplastic elastomer composition, Santoprene™ 121-73W175 (made by Exxon Mobil Corporation; specific gravity: 0.97 g/cm$^3$ (catalog value); a cross-linked thermoplastic elastomer obtained by dynamically cross-linking EPDM and PP (polypropylene)) was used for properties evaluation.

The evaluation results of the properties are shown in Table 7.

TABLE 6

| | | Blending Ratio | | |
|---|---|---|---|---|
| Mixture | Specific Gravity | Example 10 (parts by weight) | Example 11 (parts by weight) | Example 12 (parts by weight) |
| EBDM-1 (2B) | 0.87 | 100 | 100 | |
| EBDM-2 (2B) | 0.87 | | | 100 |
| Polypropylene (B241) | 0.91 | 40 | 40 | 40 |
| Paraffin oil (PW-100) | 0.87 | 40 | 40 | 40 |
| Polypropylene (P440J) | 0.91 | 18 | 23 | 18 |
| Polypropylene (J105P) | 0.90 | 16 | 16 | 16 |
| Antioxidant (IRGANOX 1010) | | 0.16 | 0.16 | 0.16 |
| Benzotriazole-based ultraviolet absorber (Tinuvin326FL) | | 0.16 | 0.16 | 0.16 |
| HALS-based weathering stabilizer (SANOL LS-770) | | 0.08 | 0.08 | 0.08 |
| Zinc oxide (ZnO) | | 0.80 | 0.80 | 0.80 |
| Carbon black MB (PE4993) | | 4.0 | 4.0 | 4.0 |
| Paraffin oil (PW-100) | 0.87 | 75 | 73 | 75 |
| Phenol resin-based cross-linking agent (SF1055F) | | 8.0 | 8.0 | 8.0 |

TABLE 7

| | | Property Values | | | | |
|---|---|---|---|---|---|---|
| | | Example 10 | Example 11 | Example 12 | Comparative Example 6 | Comparative Example 7 |
| MFR 230° C. 10 kg | g/10 minute | 15.8 | 20.0 | 20.8 | 28 | 30 |
| Tensile characteristics | | | | | | |
| 25% modulus (M25) | MPa | 1.9 | 2.1 | 1.8 | 1.8 | 2.0 |
| 50% modulus (M50) | MPa | 2.8 | 3.1 | 2.6 | 2.4 | 2.8 |
| 100% modulus (M100) | MPa | 4.1 | 4.3 | 3.8 | 3.1 | 3.6 |
| 200% modulus (M200) | MPa | 6.3 | 6.5 | 6.0 | 4.0 | 4.9 |
| 300% modulus (M300) | MPa | 9.3 | 9.3 | 8.8 | 4.8 | 6.1 |
| tensile breaking strength (TB) | MPa | 10.0 | 11.2 | 10.5 | 7.4 | 8.3 |
| tensile breaking elongation (EB) | % | 340 | 360 | 360 | 530 | 440 |

TABLE 7-continued

| | | Example 10 | Example 11 | Example 12 | Comparative Example 6 | Comparative Example 7 |
|---|---|---|---|---|---|---|
| Hardness | | | | | | |
| Shore A (momentary value) | — | 78 | 79 | 77 | 79 | 78 |
| Compression set | | | | | | |
| CS (−30° C., 22 h) | % | 85 | 88 | 64 | — | — |
| CS (23° C., 22 h) | % | 18 | 20 | 19 | 22 | 20 |
| CS (70° C., 22 h) | % | 30 | 32 | 31 | 33 | 31 |
| CS (125° C., 72 h) | % | 45 | 47 | 45 | 50 | 48 |
| Weight change ratio (80° C. × 24 h) | % | 32 | 34 | 37 | 43 | 45 |
| Number of parts blended (total of resin content and softener content) | parts by weight | 289 | 292 | 289 | — | — |
| Specific gravity | g/cm³ | 0.88 | 0.88 | 0.88 | 0.96 | 0.97 |
| Filler ratio | % | 0 | 0 | 0 | — | 13.2 |
| Corrected weight change rate (change of content excluding filler) | % | | | | — | 52 |

The invention claimed is:

1. A thermoplastic elastomer composition obtained by dynamically cross-linking a mixture containing
   a crystalline olefin polymer (A),
   an ethylene.α-olefin ($C_4$-$C_{20}$).non-conjugated polyene copolymer (1B) satisfying the following requirements (1), (2), and (4), and
   a phenol resin-based cross-linking agent (C);
   wherein the crystalline olefin polymer (A) is a crystalline propylene polymer, and
   wherein the α-olefin of the ethylene.α-olefin.non-conjugated polyene copolymer (1B) is 1-butene, and the non-conjugated polyene of the ethylene.α-olefin.non-conjugated polyene copolymer (1B) is at least one selected from the group consisting of 5-ethylidene-2-norbornene and 5-vinyl-2-norbornene;
   (1) a B value represented by the following equation (i) is 1.20 to 1.80:

$$B\text{ value}=([EX]+2[Y])/[2\times[E]\times([X]+[Y])] \quad (i),$$

wherein [E], [X], and [Y] represent a mole fraction of structural units derived from the ethylene, a mole fraction of structural units derived from the C4-C20 α-olefin, and a mole fraction of structural units derived from the non-conjugated polyene respectively, and [EX] represents a diad chain fraction of the structural units derived from the ethylene—the structural units derived from the C4-C20 α-olefin; and
   (2) in the copolymer (1B), a molar ratio of the structural units derived from the ethylene to the structural units derived from the α-olefin (C4-C20) is 40/60 to 70/30; and
   (4) a content of the structural units derived from the non-conjugated polyene is 0.5 to 3.0 mol %, relative to a total of the structural units derived from the ethylene, the structural units derived from the α-olefin (C4-C20), and the structural units derived from the non-conjugated polyene as 100 mol %.

2. The thermoplastic elastomer composition according to claim 1, wherein the mixture further comprises 2 to 100 parts by weight of a softener (D) relative to 100 parts by weight of a total of the crystalline olefin polymer (A) and the copolymer (1B).

3. The thermoplastic elastomer composition according to claim 1, wherein the phenol resin-based cross-linking agent (C) is a halogenated phenol resin-based cross-linking agent.

4. The thermoplastic elastomer composition according to claim 1, comprising the crystalline olefin polymer (A) and the ethylene.α-olefin.non-conjugated polyene copolymer (1B) at a weight ratio of (A)/(1B)=90/10 to 10/90, and comprising 0.1 to 20 parts by weight of the phenol resin-based cross-linking agent (C) relative to 100 parts by weight of the ethylene.α-olefin.non-conjugated polyene copolymer (1B).

5. A molded article comprising the thermoplastic elastomer composition according to claim 1.

6. An automobile part comprising the thermoplastic elastomer composition according to claim 1.

7. An automobile hose comprising the thermoplastic elastomer composition according to claim 1.

8. An automobile boot comprising the thermoplastic elastomer composition according to claim 1.

9. A thermoplastic elastomer composition obtained by dynamically cross-linking a mixture containing
   a crystalline olefin polymer (A),
   an ethylene.α-olefin.non-conjugated polyene copolymer (2B), and
   a phenol resin-based cross-linking agent (C),
   wherein the crystalline olefin polymer (A) is a crystalline propylene polymer, and
   wherein the ethylene.α-olefin.non-conjugated polyene copolymer (2B) is the ethylene.α-olefin.non-conjugated polyene copolymer (2B) comprising a structural unit derived from ethylene [A], a structural unit derived from a C4-C20 α-olefin [B], and a structural unit derived from a non-conjugated polyene [C], and satisfying the following (1) to (4), wherein the $C_4$-$C_{20}$ α-olefin [B] is 1-butene, and the non-conjugated polyene [C] is at least one selected from the group consisting of 5-ethylidene-2-norbornene and 5-vinyl-2-norbornene:
   (1) a molar ratio ([A]/[B]) of the structural units derived from the ethylene [A] to the structural units derived from the α-olefin [B] is 40/60 to 70/30;
   (2) a content of the structural units derived from the non-conjugated polyene [C] is 0.5 to 3.0 mol % based on a total of the structural units [A], [B], and [C] as 100 mol %;
   (3) a Mooney viscosity ML(1+4)125° C. at 125° C. is more than 100 and not more than 200; and
   (4) a B value represented by the following equation (i) is 1.20 to 1.80:

$$B\text{ value}=([EX]+2[Y])/[2\times[E]\times([X]+[Y])] \quad (i),$$

wherein [E], [X], and [Y] represent a mole fraction of the ethylene [A], the C4-C20 α-olefin [B], and the non-conjugated polyene [C] respectively, and [EX] represents an ethylene [A]- C4-C20 α-olefin [B] diad chain fraction.

10. The thermoplastic elastomer composition according to claim 9, wherein the mixture further comprises 2 to 100 parts by weight of a softener (D) relative to 100 parts by weight of a total of the crystalline olefin polymer (A) and the copolymer (2B).

11. The thermoplastic elastomer composition according to claim 9, wherein the phenol resin-based cross-linking agent (C) is a halogenated phenol resin-based cross-linking agent.

12. The thermoplastic elastomer composition according to claim 9, comprising the crystalline olefin polymer (A) and the ethylene.α-olefin.non-conjugated polyene copolymer (2B) at a mass ratio of (A)/(2B)=90/10 to 10/90, and
   comprising 0.1 to 20 parts by weight of the phenol resin-based cross-linking agent (C) relative to 100 parts by weight of the ethylene.α-olefin.non-conjugated polyene copolymer (2B).

13. A molded article comprising the thermoplastic elastomer composition according to claim 9.

14. An automobile part comprising the thermoplastic elastomer composition according to claim 9.

15. An automobile hose comprising the thermoplastic elastomer composition according to claim 9.

16. An automobile boot comprising the thermoplastic elastomer composition according to claim 9.

* * * * *